United States Patent
Abouelseoud et al.

(10) Patent No.: US 11,246,080 B2
(45) Date of Patent: Feb. 8, 2022

(54) BEACONING IN SMALL WAVELENGTH WIRELESS NETWORKS

(71) Applicant: SONY CORPORATION, Tokyo (JP)

(72) Inventors: Mohamed Abouelseoud, San Francisco, CA (US); Ramy Abdallah, San Jose, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 20 days.

(21) Appl. No.: 16/562,668

(22) Filed: Sep. 6, 2019

(65) Prior Publication Data

US 2020/0008129 A1    Jan. 2, 2020

Related U.S. Application Data

(63) Continuation of application No. 15/819,991, filed on Nov. 21, 2017, now Pat. No. 10,433,236.

(Continued)

(51) Int. Cl.
*H04W 40/24* (2009.01)
*H04W 8/00* (2009.01)
(Continued)

(52) U.S. Cl.
CPC ......... *H04W 40/244* (2013.01); *H04W 8/005* (2013.01); *H04W 16/28* (2013.01);
(Continued)

(58) Field of Classification Search
CPC .... H04W 40/244; H04W 16/28; H04W 8/005
See application file for complete search history.

(56) References Cited

U.S. PATENT DOCUMENTS

| | | | |
|---|---|---|---|
| 2010/0271959 A1 | 10/2010 | Qi et al. | |
| 2012/0026941 A1 | 2/2012 | Ahmad et al. | |
| 2015/0271817 A1 | 9/2015 | Tarui et al. | |
| 2015/0319675 A1* | 11/2015 | Park | H04W 40/244 370/338 |

(Continued)

FOREIGN PATENT DOCUMENTS

| | | |
|---|---|---|
| JP | 2015092736 A | 5/2015 |
| JP | 2016511585 A | 4/2016 |
| JP | 2017503447 A | 1/2017 |

OTHER PUBLICATIONS

ISA/EP, European Patent Office (EPO), International Search Report and Written Opinion dated Nov. 23, 2018, related PCT international application No. PCT/IB2018/056018, pp. 1-17, claims searched, pp. 18-22.

(Continued)

*Primary Examiner* — Kevin M Cunningham
(74) *Attorney, Agent, or Firm* — O'Banion & Ritchey LLP; John P. O'Banion

(57) ABSTRACT

Reduced signaling overhead is provided in an apparatus and method for communications within a mesh network. The communications involve using two different beacon signals. A peer beacon contains time synchronization and resource management information to maintain existing links among one or more neighboring peer stations, while a separate network discovery beacon contains mesh network profile information that identifies the mesh network to aid network discovery for wireless communication stations wanting to join the mesh network. Embodiments describe coordination between peer stations to determine which stations are to send the network discovery beacons, so that at any given period of time not all stations need to be transmitting the discovery beacons.

23 Claims, 36 Drawing Sheets

Related U.S. Application Data

(60) Provisional application No. 62/550,028, filed on Aug. 25, 2017.

(51) Int. Cl.
  *H04W 16/28* (2009.01)
  *H04B 7/06* (2006.01)
  *H04L 12/24* (2006.01)
  *H04W 48/16* (2009.01)
  *H04W 84/12* (2009.01)
  *H04W 84/18* (2009.01)

(52) U.S. Cl.
  CPC ............ *H04B 7/0695* (2013.01); *H04L 41/12* (2013.01); *H04W 48/16* (2013.01); *H04W 84/12* (2013.01); *H04W 84/18* (2013.01)

(56) References Cited

U.S. PATENT DOCUMENTS

| | | |
|---|---|---|
| 2015/0373618 A1 | 12/2015 | Deenoo et al. |
| 2015/0382171 A1 | 12/2015 | Roy et al. |
| 2016/0192273 A1 | 6/2016 | Oren |
| 2017/0055199 A1 | 2/2017 | Peterson et al. |
| 2017/0086211 A1 | 3/2017 | Sahin et al. |
| 2017/0111849 A1* | 4/2017 | Park ...................... H04W 48/08 |
| 2017/0150296 A1 | 5/2017 | Jung |
| 2017/0302524 A1* | 10/2017 | Iorga ..................... H04L 45/021 |

OTHER PUBLICATIONS

Taiwan Intellectual Property Office, office action dated Jun. 19, 2019, related Taiwan patent application No. 107126697, Chinese-language document pp. 1-6, English-language translation pp. 7-11, claims examined pp. 12-17.

\* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|

Octets: 2    2    6    6    3    3    4

FIG. 7
(Prior Art)

| B0 | B1   B9 | B10   B15 | B16   B17 | B18   B23 |
|---|---|---|---|---|
| Direction | CDOWN | Sector ID | DMG Antenna ID | RXSS Length |

Bits: 1    9    6    2    6

FIG. 8
(Prior Art)

| B0   B8 | B9   B10 | B11   B15 | B16 | B17   B23 |
|---|---|---|---|---|
| Total sectors in ISS | Number of RX DMG antennas | Reserved | Poll Required | Reserved |

Bits: 9    2    5    1    7

FIG. 9A
(Prior Art)

| B0   B5 | B6   B7 | B8   B15 | B16 | B17   B23 |
|---|---|---|---|---|
| Sector select | DMG Antenna select | SNR report | Poll Required | Reserved |

Bits: 6    2    8    1    7

FIG. 9B
(Prior Art)

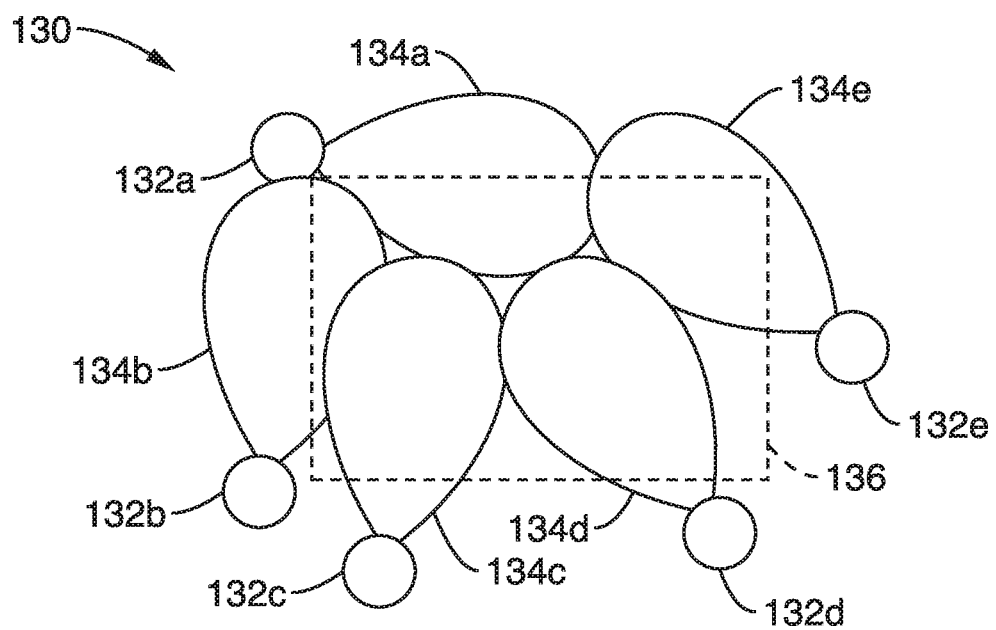
FIG. 16
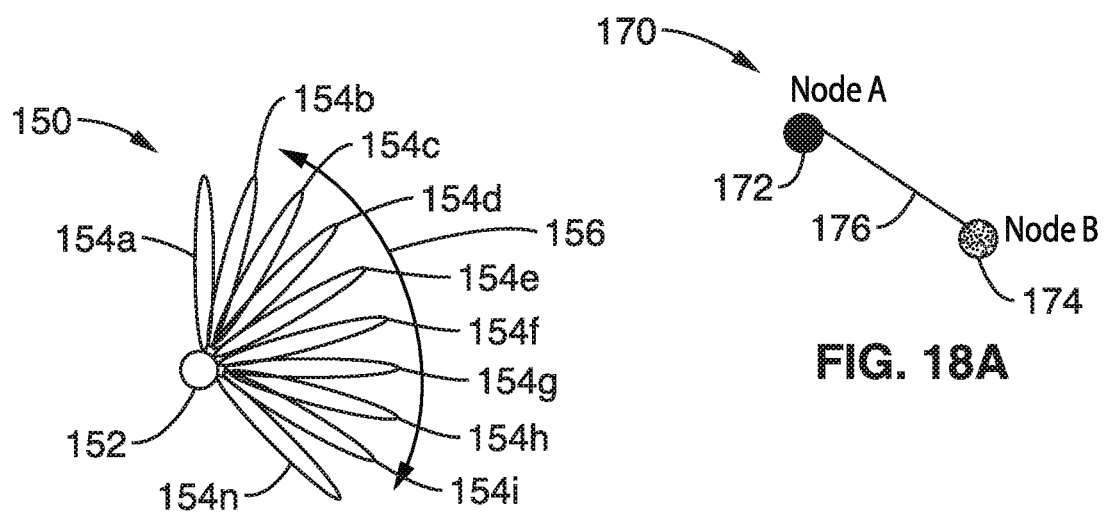
FIG. 17
FIG. 18A
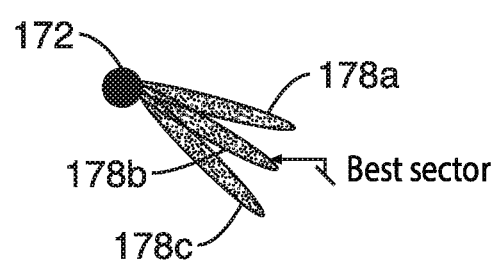
FIG. 18B

BEACONING IN SMALL WAVELENGTH WIRELESS NETWORKS

CROSS-REFERENCE TO RELATED APPLICATIONS

This application is a continuation of U.S. patent application Ser. No. 15/819,991 filed on Nov. 21, 2017, incorporated herein by reference in its entirety, which claims priority to, and the benefit of, U.S. provisional patent application Ser. No. 62/550,028 filed on Aug. 25, 2017, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to more efficient use of beacon signaling within multiple-hop relayed directional wireless communication networks.

2. Background Discussion

Millimeter wavelength (mm-wave or mmW) wireless networks, including mesh networks and mixtures of mesh and non-mesh networks, are becoming increasingly important. Due to the need of higher capacity, network operators have begun to embrace concepts to achieve densification. Use of current sub-6 GHz wireless technology is not sufficient to cope with high data demands. One alternative is to utilize additional spectrum in the 30-300 GHz band, millimeter wave band (mmW).

Enabling mmW wireless systems in general requires properly dealing with the channel impairments and propagation characteristics of the high frequency bands. High free-space path loss, high penetration, reflection and diffraction losses reduce the available diversity and limit non-line-of-sight (NLOS) communications. The small wavelength of mmW enables the use of high-gain electronically steerable directional antennas of practical dimensions. This can provide enough array gain to overcome path loss and ensure high Signal-to-Noise Ratio (SNR) at the receiver. Directional mesh networks in dense deployment environments using mmW bands are an efficient way to achieve reliable communications between nodes and overcome line-of-sight channel restrictions.

A new station node starting up will be looking for neighboring nodes to discover and a network to join. The process of initial access of a node to a network comprises scanning for neighboring nodes and discovering all active nodes in the local vicinity. This can be performed either through the new node searching for a specific network/list of networks to join, or by the new node sending a broadcast request to join any already established network that will accept the new node.

A node connecting to a mesh network needs to discover neighboring nodes to decide on the best way to reach a gateway/portal mesh nodes and the capabilities of each of these neighboring nodes. The new node examines every channel for possible neighboring nodes for a specific period of time. If no active node is detected after that specific time, the new node moves to test the next channel. When a node is detected, the new node collects sufficient information to configure its PHY layer for operation in the regulatory domain (IEEE, FCC, ETSI, MKK, etc.). This task is further challenging in mmWave communications due to directional transmissions. The challenges in this process can be summarized as: (a) knowledge of surrounding nodes IDs; (b) knowledge of best transmission pattern for beamforming; (c) channel access issues due to collisions and deafness; and (d) channel impairments due to blockage and reflections. Designing a neighborhood discovery method to overcome some or all of the above is of utmost importance to enable pervasiveness of mmWave D2D and mesh technologies.

Most existing technologies for mesh networking address mesh discovery solutions for networks operating in broadcast mode and is not targeted to networks with directional wireless communications. In addition, those technologies which utilize directional wireless network communications often have very high overhead demands in regards to the generation of beacon signals.

Accordingly, a need exists for enhanced mechanisms for beaconing within a mmWave network. The present disclosure fulfills that need and provides additional benefits over previous technologies.

BRIEF SUMMARY

It is important to be able to setup and maintain mmWave communications in a mesh topology network without causing significant signaling overhead or network discovery delay. In the disclosed technology two different types of beacon signals are utilized: (1) a communication beacon (peer beacon) and (2) a discovery beacon. The use of these two beacons allows separation of discovery function and network maintenance function, so a node station (STA) embeds less information in each of these strategically targeted beacons. Using the present apparatus and method with these separated beacons reduces signaling overhead.

The disclosed technology coordinates discovery beacon transmissions among STAs in a network, toward reducing unnecessary beacon transmissions for the purpose of network discovery. The disclosed apparatus and method defines a set of rules how the coordination should be performed in an efficient manner. For example, the disclosed technology reduces the number of sectors for communication (peer) beacon transmission, to reduce the number of beacon frames to be transmitted. The disclosed technology also defines a set of rules which allow both passive scanning and active scanning with reduced beaconing overhead. Based on these rules, new stations (those seeking to join the mesh network) can discover an existing network with limited network delay.

A number of terms are utilized in the disclosure whose meanings are generally described below.

A-BFT: Association-Beamforming Training period; a period announced in the beacons that is used for association and BF training of new stations (STAs) joining the network.

AP: Access Point; an entity that contains one station (STA) and provides access to the distribution services, through the wireless medium (WM) for associated STAs.

Beamforming (BF): a directional transmission that does not use an omnidirectional antenna pattern or quasi-Omni antenna pattern. Beamforming is used at a transmitter to improve received signal power or signal-to-noise ratio (SNR) at an intended receiver.

BSS: Basic Service Set; a set of stations (STAs) that have successfully synchronized with an AP in the network.

BI: the Beacon Interval is a cyclic super frame period that represents the time between beacon transmission times.

BRP: BF Refinement protocol; a BF protocol that enables receiver training and iteratively trains the transmitter and receiver sides to achieve the best possible directional communications.

BTI: Beacon Transmission Interval, is the interval between successive beacon transmissions.

CBAP: Contention-Based Access Period; the time period within the data transfer interval (DTI) of a directional multi-gigabit (DMG) BSS where contention-based enhanced distributed channel access (EDCA) is used.

DTI: Data Transfer Interval; the period whereby full BF training is permitted followed by actual data transfer. It can include one or more service periods (SPs) and contention-based access periods (CBAPs).

ISS: Internal Sublayer Service.

MAC address: a Medium Access Control (MAC) address.

MBSS: Mesh Basic Service Set, a basic service set (BSS) that forms a self-contained network of Mesh Stations (MS-TAs), and which may be used as a distribution system (DS).

MCS: Modulation and Coding Scheme; defines an index that can be translated into the PHY layer data rate.

MSTA: Mesh Station (MSTA): a station (STA) that implements the Mesh facility. An MSTA that operates in the Mesh BSS may provide the distribution services for other MSTAs.

Omni directional: a non-directional antenna mode of transmission.

Quasi-Omni directional: a directional multi-gigabit (DMG) antenna operating mode with the widest beamwidth attainable.

Receive sector sweep (RXSS): Reception of Sector Sweep (SSW) frames via different sectors, in which a sweep is performed between consecutive receptions.

RSSI: Receive Signal Strength Indicator (in dBm).

SLS: Sector-level Sweep phase: a BF training phase that can include as many as four components: an Initiator Sector Sweep (ISS) to train the initiator, a Responder Sector Sweep (RSS) to train the responder link as using SSW Feedback and an SSW ACK.

SNR: received Signal-to-Noise Ratio in dB.

SP: Service Period; The SP that is scheduled by the access point (AP). Scheduled SPs start at fixed intervals of time.

Spectral efficiency: the information rate that can be transmitted over a given bandwidth in a specific communication system, usually expressed in bits/second or in Hertz.

SSID: service Set Identifier; the name assigned to a WLAN network.

STA: Station; a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

Transmit Sector Sweep (TXSS): transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a mesh configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 16 is an antenna pattern map of a coverage area showing the results of coordination between nodes according to an embodiment of the present disclosure.

FIG. 17 is a sector sweep diagram used for mesh network discovery frames according to an embodiment of the present disclosure.

FIG. 18A and FIG. 18B is a wireless node topology upon which bracketing of best sector communications directions are performed according to an embodiment of the present disclosure.

DETAILED DESCRIPTION

1. Existing Directional Wireless Network Technology 1.1. WLAN Systems

In WLAN systems, 802.11 defines two modes of scanning; passive and active scanning. The following are the characteristics of passive scanning. (a) A new station (STA), attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) STA moves to a channel, waits for incoming frames or a probe delay timer to expire. (a)(2) If no frame is detected after the timer expires, the channel is considered to be not in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if channel was never busy. The STA waits for more time (e.g., Maximum Channel Time) if the channel was busy and a probe response was received.

(b) Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (more rapid) for STAs to gain access to the network compared to the use of passive scanning, since STAs do not need to wait for beacons. (f) In infrastructure basic service set (BSS) and IBSS, at least one STA is awake to receive and respond to probes. (g) STAs in mesh basic service set (MBSS) might not be awake at any point of time to respond. (h) When radio measurement campaigns are active, nodes might not answer the probe requests. (i) Collision of probe responses can arise. STAs might coordinate the transmission of probe responses by allowing the STA that transmitted the last beacon to transmit the first Probe Response. Other nodes can follow and use back-off times and regular distributed coordination function (DCF) channel access to avoid collision.

Figure 1:
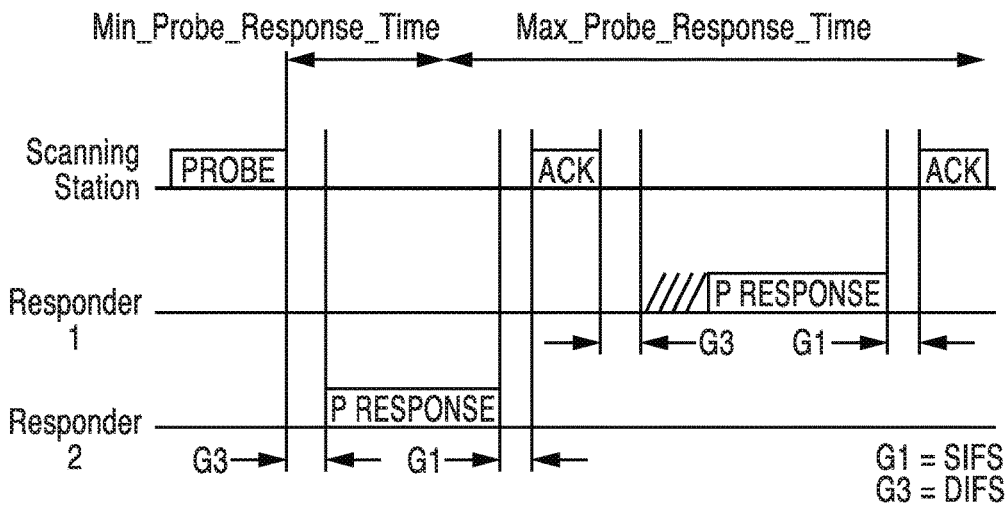
FIG. 1 is a timing diagram of active scanning performed in an IEEE 802.11 wireless local area network (WLAN).

FIG. 1 depicts the use of active scanning in an IEEE 802.11 WLAN, depicting a scanning station sending a probe and two responding stations which receive and respond to the probe. The figure also shows the min and max probe response timing. The values G1 is shown set to SIFS which is the interframe spacing prior to transmission of an acknowledgment, while G3 is DIFS which is DCF interframe spacing, represented the time delay for which a sender waits after completing a backoff period before sending an RTS package.

1.2. IEEE 802.11s mesh WLAN

The IEEE 802.11s (hereafter 802.11s) is a standard that adds wireless mesh networking capabilities to the 802.11 standard. 802.11s defines new types of radio stations as well as new signaling to enable mesh network discovery, establishing peer-to-peer connection, and routing of data through the mesh network.

Figure 2:
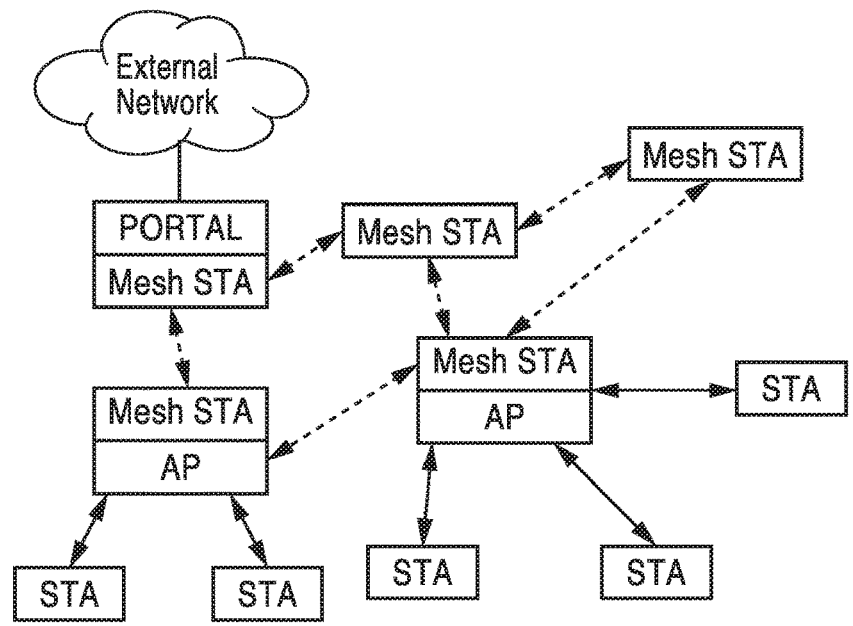
FIG. 2 is a node diagram for a mesh network showing a combination of mesh and non-mesh stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remain active. All the previous signaling to discover neighbor mesh STAs are performed in broadcast mode. It should be appreciated that 802.11s was not targeted for networks with directional wireless communications.

Figure 3:
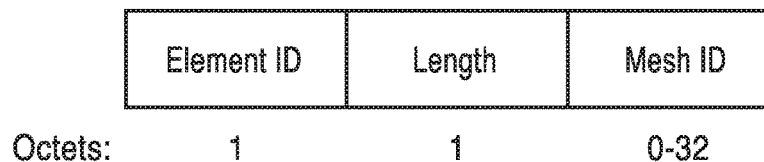
FIG. 3 is a data field diagram depicting a mesh identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example, it is like having the STA running as a module in additional to some other modules to serve the mesh functionality. If the STA does not have this mesh module it should not be allowed to connect to a mesh network.

FIG. 4 depicts a Mesh configuration element is contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The standard 802.11a defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmit Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator, the second is the responder.

During a transmit sector sweep (TXSS), SSW frames are transmitted on different sectors while the pairing node (the responder) receives utilizing a quasi-Omni directional pattern. The responder determines the antenna array sector from the initiator which provided the best link quality (e.g. SNR).

Figure 5:
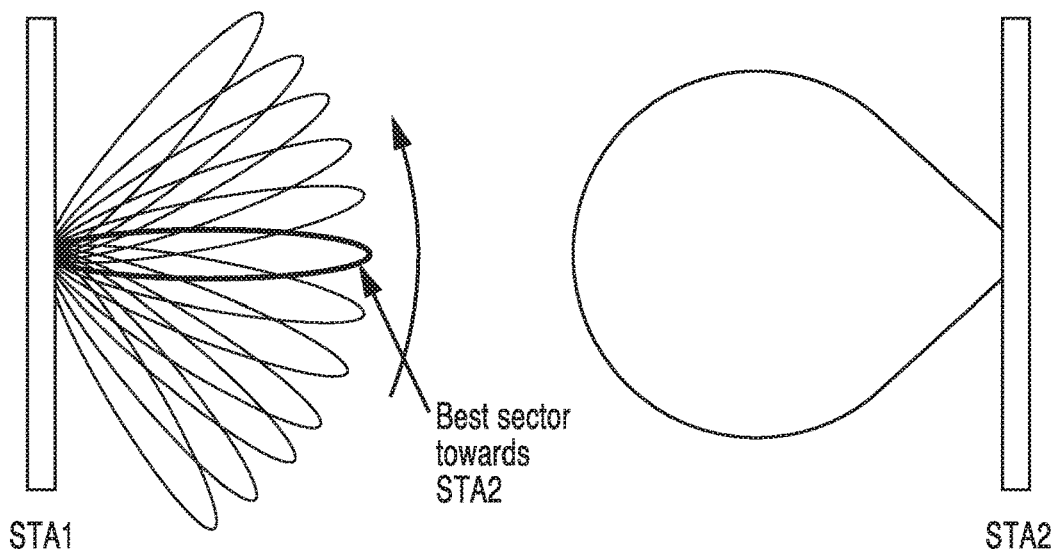
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
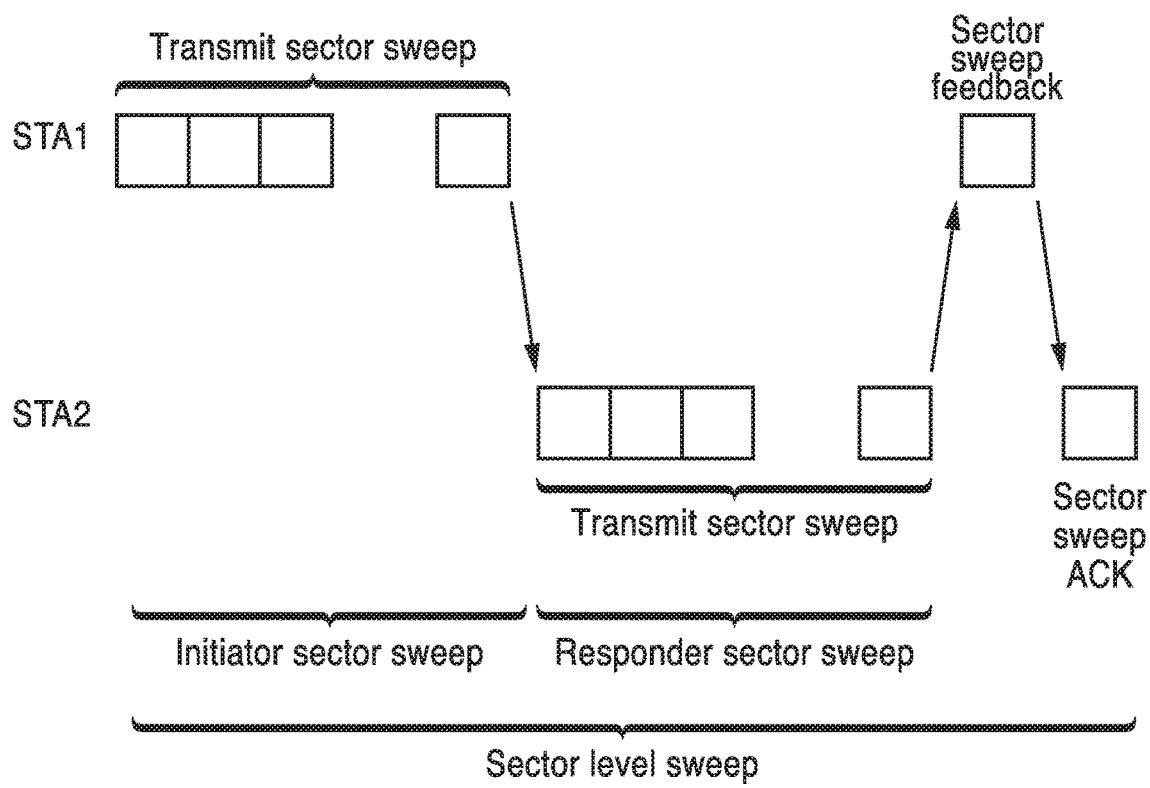
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Problem Statement

Current millimeter wave (mmWave) communication systems, as described in the previous section, typically need to rely heavily on directional communication to gain sufficient link budget between transmitter and receiver. In current systems, this process of determining the proper beam for use requires significant signaling overhead. For example, the AP transmits multiple beacon frames with transmit beam forming.

The beacon frames are used for network discovery purposes, i.e., passive scanning. For this reason, beacon frames are transmitted periodically, so that a new STA can recognize the existence of the network by performing passive scanning in a certain time period.

To further complicate the situation, current technology is trending toward the use of finer beam forming, which allows higher antenna gain to secure better link budget. However, the overhead problem is further exacerbated when the STA employs finer beams, because the STA will be transmitting a larger number of beacon frames to cover a sufficient transmission angle.

In view of the above, an important trade-off exists between beaconing overhead and network discovery delay. If beacons are transmitted frequently, then the beaconing overhead increases but allows a new STA to find the existing network quickly. If beacons are transmitted less frequently, the beaconing overhead can be decreased, however, it would be difficult for a new STA to find the existing network in a rapid manner.

When considering the task of forming a mesh network utilizing mmWave PHY technology, this overhead dilemma gets even worse. A STA connecting to a mesh network needs to discover all neighboring STAs to decide on the best way to reach gateway/portal mesh STAs and the capabilities of each of these neighboring STAs. This means that all the STAs joining a mesh network should have the capability of beaconing which leads to significant signaling overhead.

Accordingly, the present disclosure is configured for addressing these current and future beacon overhead challenges.

3. Benefits of the Disclosed Efficient Beaconing

By utilizing the proposed technologies, mmWave communication nodes can form a mesh topology network without causing significant signaling overhead or network discovery delay. The disclosed technology breaks beaconing down into two different types of beacon signals: (1) communication beacon (peer beacon) and (2) discovery beacon. Creating these separate beacons allows separation of discovery function and network maintenance function, so a STA can embed only the necessary information to the function of each beacon. Using this separation of beacons in the manner described reduces signaling overhead.

The disclosed efficient beacon technology uses coordination of discovery beacon transmissions among STAs in a network, to reduce unnecessary beacon transmissions for the purpose of network discovery. This technology defines a set of rules on how the communication transceivers can perform this coordination in an efficient manner. The proposed technology reduces the number of sectors for communication (peer) beacon transmission, which allows a reduction of transmit beacon frames. This technology defines a set of rules which allow both passive scanning and active scanning with reduced beaconing overhead. Based on these rules, new STAs can discover existing network with limited network delay.

4. Efficient Beaconing Embodiments 4.1. Topology Under Consideration

Figure 10:
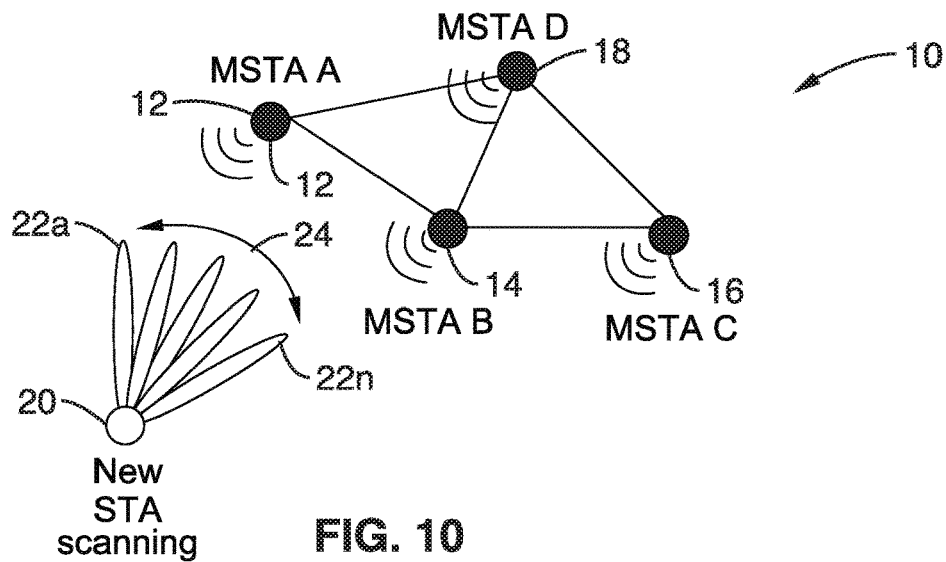
FIG. 10 is a wireless node topology of example wireless mmWave nodes in a wireless network as utilized according to an embodiment of the present disclosure.

FIG. 10 illustrates an example embodiment 10 of a network of mmW wireless nodes, in which mesh STA (MSTA) nodes 12, 14, 16 and 18 are connected in a mesh topology with each other. A new STA 20 is scanning 24, depicting directions 22a-22n, the communication medium for potential neighboring MSTA and pair nodes.

It will be noted that directional transmission or reception is not required all the time at both sides. For example, one side might be performing directional transmission or reception and the other side is not. This might be due to limited capabilities of devices or the application requirement where there is no need for directional transmission from both side (limiting interference/small distance).

A new node can be configured with quasi-Omni directional or directional antennas for transmission and reception. MSTAs can similarly be set up for using Omni directional or quasi-Omni directional or directional antennas for transmission and reception. At least one node MSTA, or the new STA, should be configured with a directional antenna to provide sufficient gain to account for the path loss and provide enough SNR for the link.

A new STA scans for neighbors either using passive or active scanning. The new STA is configured to keep scanning until it finds all neighboring nodes. After a list of available MSTA neighbors are constructed, a decision about which neighbor to connect with is made. This decision takes into account application demands, traffic loading in the network and wireless channel status.

4.2. STA Hardware Configuration

Figure 11:
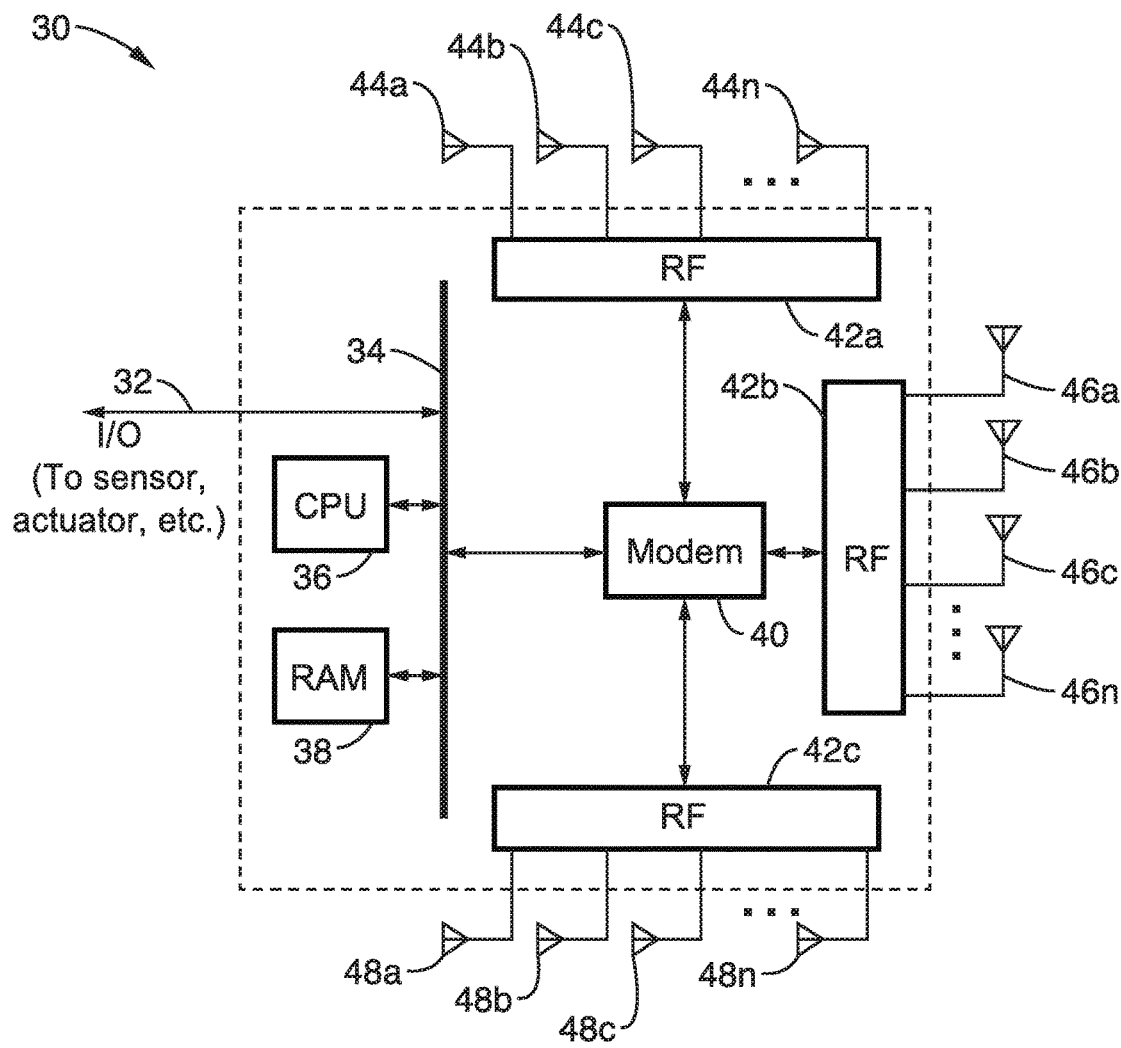
FIG. 11 is a block diagram of station hardware as utilized according to an embodiment of the present disclosure.

FIG. 11 depicts an example embodiment 30 of node hardware configuration. In this example a computer processor (CPU) 36 and memory (RAM) 38 are coupled to a bus 34, which is coupled to an I/O path 32 giving the node external I/O, such as to sensors, actuators and so forth. Instructions from memory are executed on processor to execute a program which implements the communication protocols. This host machine is shown configured with a modem 40 coupled to radio-frequency (RF) circuitry 42a, 42b, 42c to a plurality of antennas 44a-44n, 46a, 46n, 48a-48n to transmit and receive frames with neighboring nodes.

Although three RF circuits are shown in this example, embodiments of the present disclosure can be configured with modem 40 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Antenna sector is determined by a selection of RF circuitry and beamforming commanded by the array antenna controller. Although it is possible that STA hardware components have different functional partitions from the one described above, such configurations can be deemed to be a variant of the explained configuration. Some of the RF circuitry and antennas may be disabled when the node determines it is unnecessary to communicate with neighbor nodes.

In at least one embodiment, the RF circuitry includes frequency converter, array antenna controller, and so forth, and is connected to multiple antennas which are controlled to perform beamforming for transmission and reception. In this way the node can transmit signals using multiple sets of beam patterns, each beam pattern direction being considered as an antenna sector.

Figure 12:
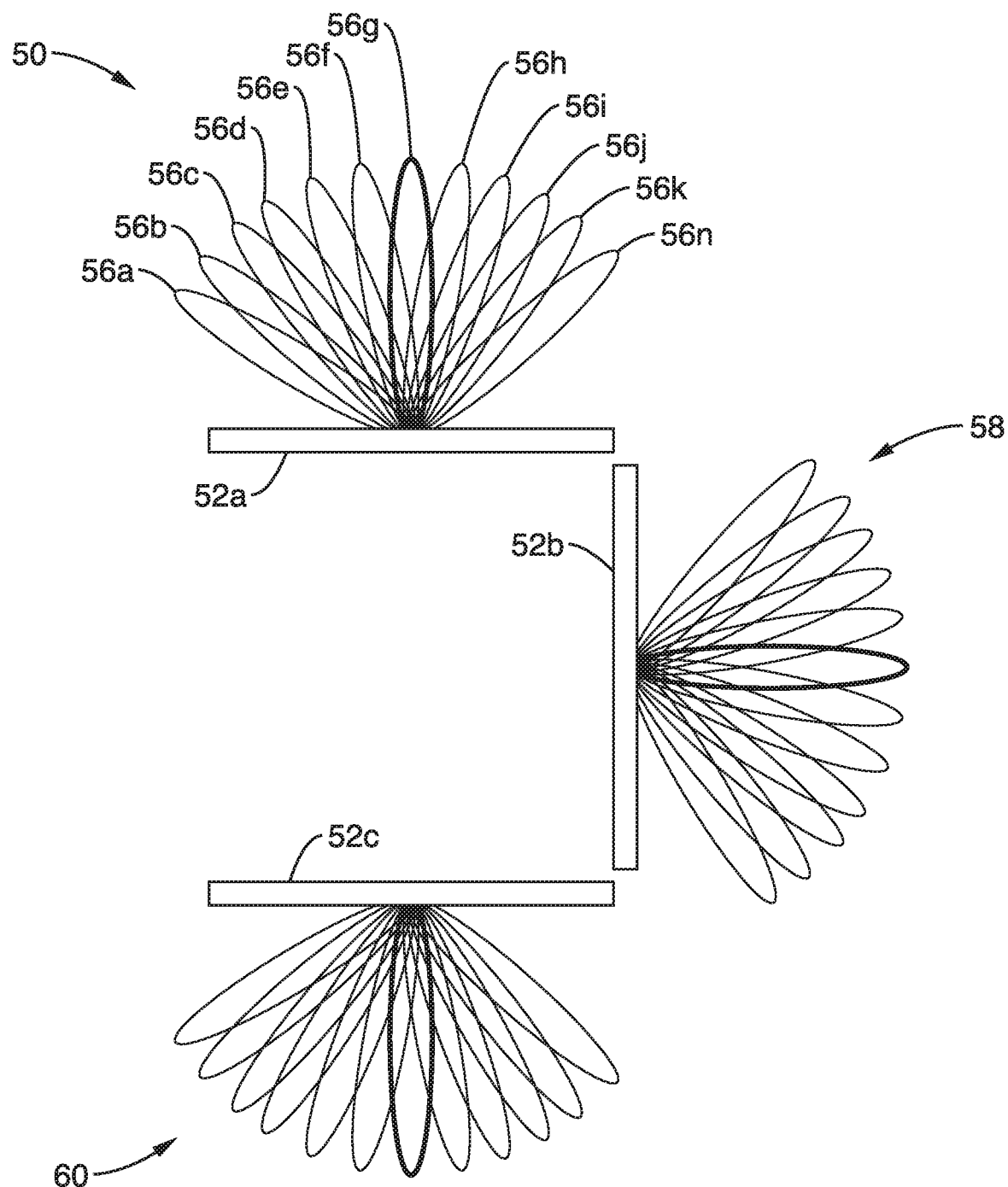
FIG. 12 is a beam pattern diagram for the station hardware of FIG. 11 as utilized according to an embodiment of the present disclosure.

FIG. 12 illustrates an example embodiment 50 of antenna directions which can be utilized by a node to generate a plurality (e.g., 36) of antenna sector patterns. In this example, the node implements three RF circuits 52a, 52b, 52c and connected antennas, and each RF circuitry and connected antenna generates 12 beamforming patterns 56a, 56b, 56c, on through to 56n, as well as beamforming patterns 58 and 60; whereby it is said the node has 36 antenna sectors. However, for the sake of clarity and ease of explanation, the following sections describe nodes having a smaller number of antenna sectors. It should be appreciated that any arbitrary beam pattern can be mapped to an antenna sector. Typically, the beam pattern is formed to generate a sharp beam, but it is possible that the beam pattern is generated to transmit or receive signals from multiple angles.

4.3. Mesh Network Architecture 4.3.1. Beacon Functions

The functions of a beacon in a mmWave mesh network may comprise: (a) network discovery and association for new mesh nodes; (b) synchronization; (c) spectrum access and resource management. In the embodiments described herein, any signal that is used for the above functionality is called a beacon, thus any signal used for those purposes should be interpreted as a beacon signal. In the next section, the 802.11 beacon is used to cover this functionality as an example, however other frames can be used to fulfill the same functionality.

4.3.2. Types of Beacons

Based on the different functionality of the beacons in the network, two types of beacons are proposed in the following embodiments, which are communication beacons (or peer beacons) and discovery beacons.

Communication or peer Beacons are utilized for communication between peers with connections that have already (previously) been setup. This beacon can be used for carrying out functions related to maintaining synchronization, beam tracking and managing channel access and resources between mesh nodes in the network. Each mesh node sweeps beacons in sectors corresponding to directions of neighbor nodes only and thus transmits beacons to its neighbors only.

Discovery beacons are utilized for network announcement and node discovery. The discovery beacons are used to aid the new nodes to find and join the mesh network. An existing mesh node sweeps the discovery beacons in all directions it is intended to spatially cover. The discovery beacons can generally be transmitted less frequently than the peer beacons to avoid uncoordinated beacon transmissions from different nodes belonging to different mesh networks and limit interference.

Figure 13A:
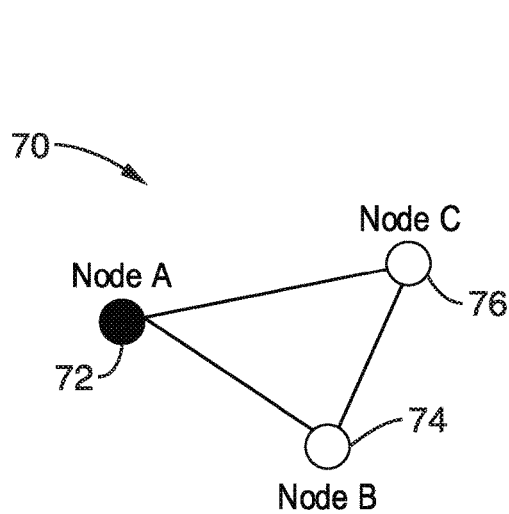
FIG. 13A through FIG. 13C is wireless node topology and associated discovery beacon sweeping according to an embodiment of the present disclosure.
Figure 13B:
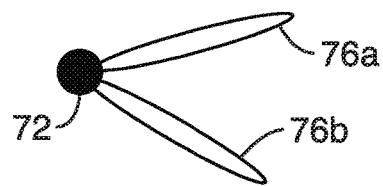
Figure 13C:
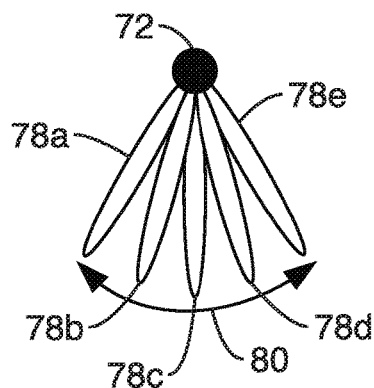

FIG. 13A through FIG. 13C illustrate aspects of a simple network considered by way of example and not limitation. In FIG. 13A example embodiment 70 is seen with three nodes 72, 74, and 76. In FIG. 13B beacons are shown transmitting from STA node 72, showing peer beacons being swept 76a, 76b in directions corresponding to best sectors towards nodes 74 and 76. In FIG. 13C STA node 72 sweeps 80 discovery beacons to cover a specific spatial area from 78a, 78b, 78c, 78d, and 78e.

Figure 14:
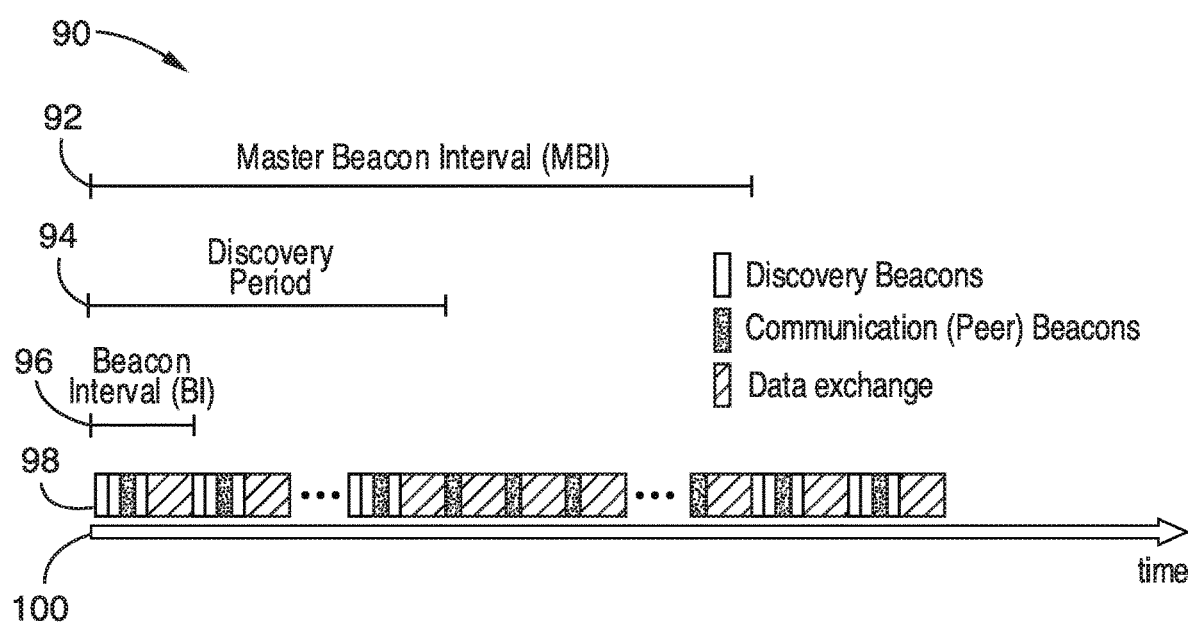
FIG. 14 is a communication period diagram showing transmission and reception from a mesh node according to an embodiment of the present disclosure.

FIG. 14 illustrates an example embodiment 90 of different transmission and reception periods 98 of a mesh node across a time span 100. In this example the node operates in at least three periods according to the present disclosure. (1) A beacon interval 96 is the regular beacon transmission interval defined in 802.11. Communication or peer beacons are transmitted every beacon interval to the node neighboring peers. (2) Discovery period 94 is the period of time (number of beacon intervals) that the node is transmitting discovery beacons in addition to the peer beacons. Outside the discovery period, only peer beacons are transmitted. Beacon Master Interval 92 is the period over which a node repeats its discovery period and retransmits discovery beacons. If the discovery period equals to the beacon master interval, the node is transmitting beacons all the time and acting as a regular 802.11 node. In the above and other embodiments described herein, it should be appreciated that discovery beacons do not have to take the form of regular beacons. Discovery beacons can be any frames swept across some or all beam directions to announce the mesh network and discover new nodes. The periodicity or the isolated action of sending these frames in that case can be defined independently of peer beacon periodicity.

4.3.3. Beacon Master and Beacon Master Functionality

A beacon master (BM) is a node selected at some time period to transmit the discovery beacons. At any point in time, the beacon master is the node that transmits the discovery beacon. Many nodes can be selected and scheduled to transmit discovery beacons at the same time, but it is presented here the case where one beacon master is allowed at a time through the network to eliminate interference.

The functions of the beacon master may comprise the following: (a) sweeping of discovery beacons; (b) receiving and processing new BM requests; (c) scheduling a new BM schedule based on received BM requests; (d) updating a steady-state BM sequence; (e) defining the scanning receive directions for a new node joining the mesh network; (f) updating discovery beacon scanning directions for the peer nodes of a new node joining the mesh network.

4.3.4. System Architecture 4.3.4.1. Beacon Master Sequence

Every active node in the mesh network becomes a beacon master (BM) according to a selected sequence. This sequence remains valid until a new node becomes discoverable by an existing mesh node. The BM sequence is modified to enable efficient discovery of the new node. If the new node joins the network, the steady-state BM sequence will include a turn for the new node to act as a BM.

Figure 15A:
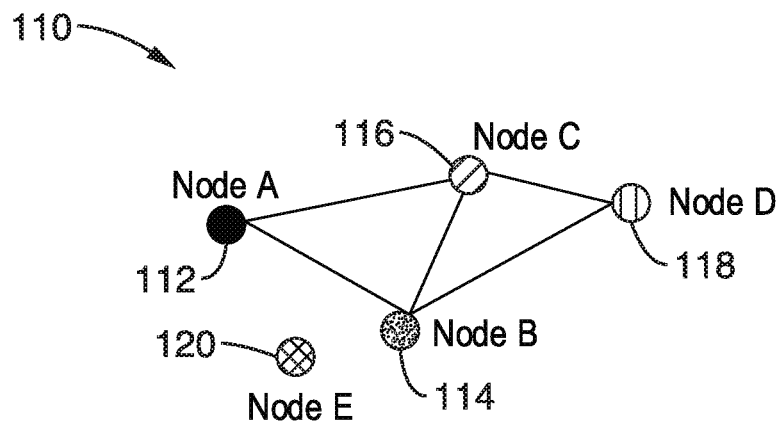
FIG. 15A through FIG. 15D is wireless node topology upon which a beacon master method is described according to an embodiment of the present disclosure.
Figure 15B:
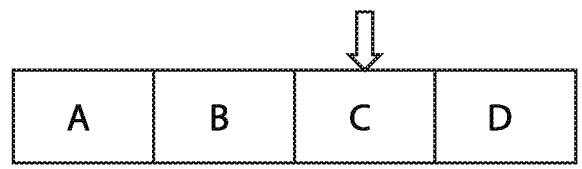
Figure 15C:
Figure 15D:
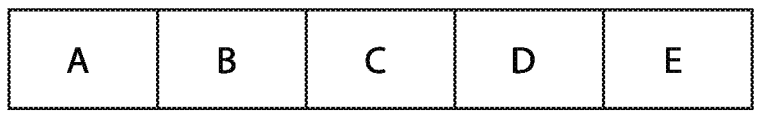

FIG. 15A through FIG. 15D illustrates the beacon master concept. In FIG. 15A mesh nodes A 112, B 114, C 116, D 118 are shown with a new node E 120. In FIG. 15B node C is seen receiving a message from node B communicating that it received (depicted by the arrow on top) a request from node E to join the network. The next beacon masters (BMs) may be selected to be node B and node A, temporarily, as depicted by the shading seen in FIG. 15C. Then if node E joins the network, the steady-state sequence of BM will include it.

4.3.4.2. Mesh Node Directional Passive Scanning Map for New Nodes

The following considers the situation in which mesh nodes are in an idle reception state, for example they are neither transmitting, nor scheduled for receiving data from peer nodes. This embodiment proposes a coordinated passive scanning mode for a mesh node in which the nodes listen directionally to probe requests from new nodes willing to join the network.

FIG. 16 depicts directions 130 to which the nodes listen, as seen by the dotted cones. In particular, node 132a is seen listening in region 134a, node 132b is seen listening in region 134b, node 132c is seen listening in region 134c, node 132d is seen listening in region 134d, node 132e is seen listening in region 134e, for as many as there are nodes in this local mesh. It is seen that these listening regions are arranged to provide sufficient reception coverage over area 136, so that requests are properly received from any new nodes within that region.

These directions may be coordinated by a central entity or locally and each node may listen in on all or a subset of their receiver antenna pattern sectors. The directions can be updated dynamically based on current network scheduling or in a semi-static assignment based on average link usage. In the figure one can recognize the collaboration of a few mesh nodes to cover signal reception for a given reception area.

4.3.4.3. New Node Active Scanning Mode

In at least one embodiment, a node willing to join a mesh network can perform active scanning of surrounding mesh nodes. The active scanning can be performed via sweeping a probe request across different sectors supported by the antenna pattern of this node.

FIG. 17 illustrates an embodiment 150 of a node 152 transmitting in directions 154a through 154n, during sweeping 156 of a mesh network discovery frame in a quasi-Omni directional transmission.

4.4. Efficient BF Training through Peer and Discovery Beacons 4.4.1. Peer Beacon Updates In directional communications, e.g. 60 GHz WLAN, beacon transmissions may be utilized in at least one embodiment of the present disclosure as part of the BF training required to establish robust communications between peers. The discovery beacons described herein can initiate the BF training, such as for example using SLS phase.

A mesh node records the best sector information from the BF training that happens during and shortly after transmitting the discovery beacons. For peer beacons, the mesh node transmits beacons only in sectors corresponding to best sectors towards peer mesh nodes.

FIG. 18A and FIG. 18B illustrate an example embodiment of providing additional robustness, by performing transmissions on one or more sectors around (bracketing) the determined best sector. In FIG. 18A Node A 172 is seen in relation to node B 174 with the best sector (path) being direction 176. In FIG. 18B Node A in communicating with node B has best sector 178b, but also selects one or more additional sectors 178a, 178c, on each side of this best sector to improve communications robustness, especially in view of the fact that node B may be moving in relation to node A.

Figure 19:
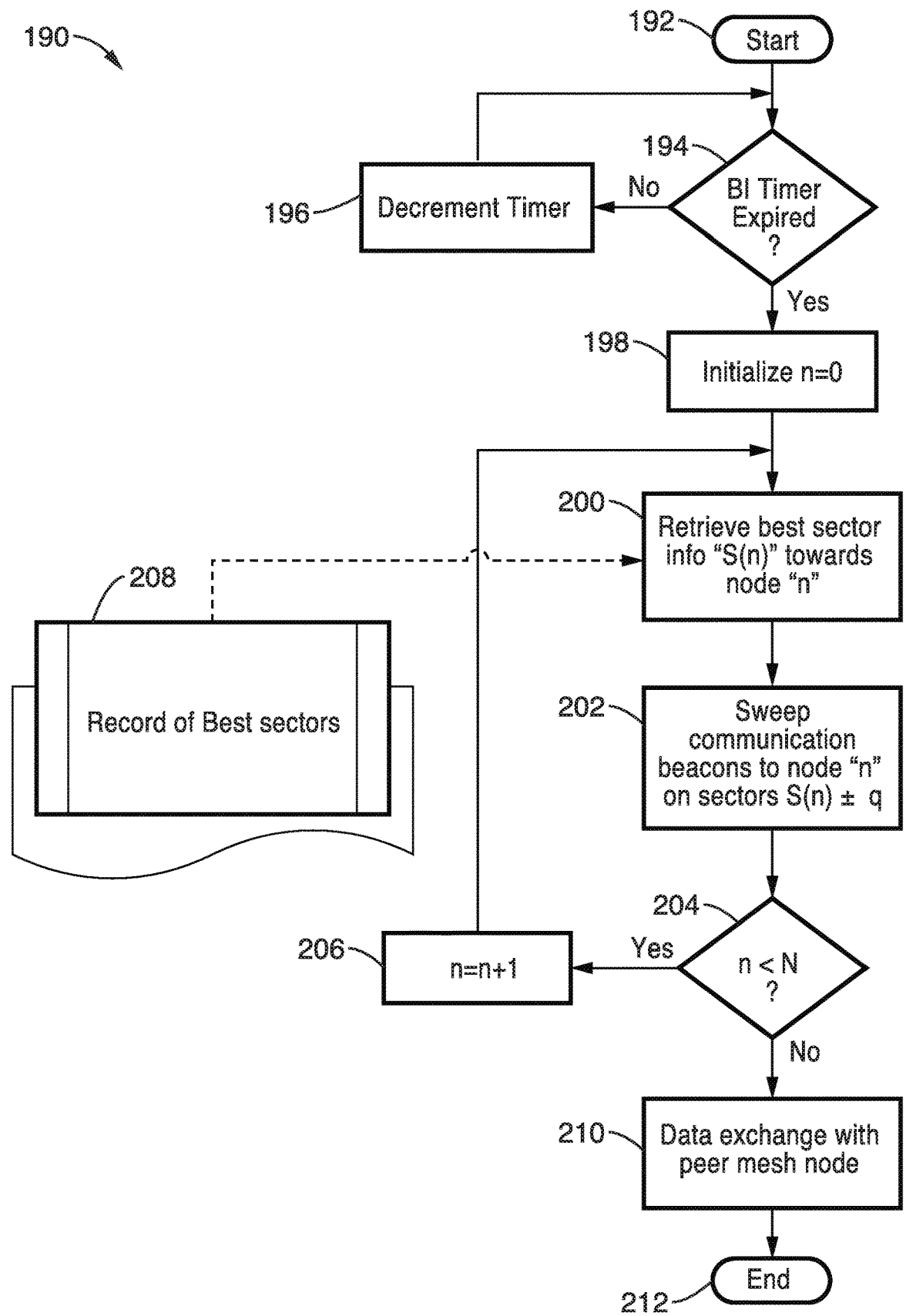
FIG. 19 is a flow diagram of transmitting peer beacons according to an embodiment of the present disclosure.

FIG. 19 illustrates an example embodiment 190 of transmission of peer beacons by a mesh node. The routine starts 192 and a check is performed 194 if the beacon interval (BI) timer has expired. If it has not expired then the timer is decremented 196 before another check is performed. It will be noted that the use of a timing "loop" is shown for the sake of illustration, however, providing the delays (synchronization) may be performed by any desired operating system primitives, such as synchronization and timing mechanisms utilized within a threaded or multi-tasking environment.

After the BI timer expires, then block 198 initializes a node count n, and then retrieves 200 best sector information S(n) towards node n, from a record 208 of best sectors. A sweep of communication beacons is performed 202 to node n on sectors S(n)±q. A check is then made 204 if any nodes still need to be checked (n<N). If there are nodes remaining, then the node value is updated 206 (e.g., n=n+1 in this example) to the next node and processing returns back to step 200 in retrieving best sector information. Once all nodes are checked then data exchange is performed 210 with peer mesh node and the process ends 212.

Figure 20:
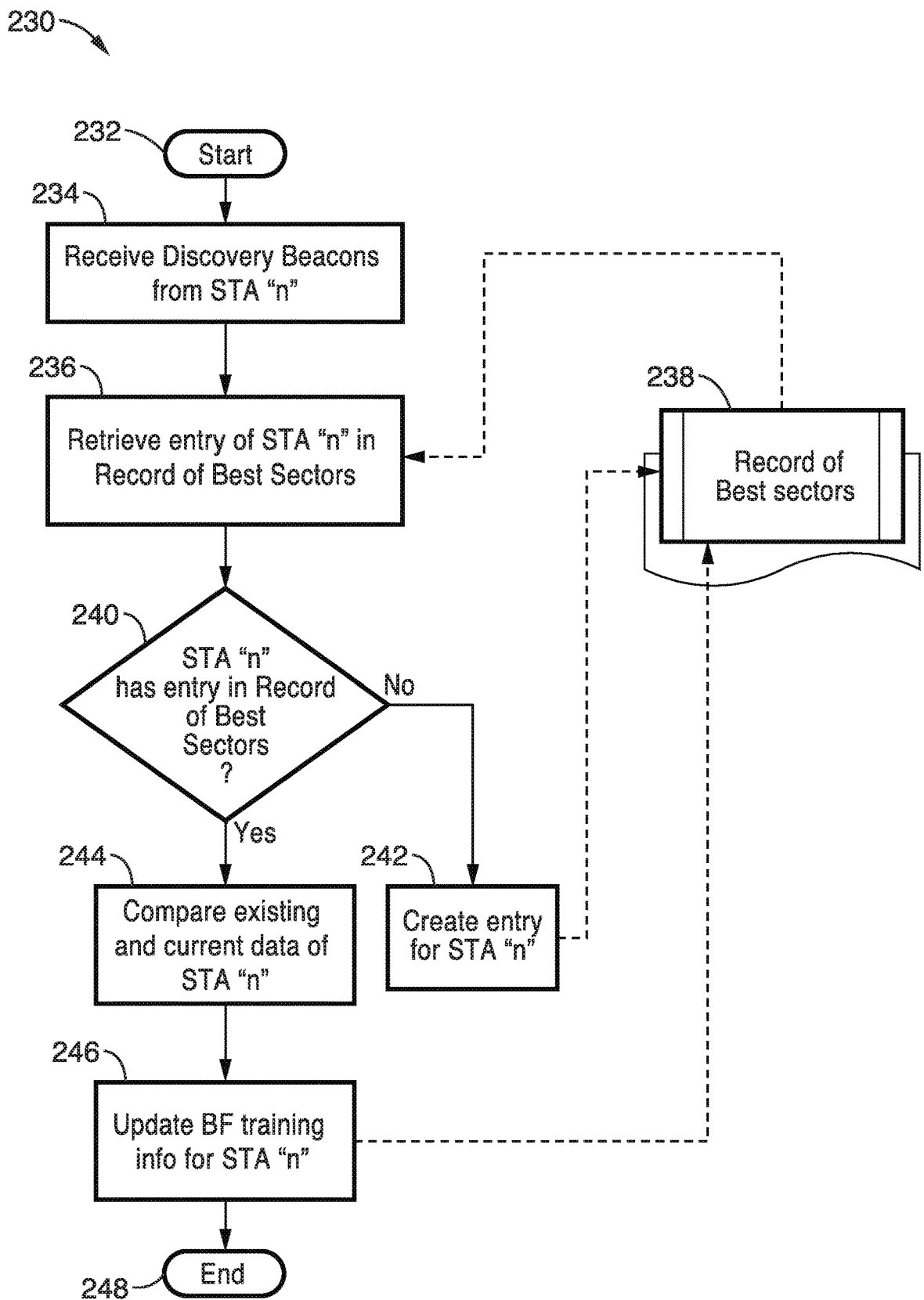
FIG. 20 is a flow diagram of training database creation and updates according to an embodiment of the present disclosure.

FIG. 20 illustrates an embodiment 230 of training database creation and updates. After a few beacon intervals (BIs), the BF training may need to be updated. The discovery beacons provide either the refresh cycle of the BF training or a BF training with a new peer node.

The process commences 232 with discovery beacons being received 234 from STA n, followed by retrieval 236 of an entry of STA n in a record of best sectors from record of best sectors 238. A check 240 is made to determine if STA n has an entry in the record of best sectors. If there is no such entry, then an entry is made 242 into the record of best sectors 238. Otherwise, if there is an existing entry, then the existing and current data are compared 244 and BF training information is updated 246 for STA n prior to the processing ending 248.

4.5. Steady State BM Handling Protocol 4.5.1. Master Beacon Switching

The network in steady state moves (rotates) the beacon masters among the network nodes, such as in a specific order according to at least one embodiment of the invention.

Figure 21:
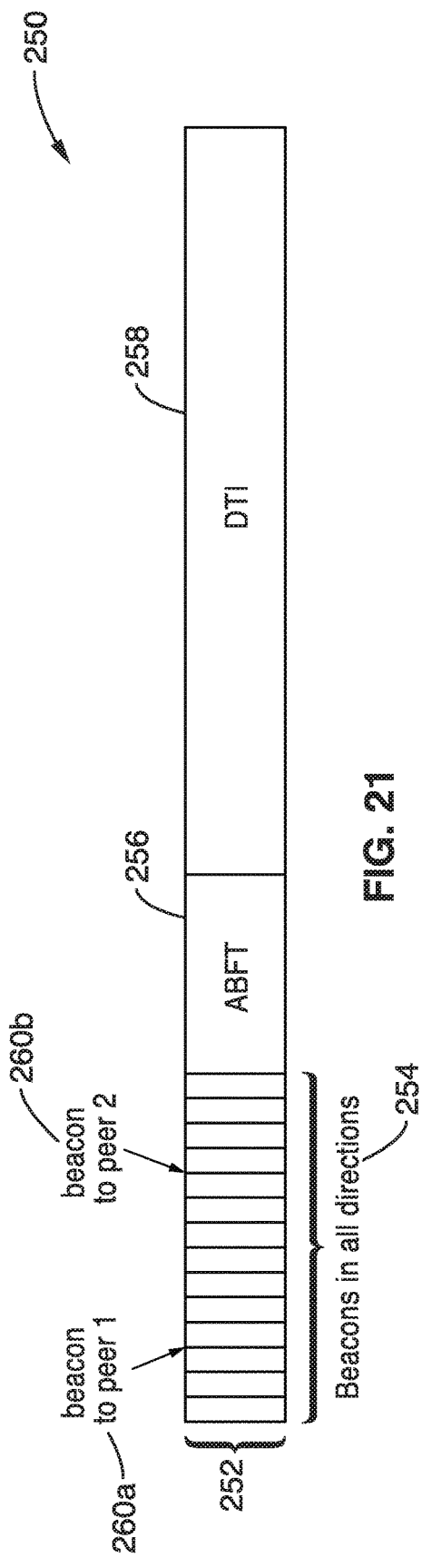
FIG. 21 is a communication period diagram showing a beacon master transmitting discovery beacons in all directions according to an embodiment of the present disclosure.

FIG. 21 illustrates an example embodiment 250 of transmissions 252, showing a beacon master transmitting discovery beacons in all directions 254, as well as peer beacon directions 260a, and 260b. In addition, transmission of Association-Beamforming Training period (A-BFT) 256 and Data Transfer Interval (DTI) 258 are shown.

Figure 22:
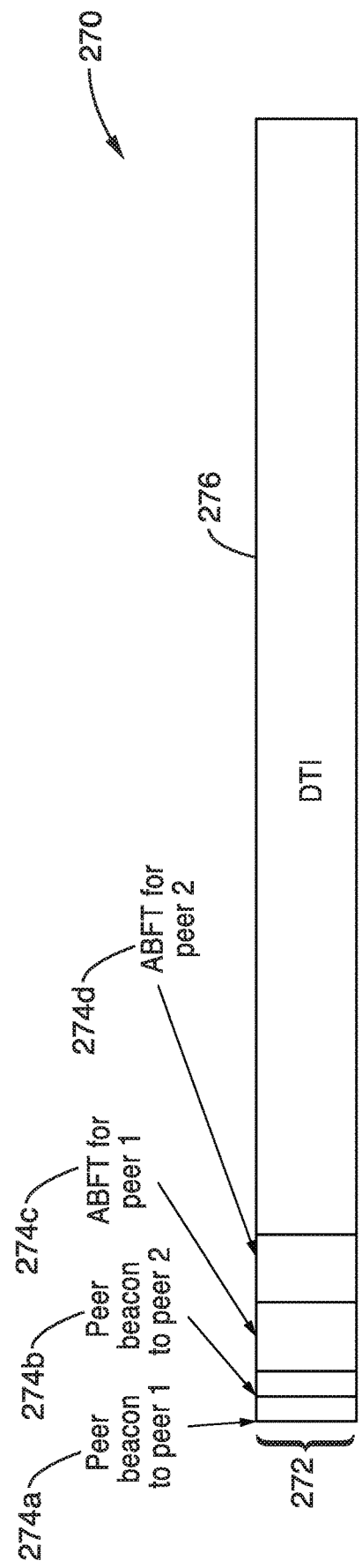
FIG. 22 is a communication period diagram showing a peer beacon superframe format according to an embodiment of the present disclosure.

FIG. 22 illustrates an example embodiment 270 of a peer beacon superframe format, showing a set of transmissions 272. Nodes with peer connectivity still continue to transmit peer beacons to each other. In this example a peer beacon is sent 274a to peer 1, and a peer beacon is sent 274b to peer 2. An A-BFT transmission 274c is sent for peer 1, as well as an A-BFT transmission 274d for peer2. A DTI transmission 276 is shown being sent after the A-BFT transmissions. It should be recognized that the peer beacons are easily coordinated since the direction and the timing is known for each peer link The system is configured in at least one embodiment, so that the order of switching peer beacons provides that all nodes at some time act as a beacon master. It should be appreciated, however, that embodiments are also contemplated which further control beacon master selection based on select criterion, or that apply incentives (e.g., network message priority) to those participating as beacon masters.

Peer beacons as well as discovery beacons carry information about the current beacon master node. Peer beacons as well as discovery beacons carry information about future beacon master(s). This information can be the ID of the next node to be a beacon master or a sequence ID that determines the coming beacon master assignment. Peer beacons carry information related to scheduling of transmission and other elements necessary for synchronizations and data transmission for this peer connectivity. Discovery beacons are simpler and are preferably (e.g., in one or more embodiments) only used for network announcement and discovery purposes. The A-BFT period for peer beacons will carry a number of A-BFT slots equal to the number of active peer links as was seen in FIG. 22. The A-BFT period of the discovery beacons carries a larger number of A-BFT slots with random access to these slots by peer nodes and new nodes.

4.5.2. Peer Beacons for Managing Master Beacon Switching

Figure 23A:
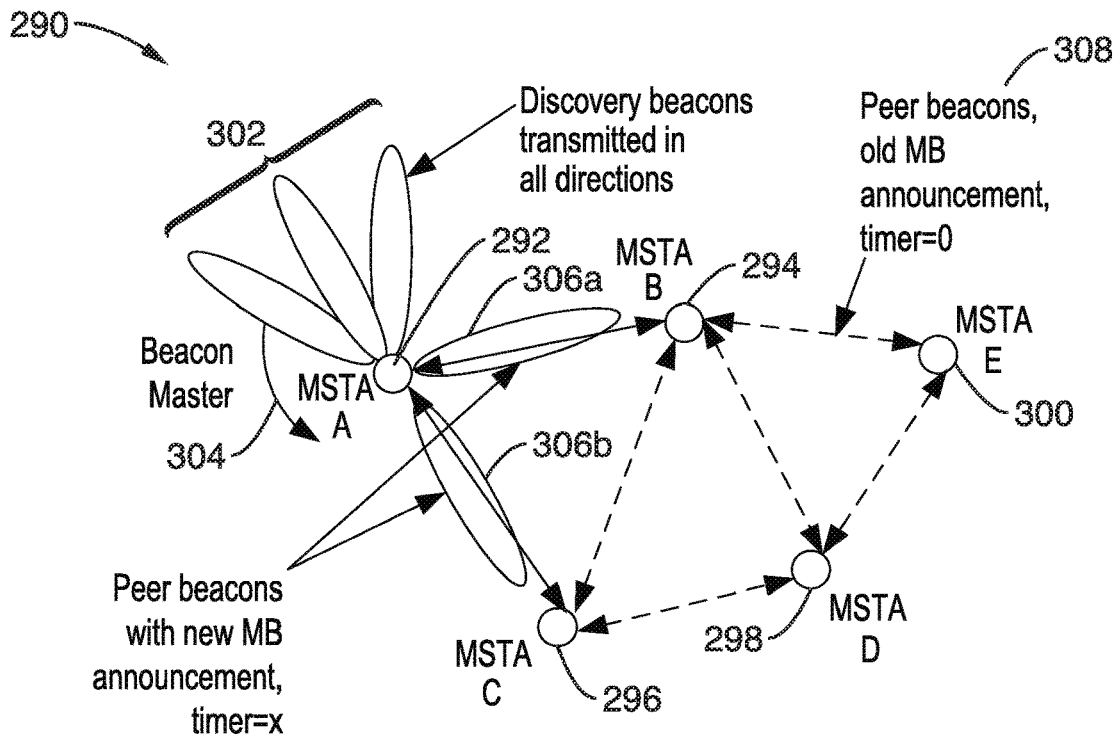
FIG. 23A through FIG. 23C are wireless node diagrams of master beacon forwarding and announcements performed according to an embodiment of the present disclosure.
Figure 23B:
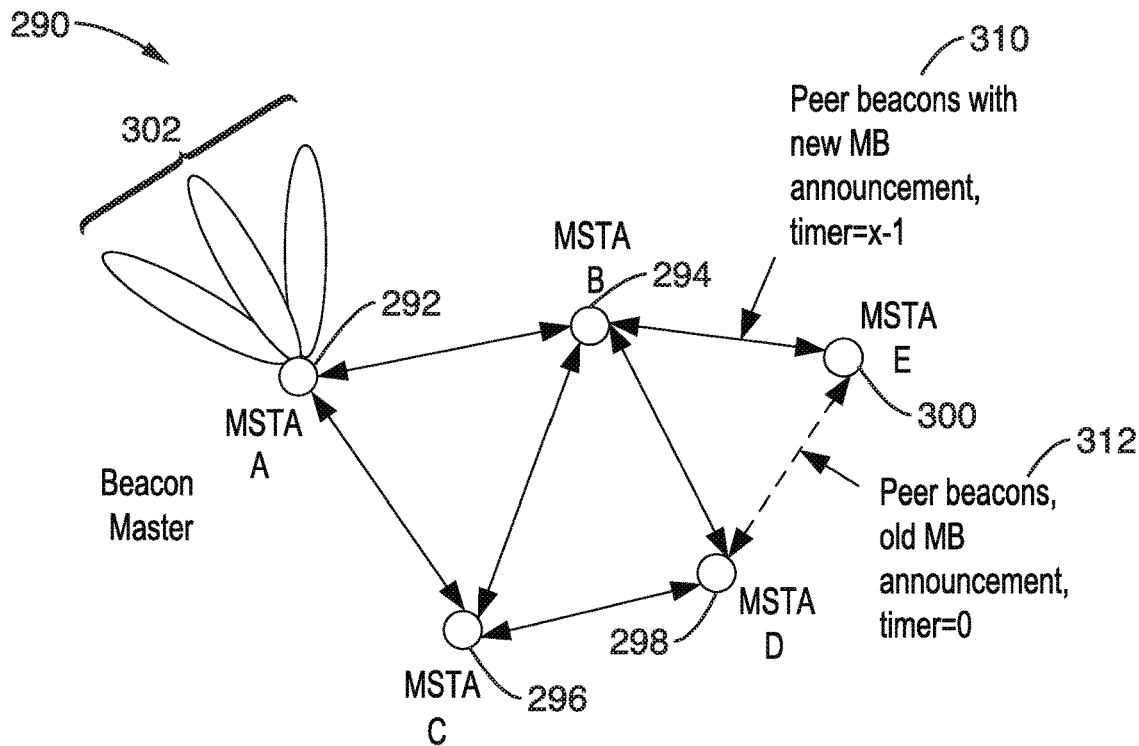
Figure 23C:
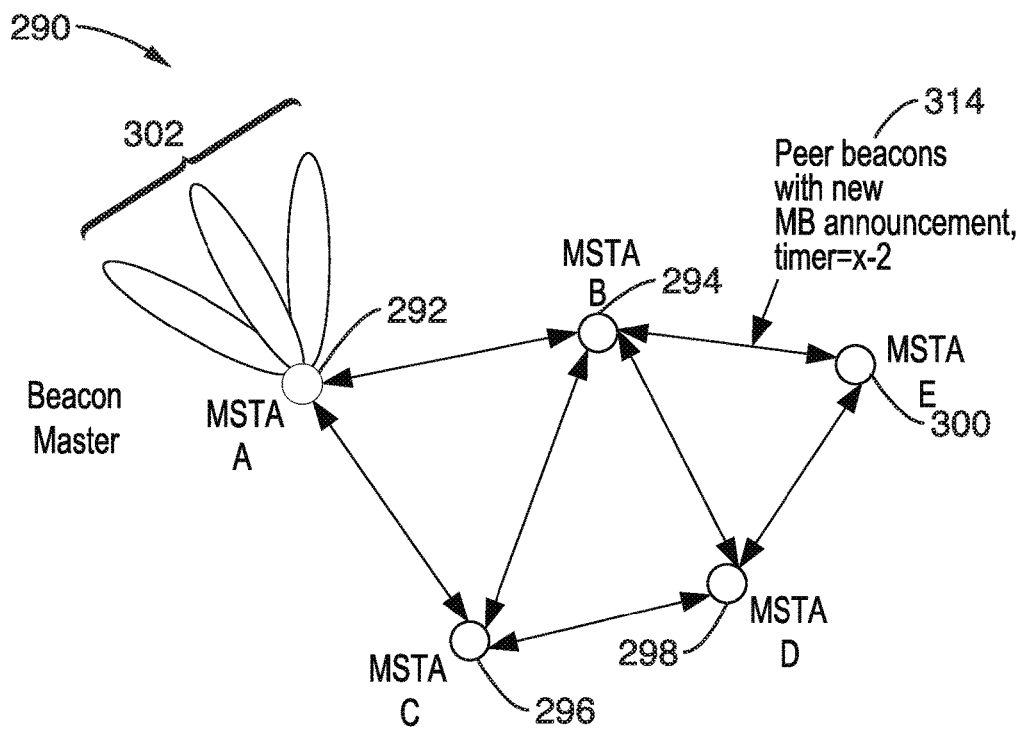

FIG. 23A through FIG. 23C depict nodes interacting in a process of forwarding the master beacon announcement through the network by peer beacons. Nodes are seen in the figures comprising MSTA A 292, MSTA B 294, MSTA C 296, MSTA D 298, MSTA E 300. In each figure MSTA A 292 is seen as the beacon master which is transmitting discovery beacons 302 in a sweep 304 of all directions.

Once a mesh node takes over the master beacon rule, it starts transmitting discovery beacons and peer beacons with its ID as current beacon master and information about the next beacon master, sequence ID or next beacon master. Peer beacons will be received by the nodes connected to the master beacon as an indication to the master beacon being active and starting its rule. Peers of the master beacon start transmitting peer beacons to other mesh nodes in the network announcing the new master beacon in the network. In FIG. 23A peer beacons 306a, 306b announce to MSTA B 294 and MSTA B 296, respectively, that a new beacon master is now active, and the timer setting. Each node receiving the peer beacons with the new master beacon announcement forwards it to its peers. In FIG. 23A an old MB announcement was communicated 308 from MSTA B 294 to MSTA E 300. After a specific number of hops the cluster should be informed of the new beacon master taking its rule. Until the mesh node receives announcement of new master beacon activation through one of its peers or the master beacon itself, it will keep transmitting the old master beacon ID and timer equal to zero. This is to indicate that the network is in transition state. FIG. 23B depicts the new MB announcement being communicated 310 from MSTA B 294 to MSTA E 300, while an old MB announcement 312 is seen communicated between MSTA E 300 and MSTA D 298. In FIG. 23C a new MB announcement is seen communicated 314 from MSTA B 294 to MSTA E 300, with time BM time value having been decremented twice.

4.5.3. New Master Beacon Selection Criterion

In this embodiment, the nodes of the network alternate which one fulfills the role of beacon master for each master beacon interval. At each master beacon interval one node takes the role of the beacon master and transmits discovery beacons in all directions.

Figure 24A:
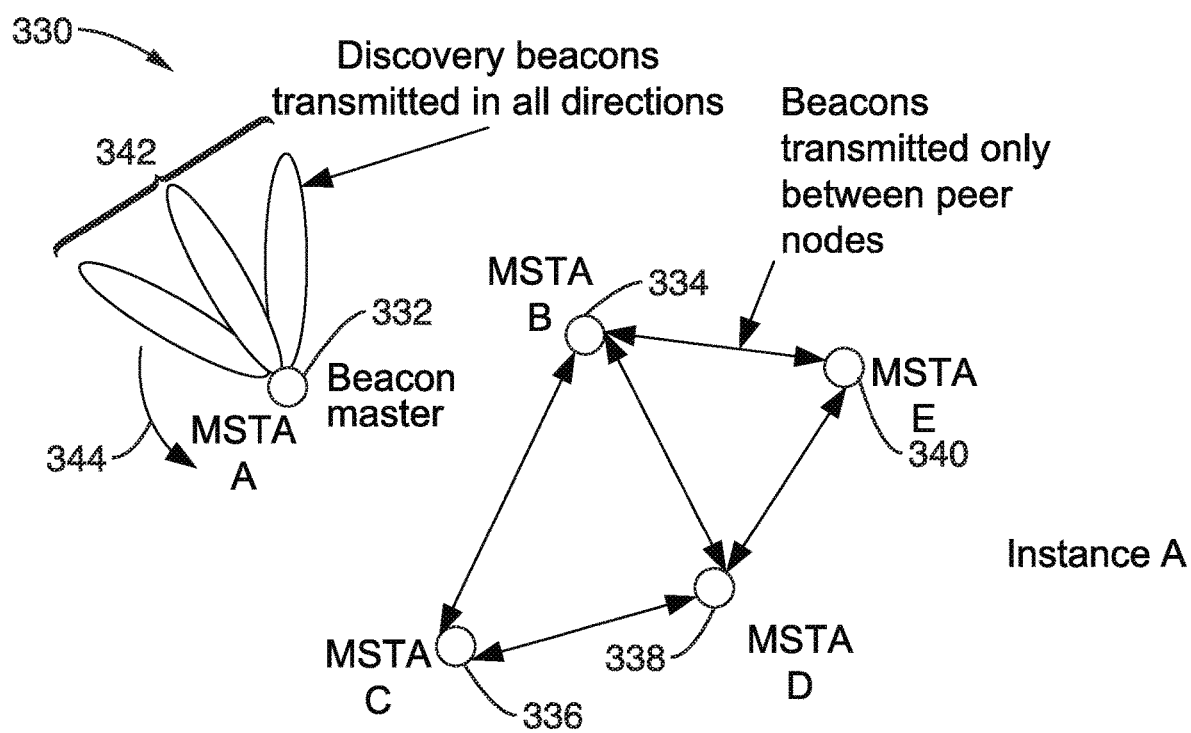
FIG. 24A through FIG. 24C are wireless node diagrams of different nodes taking on the beacon master role according to an embodiment of the present disclosure.
Figure 24B:
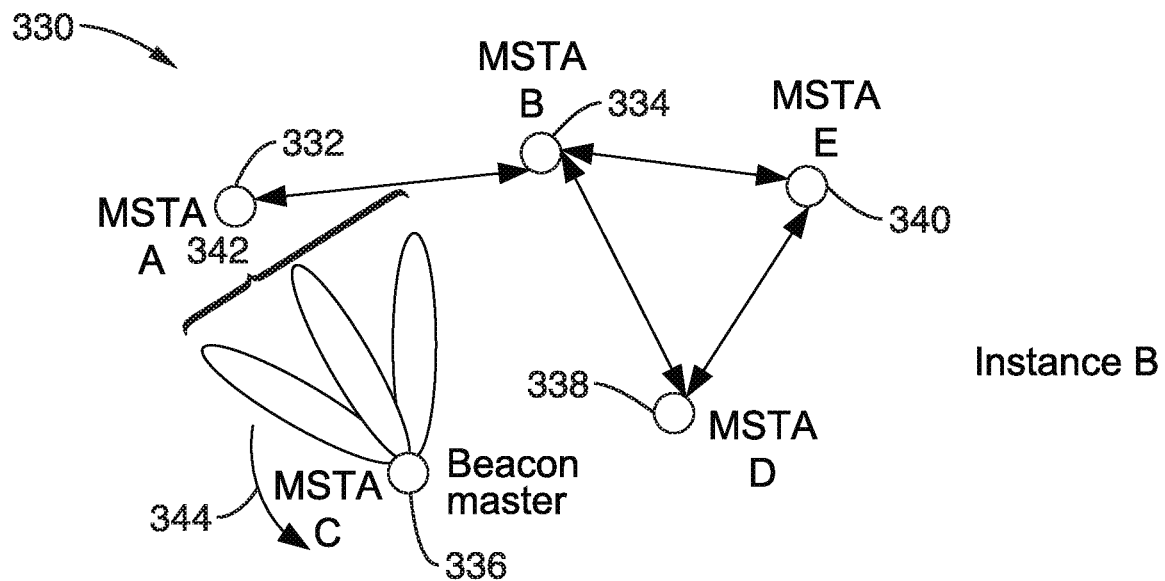
Figure 24C:
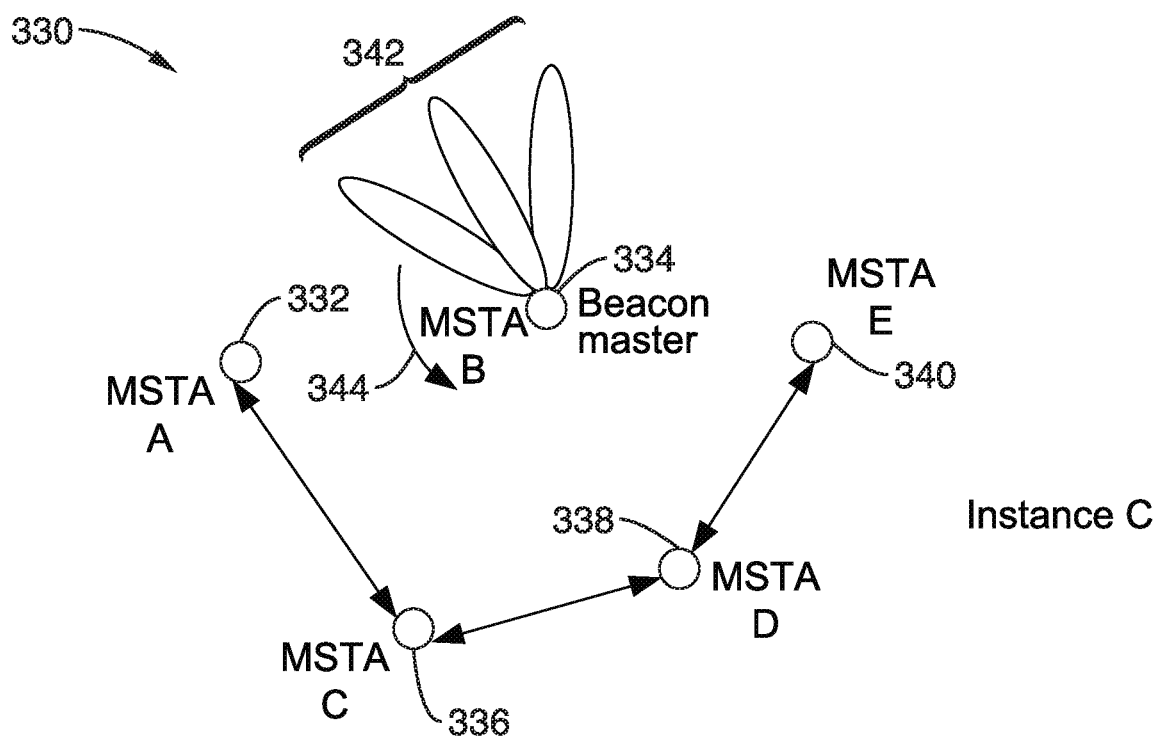

FIG. 24A through FIG. 24C illustrate an example embodiment 330 of different nodes taking the role of master beacon. Nodes are seen in the figures comprising MSTA A 332, MSTA B 334, MSTA C 336, MSTA D 338, MSTA E 340. In FIG. 24A MSTA A 332 is the beacon master transmitting discovery beacons 342 in a sweep 344 of all directions. The other nodes B, C, D and E are seen transmitting peer beacons only between the peer nodes. In FIG. 24B MSTA C 336 has become the beacon master and is transmitting discovery beacons 342 in a sweep 344 of all directions, and similarly in FIG. 24C MSTA B 334 assumes the beacon master role. The master beacon announces through the peer beacons and the discovery beacon information about current and future beacon master as well as timing for transmission. The order over which the master beacon changes can be determined in any desired manner, such as random or according to a specific sequence, according to availability, or other criterion for each given node. However, it should be considered that if nodes can always "opt out" in any way, then sharing would be inequitable or worse no beacon master may be available. Whereby in at least one embodiment of the present disclosure, if mechanisms allow nodes to "opt out" of fulfilling the beacon master role, then incentives are provided to nodes which are participating, such as given them a commensurate priority of communications over the non-participating nodes.

FIG. 25A through FIG. 25E illustrate an example embodiment 350 of master beacon outage handling, which will be described in detail at the end of the next section.

4.5.3.1. Random Master Beacon Assignment

Figure 26A:
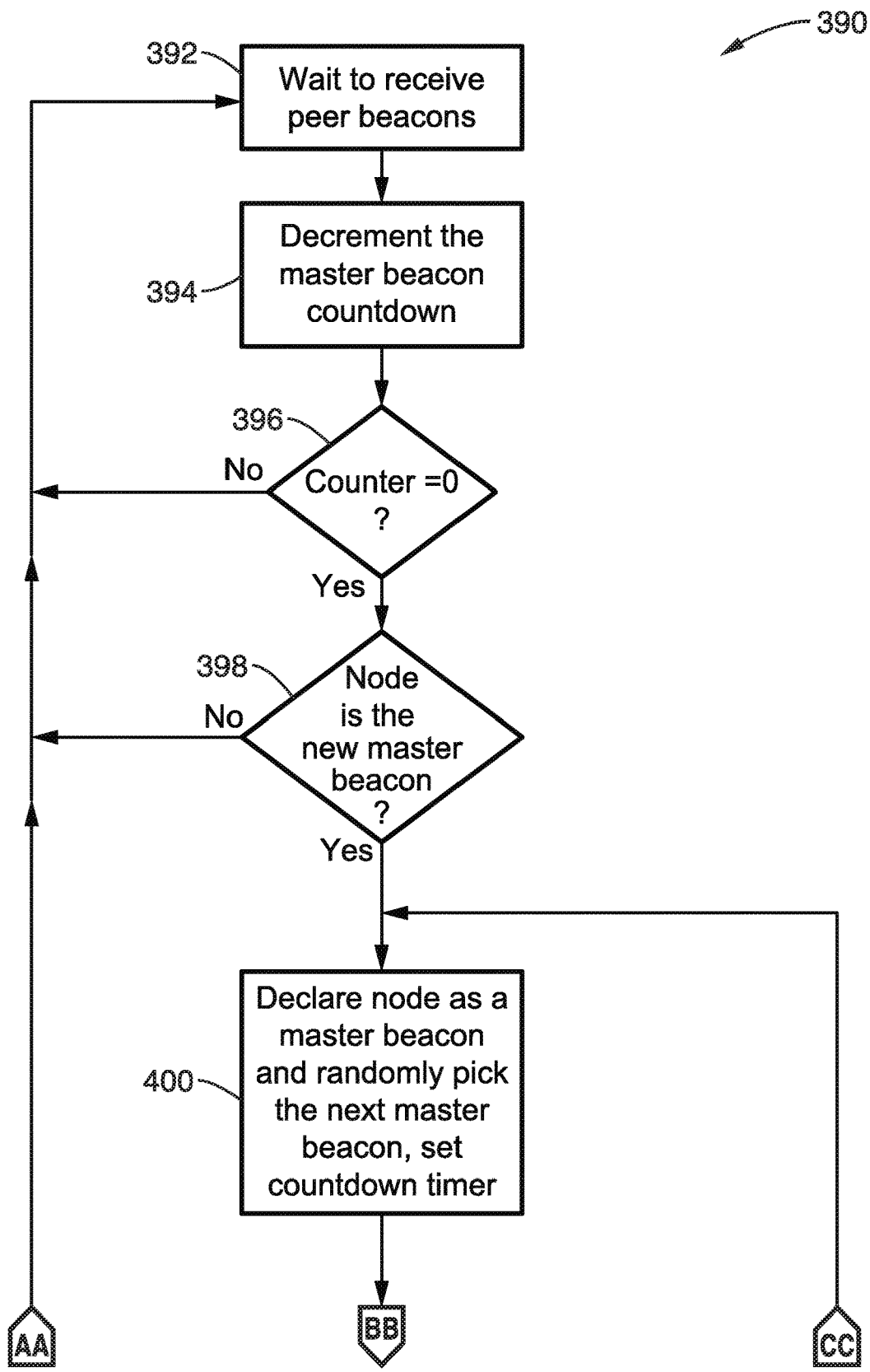
FIG. 26A and FIG. 26B is a flow diagram of random master beacon selection according to an embodiment of the present disclosure.
Figure 26B:
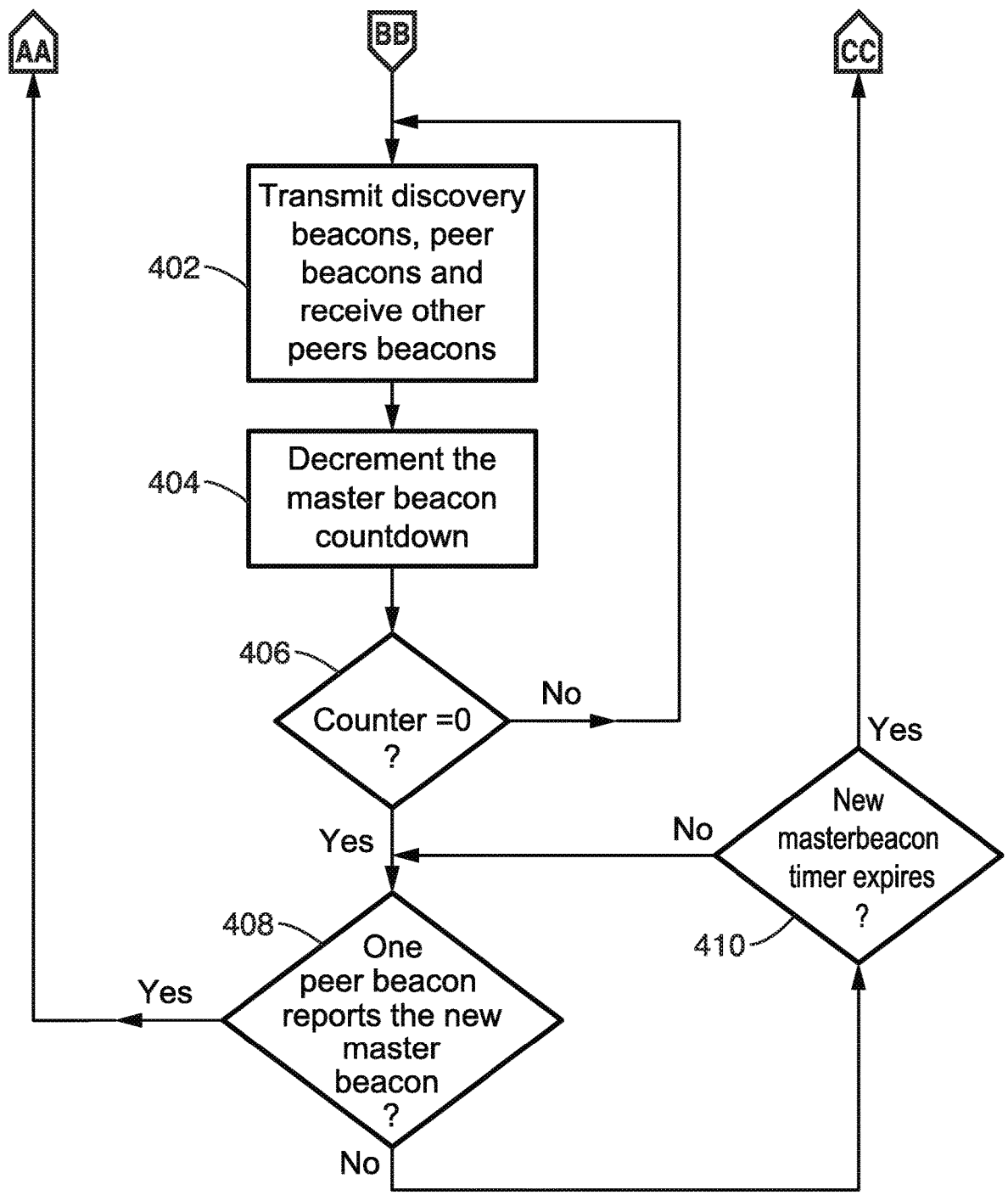

FIG. 26A and FIG. 26B illustrate an example embodiment 390 of a protocol for deploying random master beacon selection. The routine starts with waiting 392 in FIG. 26A to receive peer beacons, then modifying a master beacon selection variable, depicted here by decrementing 394 a master beacon countdown value, followed by the check if the value has reached zero, indicating that checked new master beacon should be active. If the current master beacon is still active, then execution returns to block 392. Otherwise a check 398 is made to determine if the node is the new master beacon, based on checking what node the last beacon master previously communicated as being the next (successor) beacon master. If it is not the new master beacon, then execution returns to block 392 awaiting to receive peer beacons. Otherwise, if the node is to be the new master beacon, then the node declares itself as a master beacon, and picks the following master beacon, here exemplified by using a random pick 400 and setting a countdown timer. It will be appreciated that in at least one embodiment the next master beacon can be selected using other mechanisms beside random selection.

Continuing in FIG. 26B, the master beacon performs its duties 402, including transmitting discovery beacons and peer activities including transmitting peer beacons and receiving other peer beacons, followed by updating 404 the master beacon countdown, such as by decrementing it as per this example. A check is made 406 if the master beacon serving period is over (is master beacon counter=0), and if not, then execution returns to block 402 with the current master beacon still performing its duties. Otherwise, block 408 performs a check, if one peer beacon reports the new master beacon. If the one peer beacon reports the new master beacon, then execution returns to the beginning of the routine at block 392 in FIG. 26A, otherwise decision block 410 is reached to check if the new master beacon timer has expired. If the time has expired, then execution returns to block 400 in FIG. 26A, in which the node declares itself the beacon master again and chooses a successor master beacon. Otherwise, if the timer has not expired, then execution returns to decision block 408 to check again.

Therefore, the above flow diagram shows the process of the current master beacon deciding which node is to be the next master beacon. Each mesh node has a list of the other mesh nodes it can reach out to through one or more hops. In this example the selection of the next master beacon is happening randomly from the list of the reachable nodes. The current master beacon forwards information regarding the current and the future master beacon through peer beacons and discovery beacons to all mesh nodes in the network. The current master beacons have a countdown field to indicate when it will stop transmitting the discovery beacons and when the new master beacon should start. Each node receiving a peer beacon from the master beacon will decrement the countdown timer and forward the updated countdown value to its peers, the current beacon master ID and the next beacon master information to its peers through its peer beacons. This will insure that the information propagates through the whole network.

The countdown timer should be synchronized across the whole network. Every node should adapt the count down with respect to a fixed time where the counter should be decremented if it passes that time. This is configured for solving the problem when more than one BI are used across the mesh network. If all the mesh nodes has the same BI, each node should just decrement its countdown timer with each beacon transmission. When the counter reaches zero, the current master beacon stops transmitting discovery beacons and assumes that the new master beacon will take over.

4.5.3.1.1. Managing New Master Beacon Outage

The new master beacon should start transmitting discovery beacons and sending peer beacons stating the rule of the master beacon in the sent beacons. Other nodes in the network will keep transmitting peer beacons with master beacon ID of the one that concluded its task, with countdown timer equals to zero until a new master beacon with new timer announcement is received through the new master beacon or one peer node.

The master beacon that concluded its task will wait on receiving a sign of the new beacon master taking over. This should be through receiving a peer beacon from one of its peer nodes stating the current master beacon as the one selected previously by the master beacon that concluded its task.

In FIG. 25A through FIG. 25E the process 350 is outlined for the case when the master beacon, having concluded its task, did not receive any indication of the new master beacon starting its task. Thus, the original master beacon will again claim the master beacon role for another master beacon cycle, and pick a new node to be the next master beacon.

Figure 25A:
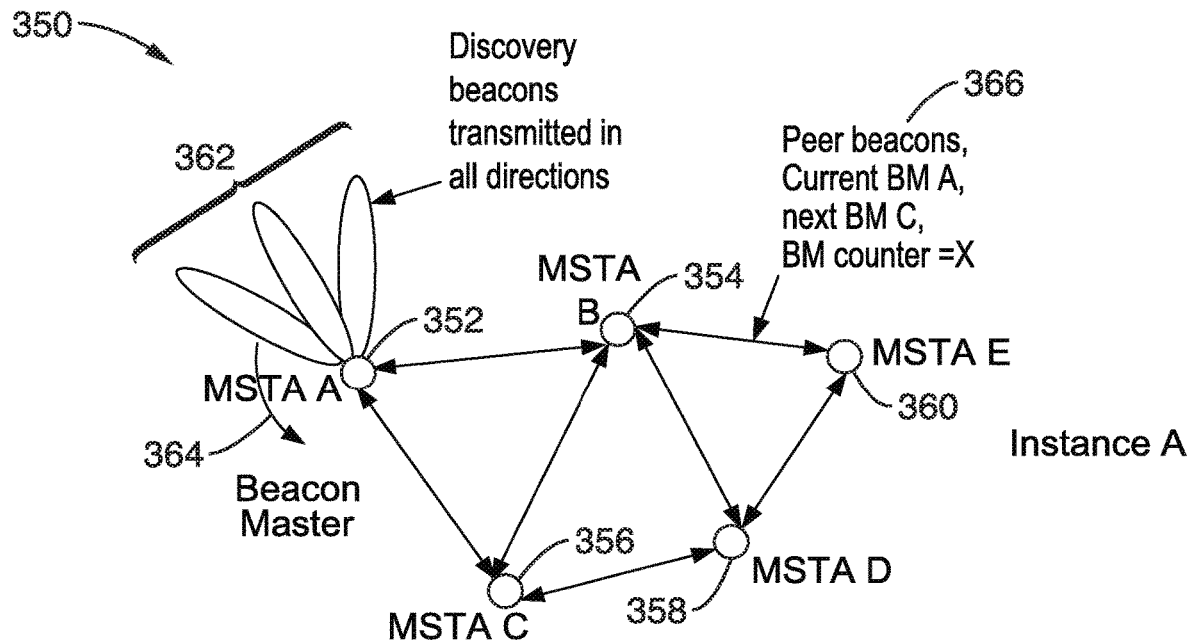
FIG. 25A through FIG. 25E are wireless node diagrams of master beacon outage handling according to an embodiment of the present disclosure.
Figure 25B:
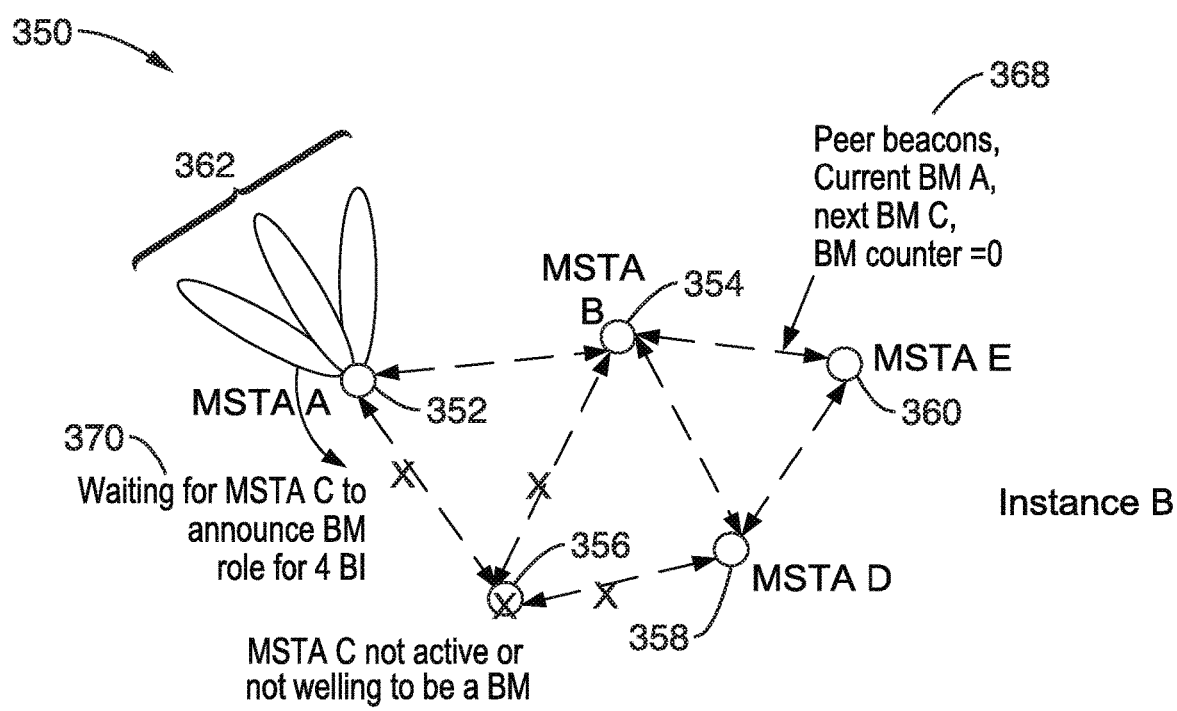
Figure 25C:
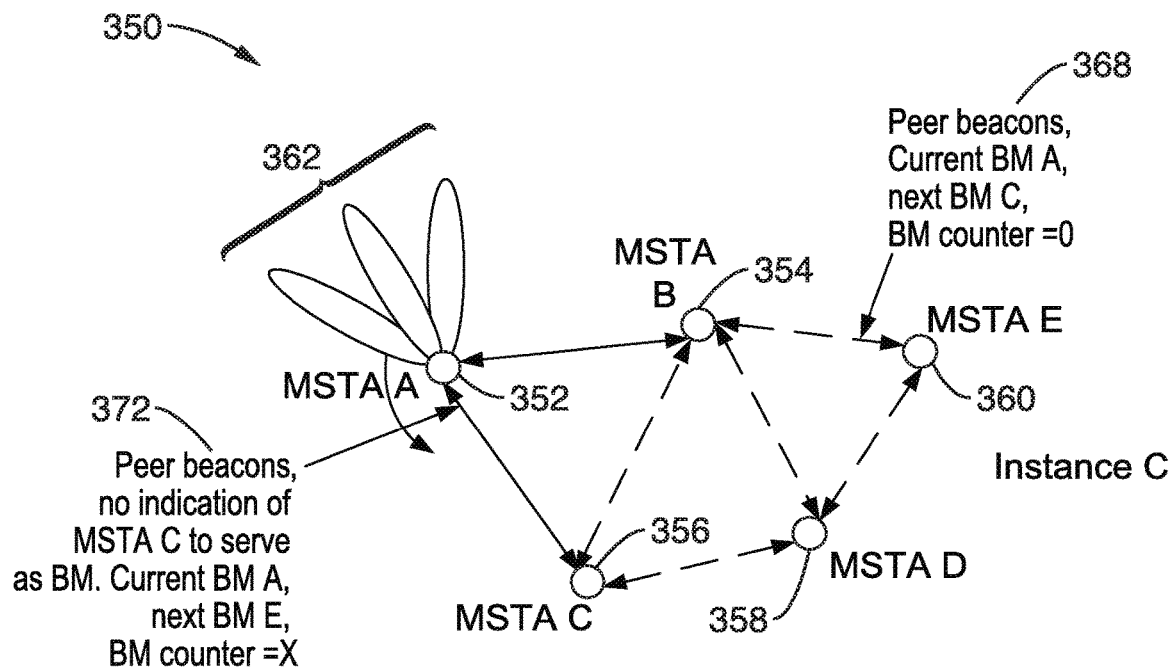
Figure 25D:
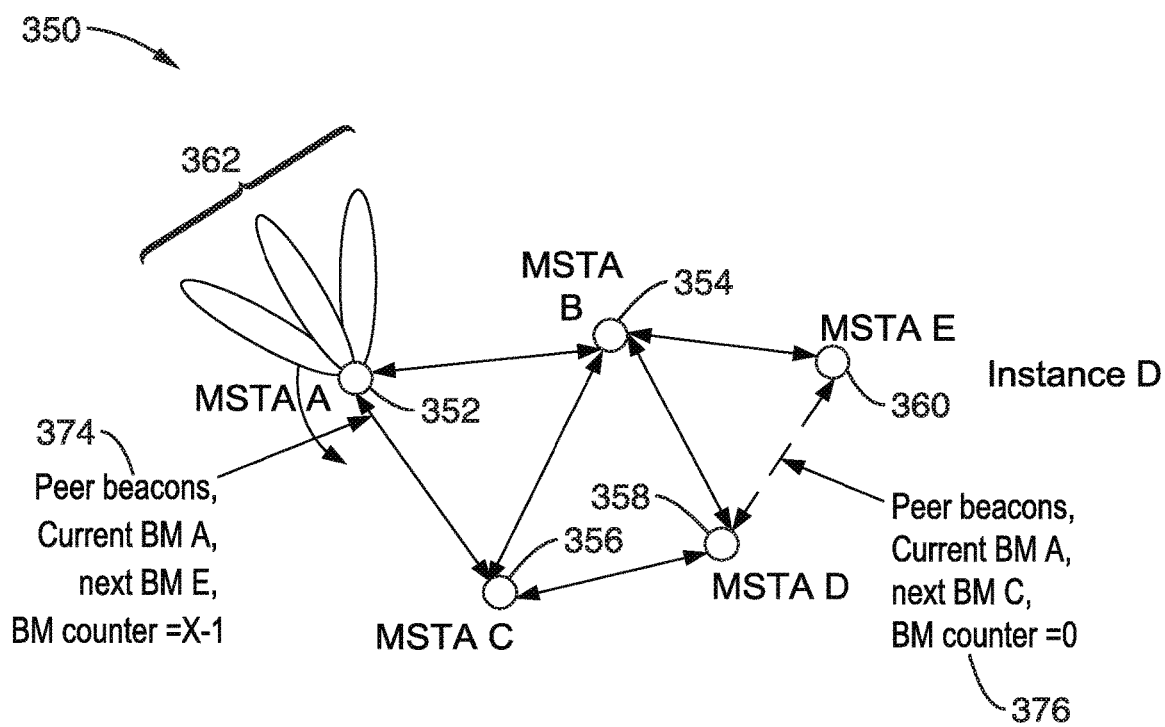
Figure 25E:
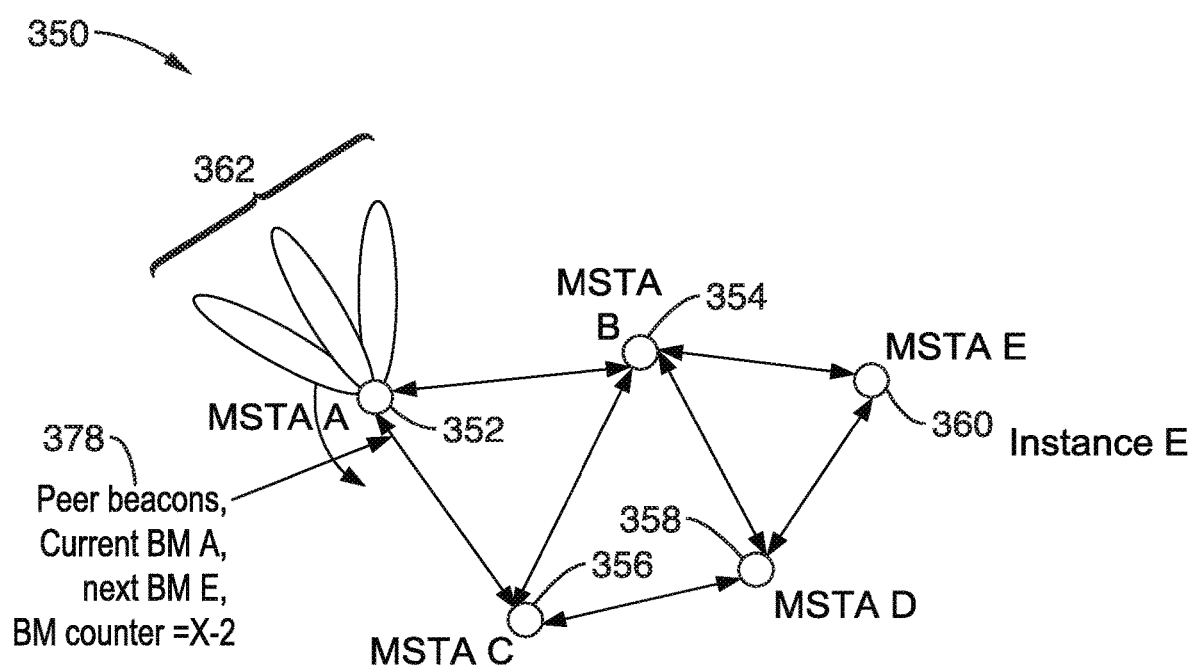

In the figures nodes MSTA A 352, MSTA B 354, MSTA C 356, MSTA D 358 and MSTA E 360, are shown connecting with one another, In FIG. 25A MSTA A 352 is the beacon master transmitting discovery beacons in all relevant directions 362 in a sweep 364. Peer beacons 366 provide information on the current beacon master (BM) which is MSTA A, next beacon master A which is exemplified as being MSTA C 356, and BM counter=x. In FIG. 25B, the peer beacons 368 indicate that BM counter has reached 0, and MSTA A 352 is waiting 370 for MSTA C 356 to start acting as a beacon master. However, in this instance the communication links to MSTA C are broken, or MSTA C is not active or willing to fulfill the BM role. In FIG. 25C, the nodes MSTA B, MSTA C, MSTA D, and MSTA E, still are sending peer beacons 368 indicating that the BM counter is 0 for MSTA C to fulfill the BM role. Then upon timing out waiting for MSTA C to take the BM role, the current BM then steps in 372 to continue fulfilling the BM role and it sends peer beacons indicating the next BM to be MSTA E and send a counter=x. In FIG. 25D, distant peer beacons 376 still indicate that BM counter=0 awaiting MSTA C as BM, but MSTA A has taken the BM role 374 and is sending a peer beacon indicating next BM as MSTA E, and decrementing the BM counter. In FIG. 25E the peer beacons have propagated throughout the network, and currently the peer beacons 378 from MSTA A 352 indicate next BM as MSTA E and BM counter updated to x-2.

4.5.3.1.2. Beacon Master Selection Update Element

Upon adding a new node to the network, the selection list in each mesh node is updated to allow for this new node to be selected at some point to serve as a beacon master. The master beacon can add the node to the list by a message flooding the network stating an update to the mesh nodes list. The node software (protocol) can also perform this by forcing the latest master beacon helping the new node to pick the new node to serve as the master beacon right after it is admitted into the network. Nodes will notice the new node serving as a beacon master and should update their mesh node list.

When a node leaves the network, the selection list in each mesh node is updated to remove this new node from the list and thus not to be selected at some point to serve as a beacon master. This removal of a node can be performed using message flooding of the network stating an update to the mesh nodes list or distributed by monitoring the behavior of nodes in the network. If a node is not capable of serving as a beacon master for a number of discovery service periods, it will be removed from the list.

4.5.3.2. Sequence Based Master Beacon Assignment

Figure 27A:
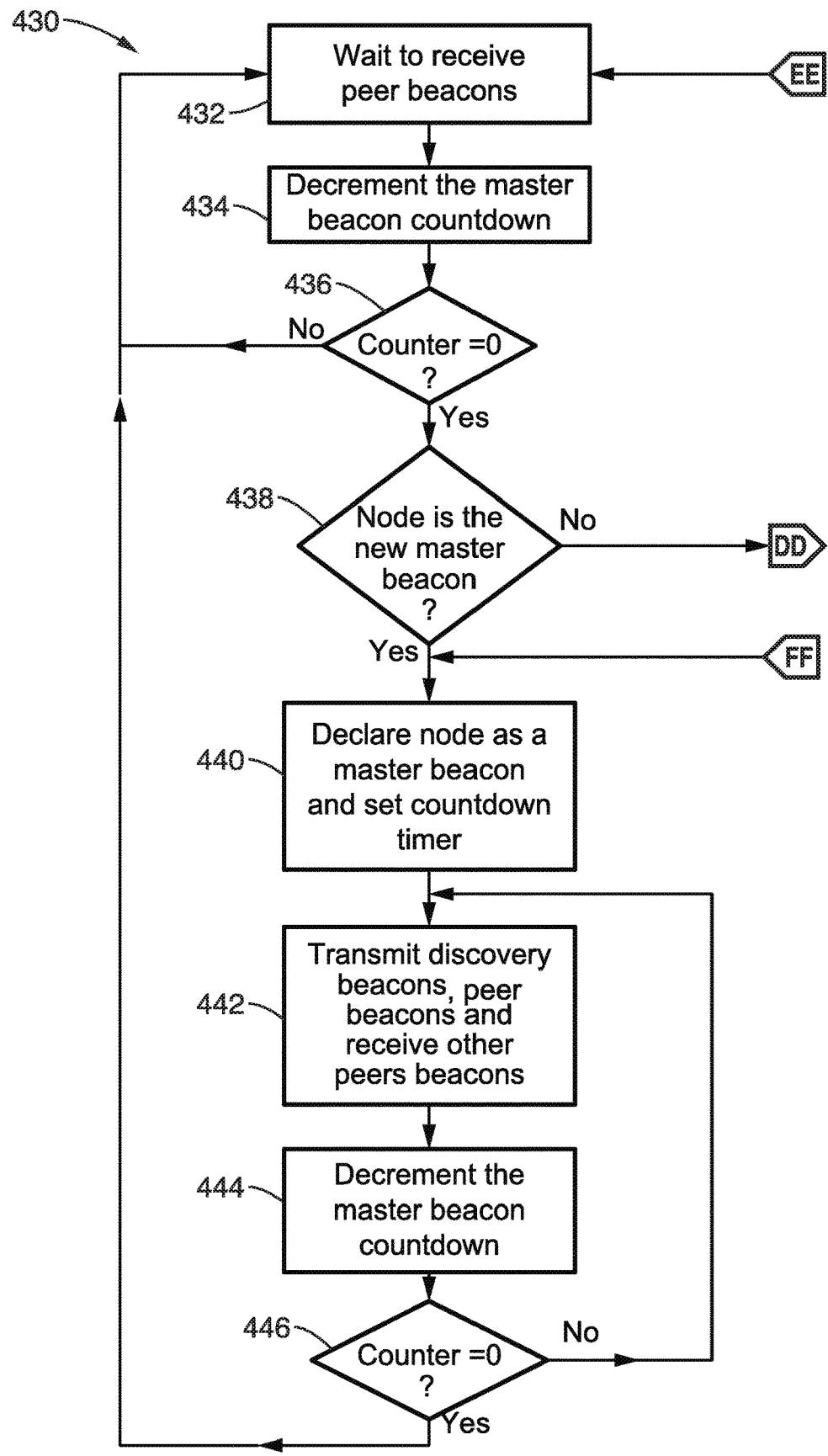
FIG. 27A and FIG. 27B is a flow diagram of sequence based master beacon selection according to an embodiment of the present disclosure.
Figure 27B:
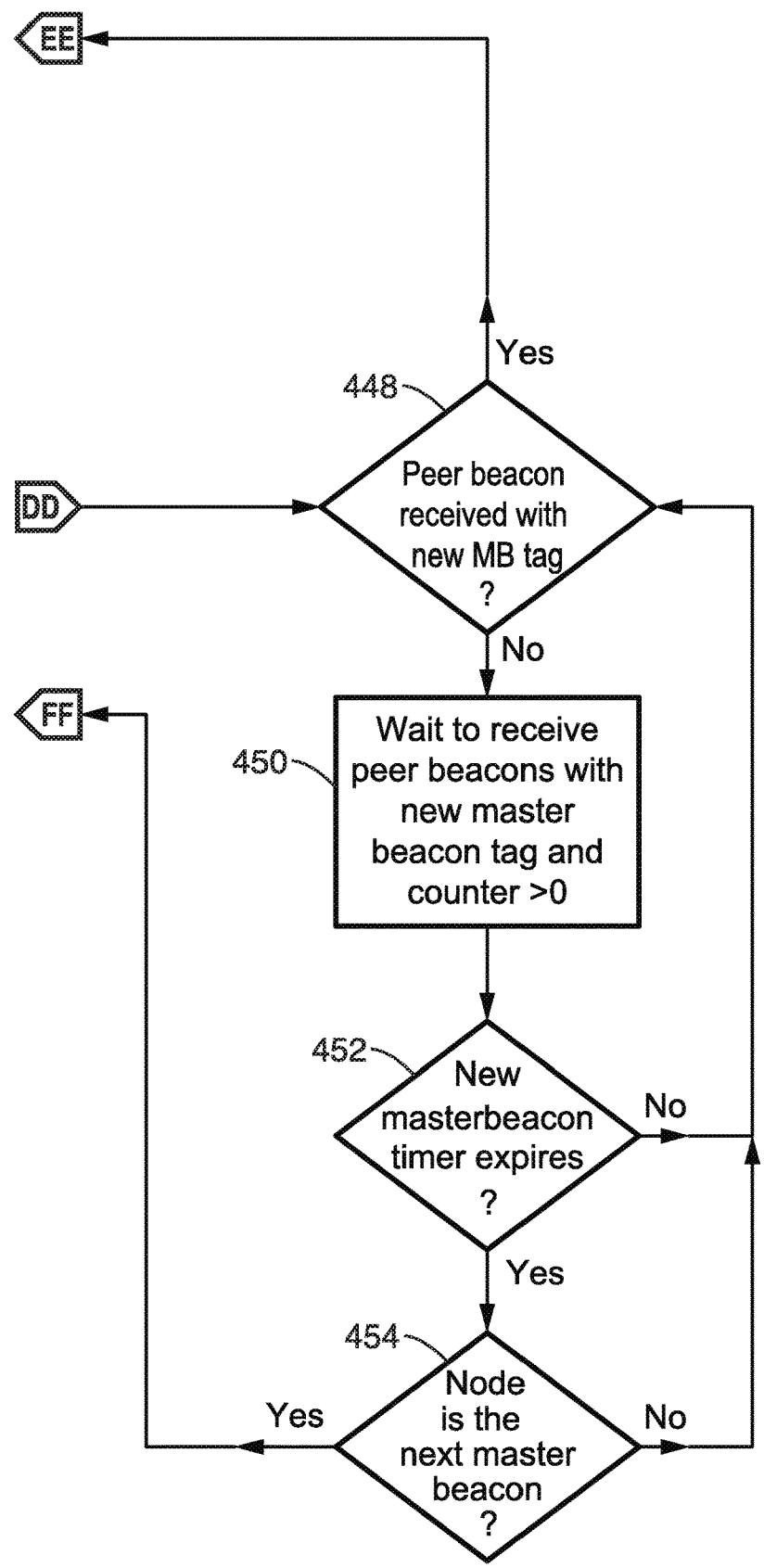

FIG. 27A and FIG. 27B illustrate an example embodiment 430 of a protocol (process) for deploying a sequence based master beacon selection. A sequence determines the order of the nodes switching the role of beacon master is built and updated each time a new mesh node is joining. The routine commences 432 with awaiting to receive peer beacons, after which the master beacon counter is updated 434 (decremented by way of the example shown), and a counter threshold check 436 performed to determine if the counter has reached a terminal value, in this case zero. If the terminal count has not been reached, then execution returns to waiting at block 432. Otherwise, if the count has expired, then a check 438 is made if the node is the new master beacon. If it is not the master beacon, then execution moves to block 448 in FIG. 27B. If it is the master beacon, then the node is declared 440 as a master beacon and a counter set for its duration as the master, followed by performing master beacon duties 442, exemplified with transmitting discovery beacons, along with its peer duties in transmitting peer beacons, and receiving peer beacons. The master beacon counter is then updated 444, counted down in this example, and a check made 446 if the end of the count has been reached, which in this example is when it equals zero. If the end of the count has been reached then execution moves back to block 432, otherwise execution returns to performing another round of master beacon duties 442. From block 448 in FIG. 27B, it is seen that a check is made to determine if a peer beacon has been received with a new MB tag. If a new MB tag was received, then execution returns to waiting at block 432 in FIG. 27A, otherwise a wait is performed 450 to receive peer beacons with a new master beacon tag and a non-terminal (non-zero in this example) counter. A check is then made 452 for time expiration on the new master beacon timer. If the new master beacon timer has not expired, then execution returns to block 448 in checking for a peer beacon with a new MB tag, otherwise execution moves to check 454 if the node is the next master beacon after the failed one. If the node is not the new master beacon, then execution returns to block 448 in checking for a peer beacon with a new MB tag. Otherwise the mode is the new beacon master and execution returns to block 440 in which the node declares itself as the new master beacon, and starts processing as such.

It will be noted that each time a new node joins the network, the current master beacon is responsible for updating the sequence and informing the network mesh nodes about that update. Once each node is aware of the sequence and the current active beacon master, it will be able to know the next beacon master and when its turn will arise. A BM count is forwarded by the mesh nodes to mark the beginning and the start of a beacon master discovery period.

The BM counter, in this example a countdown timer, in at least one embodiment is synchronized across the whole network. Every node should adapt the count down with respect to a fixed time where the counter should be decremented if it passes that time. This should solve the problem when more than one BI are used across the mesh network. If all the mesh nodes have the same BI, each node should just decrement its countdown timer with each beacon transmission.

Once the timer reaches its terminal condition, such as zero in the example shown, mesh nodes know that the new beacon master is taking over. If the mesh node is the new beacon master it starts transmitting discovery beacons and sets the BM counter value. The current master beacon forwards information regarding the current and the future master beacon through peer beacons and discovery beacons to all mesh nodes in the network. The beacon sent by the current master beacon has a counter field to indicate when it will stop transmitting the discovery beacons and when the new master beacon should start.

Each node receiving a peer beacon from the master beacon modified the BM counter toward a terminal value, such as decrementing the countdown timer, and forwards the updated BM counter value to its peers, along with the current beacon master ID and the sequence ID through its peer beacons to insure that this necessary information propagates through the whole network. The new master beacon starts transmitting discovery beacons and sending peer beacons stating the rule of the master beacon in the sent beacons.

4.5.3.2.1. Managing New Master Beacon Outage

If after some waiting time the new Master Beacon did not start its role, the next master beacon in the sequence should take over and claim the master beacon rule, set the counter and start informing the mesh nodes.

4.5.3.2.2. Beacon Management Hopping Sequence Update Element

The beacon master is responsible for updating the sequence of the beacon master nodes. The update should be a result of a new node joining the network or a node leaving the network. The distributed information can be in the form of a sequence ID that is associated with a sequence. Each node should be capable of knowing its location in that sequence.

4.5.4. Triggering Discovery Beacons Transmission

One way of implementing the discovery beacon is to trigger it whenever there is a new event in the network. This means that the transmission of the discovery beacons does not have to be periodic. This event can be a new node sending a probe request that was received by one mesh node, a mesh node losing connection, or any other event that requires full sweep of the beacon or similar frame in all directions for discovery and beamforming reasons. This event might trigger one or more mesh nodes transmitting discovery beacons.

4.6. Discovery Mesh Map

Mesh nodes listen during the no activity periods (no transmission or reception) and scan for new nodes trying to join the network. Nodes can listen in quasi-Omni directional mode to be able to scan all direction at the same time, although the range is limited. To Increase the range of the mesh node scanning for new nodes, directional antenna operations are then selected by the system in at least one embodiment. Typically, using the directional antennas involves a process of each node scanning all directions.

However, if the node topology comprises a dense network deployment, then node coverages will likely overlap, and at least one embodiment of the present disclosure then performs coordination of areas where each node is to perform scanning for new nodes, thus covering a geographic area more efficiently.

Figure 28:
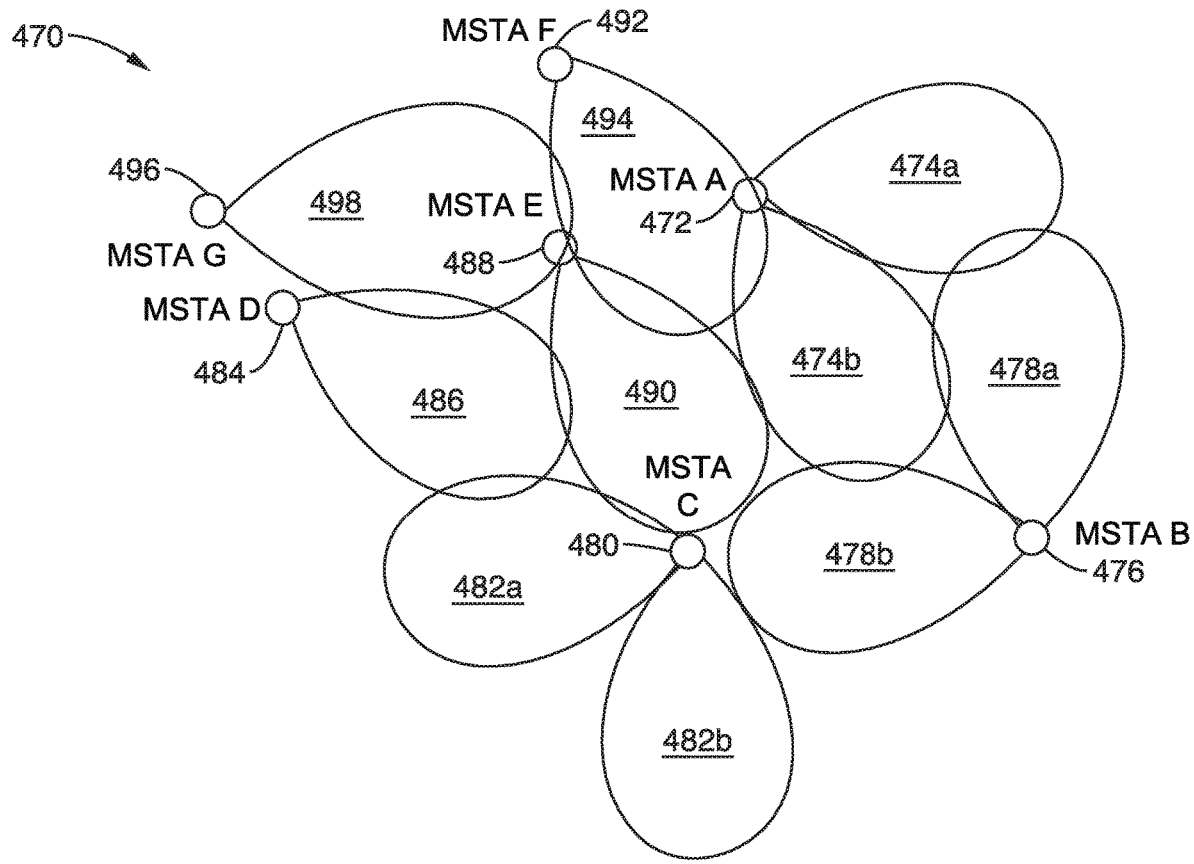
FIG. 28 is an antenna pattern map showing a coverage area of a coverage area in response to cooperation between nodes according to an embodiment of the present disclosure.

FIG. 28 illustrates an example embodiment 470, in which each node is given responsibility for one or more specific direction(s) which it will continuously and solely monitor whenever the node is not transmitting or receiving. This will help in focusing the time the node is available in one direction instead of distributing it in all directions. In this example, a discovery map is cooperatively created by the nodes (in which each node is allocated one or more specific directions to monitor and scan. The discovery map can be generated using measurement campaign collection, topology information of the network or some antenna pattern analysis.

In the example shown in FIG. 28, example mesh node MSTA A 472 is shown assigned area 474*a* and 474*b*, mesh node MSTA B 476 is shown assigned area 478*a* and 478*b*, mesh node MSTA C 480 is shown assigned area 482*a* and 482*b*, mesh node MSTA D 484 is shown assigned area 486, mesh node MSTA E 488 is shown assigned area 490, mesh node MSTA F 492 is shown assigned area 494, and mesh node MSTA G 496 is shown assigned area 498. Thus, each mesh node is responsible for a specific area (direction) to scan whenever it is engaged in any other transmission or reception with other nodes in its network.

In at least one embodiment of the present disclosure, the analytical cell planning is based on estimating at each area what the potential mesh nodes are that cover this area and select one to be dedicated to this area. A simple distributed way of deciding on coverage area of sectors is by allowing sectors that are in line of sight and can listen to each other's transmissions to shut off one of them and consider the other one to be capable of reaching out to all its coverage area.

Figure 29A:
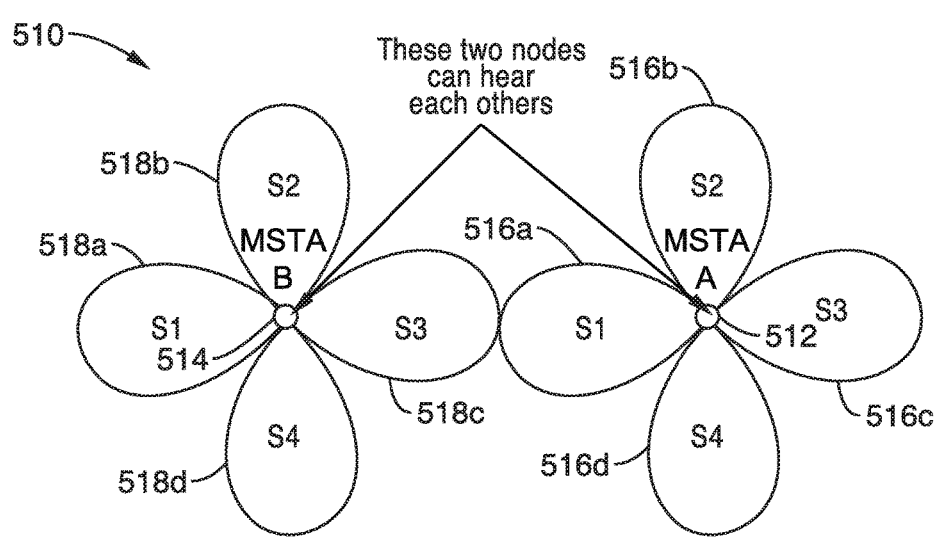
FIG. 29A through FIG. 29C are node sector coverage diagrams utilized according to an embodiment of the present disclosure.
Figure 29B:
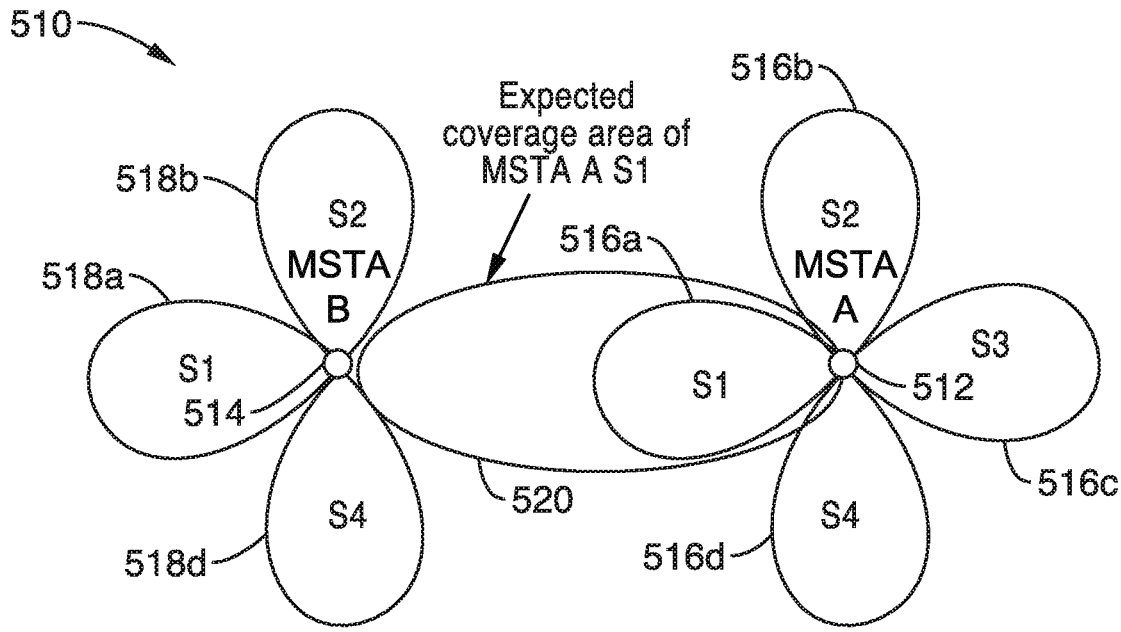
Figure 29C:
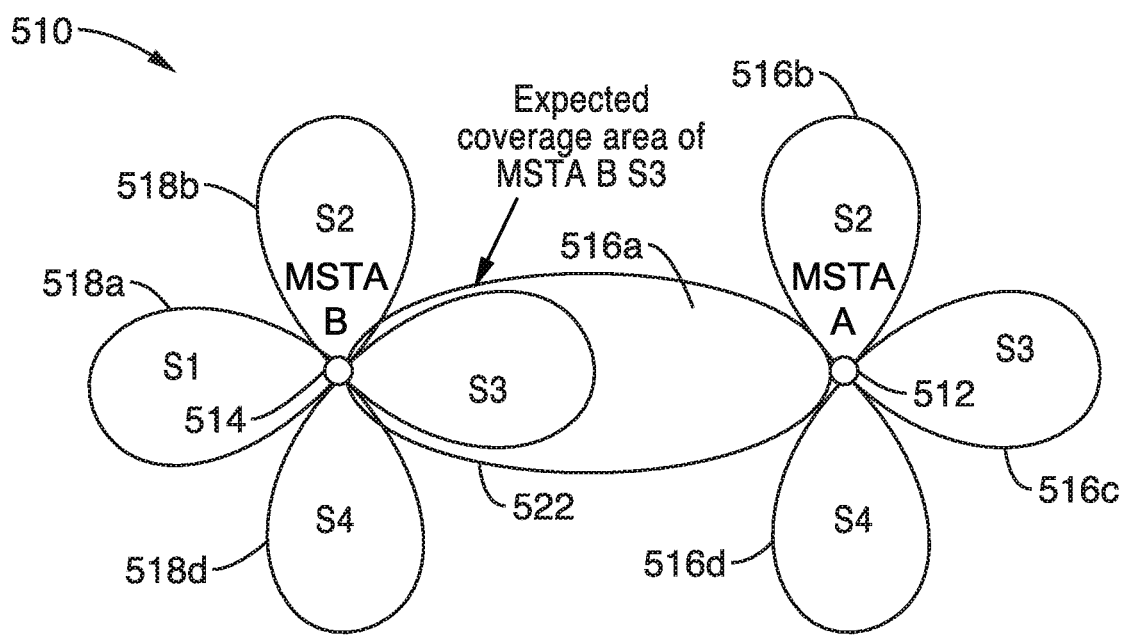

FIG. 29A through FIG. 29C illustrates an example embodiment 510 of determining new node coverage areas. In each figure MSTA A 512 and MSTA B 514, are shown with directional antenna sectors 516*a* (S1) through 516*d* (S4), and 518*a* (S1) through 518*d* (S4), respectively.

In FIG. 29A MSTA A 512 and MSTA B 514 are in line of sight, and it is assumed that since direction 516*a* (S1) of MSTA A 512 can communicate with direction sector 518*c* (S3) of MSTA B 514, then any node in between these nodes can be reached by one of the two direction sectors. Therefore, each of these sectors can claim this coverage as its discovery area.

In FIG. 29B and FIG. 29C, expected coverage areas 520 and 522 are seen for MSTA A and MSTA B, respectively. In this embodiment, the present disclosure determines areas based on collecting measurements. In this example, the mobile station and other stations connected to the mesh networks are collecting information about their location and what nodes can be seen. These lists are processed collectively to form relationships between them. The outcome is that estimates are generated of potential coverage area for each sector. The more stations that are in the network, the more accurate the estimate of the coverage area of these node sectors. Also as nodes are moving and discovering new nodes, an update is sent with new sets of nodes/sectors that can be discovered. The mobile nodes are discovering and losing sight with other nodes and forming new lists of neighbors that can be seen simultaneously. These lists are saved and periodically processed.

In at least one embodiment, a centralized procedure is adopted in which nodes are sending a report of location and the discovered sectors list to a central entity. The central entity collects all lists from all network nodes and forms the discovery map. The central entity sends a scanning map to each node and informs it about its discovery area after processing the collected lists. The nodes can send a report of all lists collected over a period of time periodically or momentarily once the node location or discovered sectors changes to update the network information.

4.7. New Node Discovery

The system is configured so that a new node can use passive or active scanning to search for nodes and discover neighbors in the network. A new node passively scanning for neighbors is looking for the beacon master beacons. The nodes in the network are not concurrently sending beacons at the same time and every node in the network gets an opportunity to serve as a beacon master. The new node should hear a beacon from a nearby node once it is serving as a beacon master.

4.7.1. Full Passive New Node Scanning

In at least one embodiment, a new node can use only passive scanning to connect to the mesh network. This approach is suitable for nodes that do not have time requirements to connect to the network or discover all neighbors. This is performed according to at least two different embodiments.

4.7.1.1. Waiting for Beacon Master Beacons

A new node waits for all neighboring nodes to serve as master beacons and receives its beacons. After a period of time equal to the total number of nodes multiplied by the discovery period (master beacon serving period) after the first master beacon is received, the new node should have completed the scanning period. If the node is tuned to passive scanning only, in the sequence based beacon master switching, when the new node receives the same beacon again it knows that it concluded the scanning period. According to this embodiment, the new node is configured to then contact the current master beacon to be included in the master beacon interval. The current master beacon should update the beacon master sequence or the list of mesh nodes in each mesh node. The discovery period can be adjusted so that the connectivity delay is tolerated for new node joining. A new node can utilize quasi-Omni or directional antennas for scanning.

4.7.1.2. Triggering New Node Admission

In this embodiment new node admission is triggered in response to receiving a beacon from a beacon master. A new node is waiting for a beacon from the current master beacon. Once a beacon is received, this triggers the new node admission protocol. The new node keeps listening for master beacons. If the node is tuned to passive scanning only, in the sequence based beacon master switching, when the new node receives the same beacon again it knows that it concluded the scanning period. In this embodiment the new node is configured to contact the current master beacon to start the node admission sequence. The current master beacon should update the beacon master sequence or the list of mesh nodes in each mesh node. The neighboring nodes to the new node will sequentially start transmitting beacons and claim temporary beacon master role. The discovery period can be adjusted so that the connectivity delay is tolerated for new node joining. The new node can utilize quasi-Omni or directional antennas for scanning.

4.7.2. Passive/Active New Node Scanning

The new node can start with passive scanning looking for beacons from the current beacon master. If it happens that a node receives a beacon from the current beacon master, it will notify the beacon master of its existence and the current beacon master triggers the new node admission protocol. If the new node did not receive any beacon it will send a probe request from a quasi-Omni antenna or multiple probe requests in all directions. Once a mesh node receives the probe request it will respond with a probe response and inform the current beacon master about the existence of the new node. The current beacon master will trigger the new node admission protocol. The new node might decide to send a probe request directly without looking for beacon masters to reduce the connectivity time.

4.7.3. New Node Admission Protocol

Once the beacon master is notified of the new nodes existence it will trigger the new node admission protocol. The new node can notify the current beacon master itself if it received a discovery beacon from the beacon master and can communicate directly with the beacon master. Other mesh nodes can notify the current beacon master about the existence of the new node when they receive a probe request from the beacon master. The beacon master schedules a campaign to help the new node in joining the network. This is performed by interrupting the current scheduled beacon master sequence or future assignment, and scheduling nodes around the new node to serve as a beacon master for a time period equal-to-or-less-than the discovery period.

Every node stores the list of nodes in its geographical discovery map. This list includes nodes that are potential neighbors for any new node discovered by this neighbor or node. The nodes in the geographic discovery map of the mesh node that discover the new node serve as beacon masters and transmit discovery beacons in all direction in sequential order. The new node, after discovering the first mesh node, is listening for more discovery nodes for a selected period of time. For example, the new node might discover one or more of the nodes that are scheduled to serve as beacon masters and in the geographical discovery zone of the mesh node that first discovered the new node. After the new node discovery timer expires, the new node concludes its neighbor discovery and scanning process. The new node selects neighbors to connect to, and establishes a connection to the mesh network. The beacon master selection process then returns to normal operations and continues the sequence of future selection before the new node admission protocol. The new node listens to peer beacons from which it determines the current master beacon. The new node sends the master beacon a request to serve as future master beacon if it is required to transmit discovery beacons. The master beacon processes the request and adds the new node to the current sequence, or updates the list of MB nodes in each mesh node. The master beacon determines the discovery beams to be used as well as if they are required. The process of scheduling new master beacons to help the new node, adding the new node to the sequence or the list of the future possible master beacons in the nodes, and determining the discovery direction for nodes, can be performed in at least one embodiment utilizing a centralized entity outside the master beacon that can be reached by any node.

The new node can keep listening for a long enough period of time to make sure that all nearby nodes have the opportunity to serve as beacon masters and hence all neighbors have been discovered or might ask the mesh node to expedite the discovery process by triggering the new node admission protocol. However, the process of waiting for one of the nearby nodes to serve as a beacon master can be time consuming if the network has many nodes or if the master beacon serving interval is long.

Figure 30:
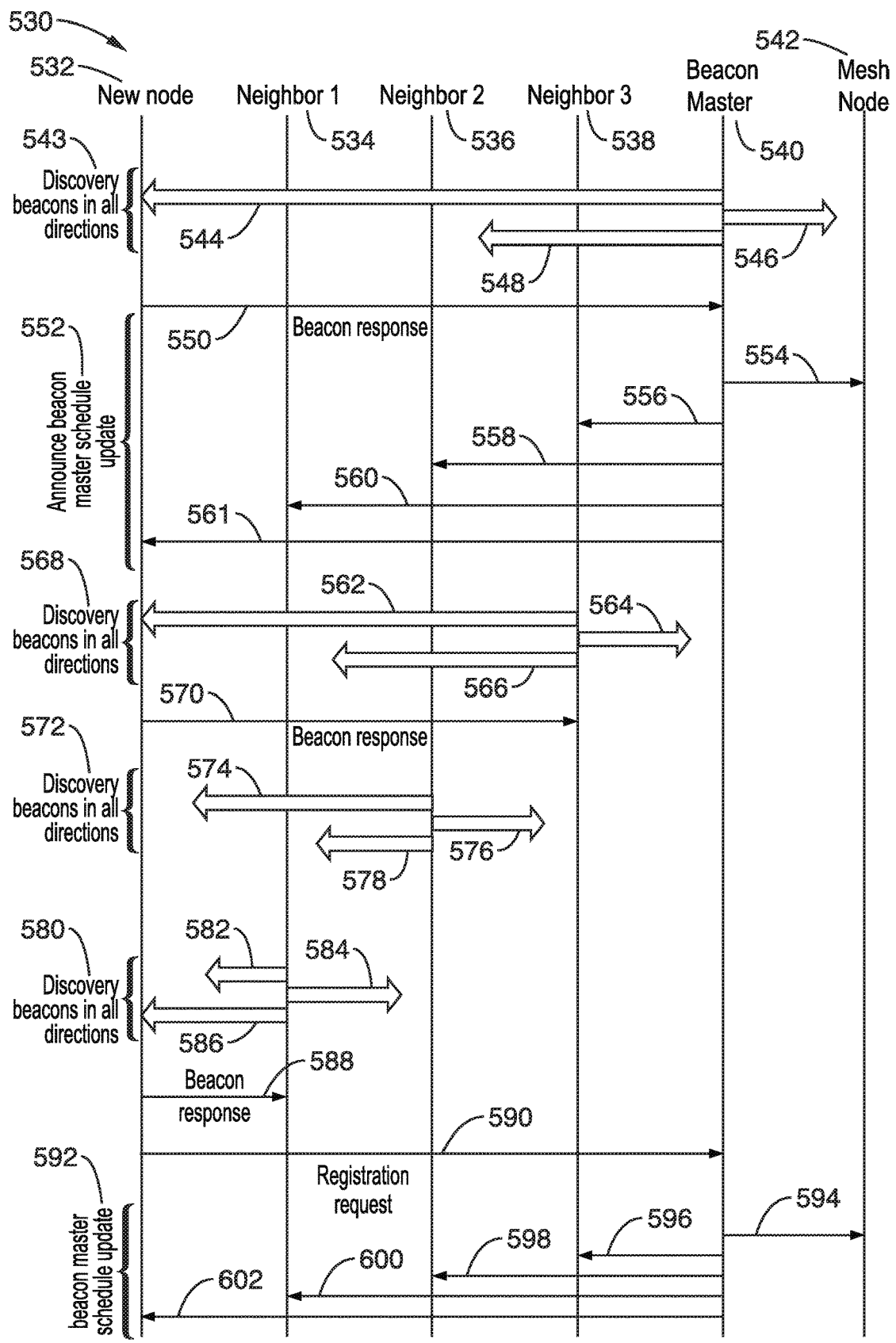
FIG. 30 is a message passing diagram for a new node performing passive scanning to be admitted to the mesh network according to an embodiment of the present disclosure.

FIG. 30 is an example embodiment 530 of new node admission in response to passive scanning within the BM coverage area. The figure shows communications between new node 432, neighbor 1 node 534, neighbor 2 node 536, neighbor 3 node 538, beacon master 540 and mesh node 542. The beacon master (BM) triggers the sequence to change BMs for assisting the new node in joining the network quickly. The BM sends the BM schedule update to force other nodes around the new node to send discovery beacons. The new node 532 listens for discovery beacons sent from beacon master 540, as it sends discovery beacons in all directions 544, 548 and 546. In this example, the new node is in range of beacon master 540 as it receives discovery beacon 544, to which it sends response 550. The current beacon master 540 announces 552 a beacon 554, 556, 558, 560, 561. In some instances the beacon master sends the schedule and some information 561 to help the new node finding the neighbors too. The new node receives discovery beacons 568 from a new beacon master neighbor 3 node 538 which sends these discovery beacons in all directions 562, 564, 566. The new node responds 570 with a beacon response. Similarly, discovery beacons are sent in all directions 572, including directions 574, 576 and 578 by subsequent beacon master neighbor 2 node 536. Then discovery beacons are sent in all directions 580, including directions 582, 584 and 586 by subsequent beacon master neighbor 1 node 534, to which the new node sends beacon response 588, followed by a registration request 590 to join the network. The beacon master then updates the beacon master schedule and sends it out 594, 596, 598, 600 and 602 to all nodes.

Figure 31:
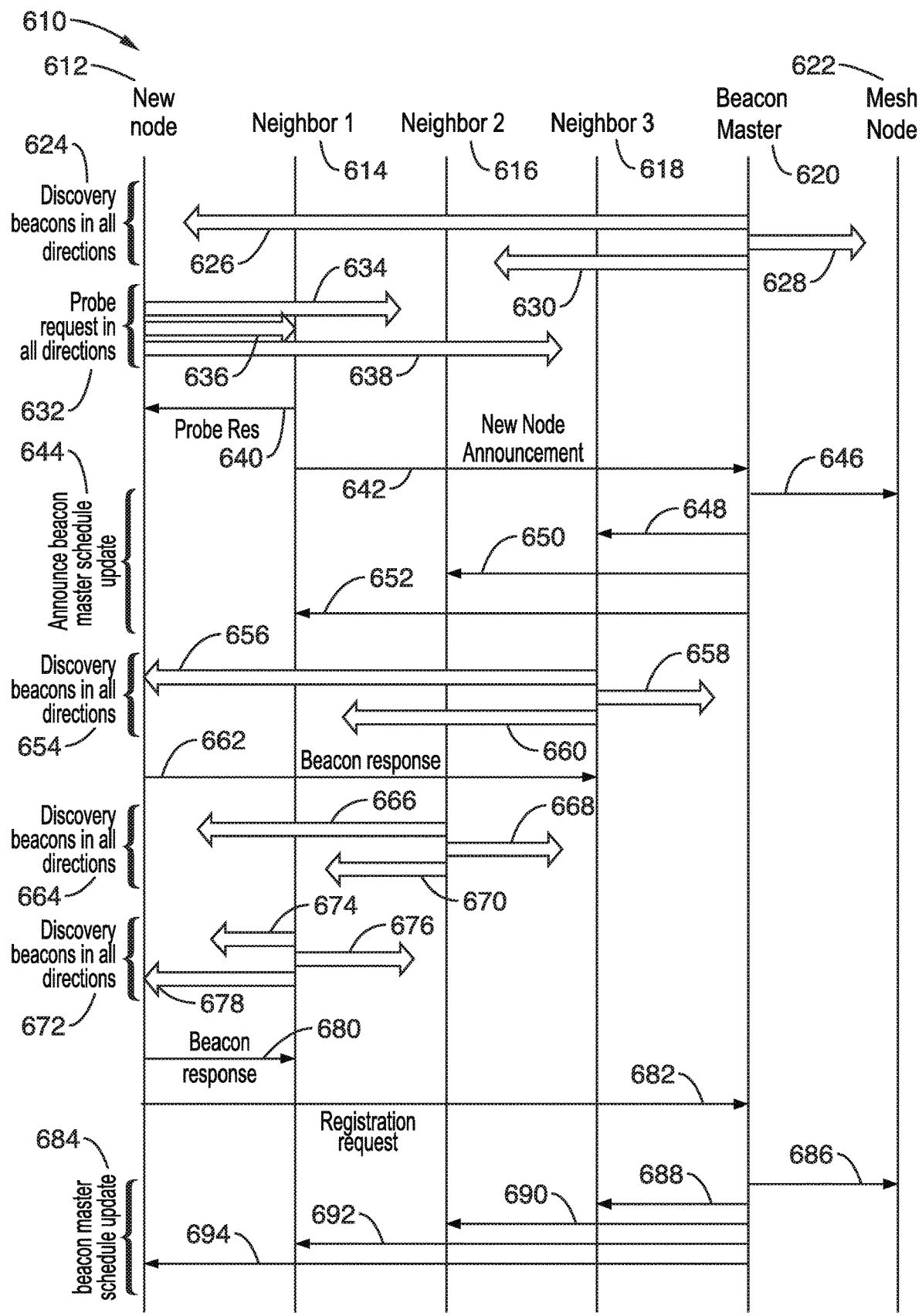
FIG. 31 is a message passing diagram for a new node performing active scanning for admission to the mesh network according to an embodiment of the present disclosure.

FIG. 31 illustrates an example embodiment 610 of new node admission in response to active scanning within the BM coverage area. The figure shows communications between new node 612, neighbor 1 node 614, neighbor 2 node 616, neighbor 3 node 618, beacon master 620 and mesh node 622. One BM is active, but when a new node is detected the BM sequence changes to add neighboring nodes to the new node to expedite the discovery process.

It is seen above, that the node can chose to actively search, according to an embodiment of the present disclosure, for neighbors by sending a probe request in all directions, or sending the probe request using a quasi-Omni antenna. The new node receiving a probe response from one of the mesh nodes in response to its probe request, triggers the new node admission protocol to kick in. The new node admission protocol interrupts the next master beacon picked by the current master beacon or the current sequence and enforces the neighboring nodes to the new node to serve as master beacons in sequence to give the new node the opportunity to discover nearby neighbors quickly. The determination of possible neighboring mesh nodes can be performed by defining a geographical discovery map for each node or sector. The geographical discovery map for each node or sector represents a list that defines the potential neighboring nodes/sectors if the new node is discovered by that node or sector. After the new node discovers all its neighbors and connects to the mesh network, the current master beacon is responsible for adding the new node to the list of available nodes at each node, or the master beacon sequence list depending on the master beacon selection method used in the mesh.

4.7.4. Geographical Discovery Zone

A geographical cluster of nodes are created for each MSTA or MSTA sector. For each node sector, the area that this sector is covering represents the foot print of this sector. A set of possible neighboring nodes, or node sectors, that can be discovered in the foot print of this sector comprises the geographical discovery node or sector set. This set contains nodes or sectors that might be seen by any new node discovered by, or in this sector. Not all the members of this set should be discovered by the new node, but it represents all possible potential neighbors. In at least one embodiment, this set is updated any time a new node is joining the network, to include new MSTAs joining. This set can be constructed either using measurement campaign collection, topology information of the network, or some form of antenna pattern analysis.

Figure 32:
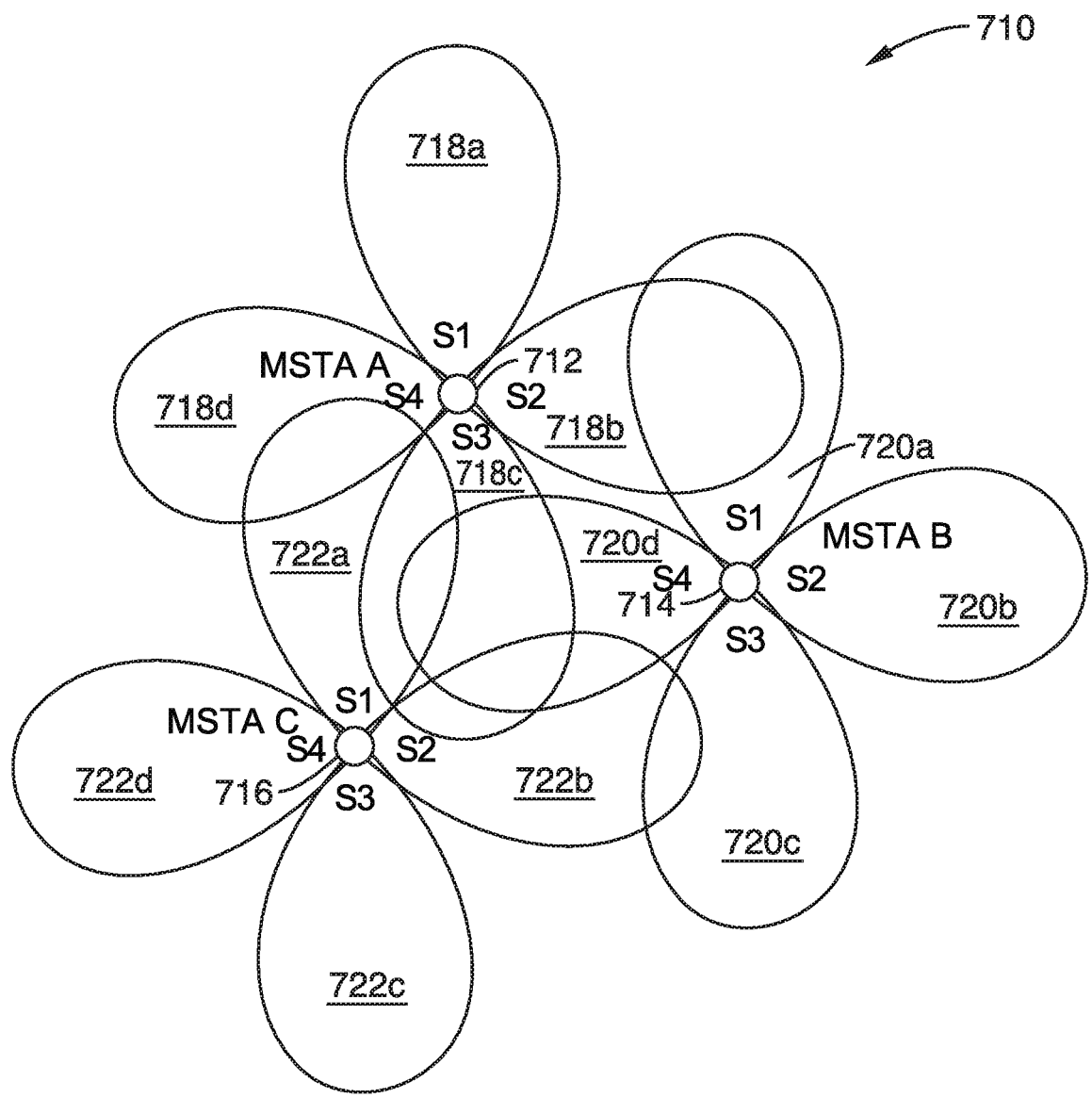
FIG. 32 is a node sector coverage diagram showing sector coverage between nodes utilized according to an embodiment of the present disclosure.

FIG. 32 illustrates an example embodiment 710 of a node or sector geographical discovery set (sector coverage area). The figure depicts node MSTA A 712 with sectors 718*a* through 718*d*, MSTA B 714 with sectors 720*a* through 720*d*, and MSTA C 716 with sectors 722*a* through 722*d*, depicting their overlapping antenna direction sectors. It can be seen from the figure that any node discovered by MSTA A 712, Sector 3 (S3) 718c can have MSTA C 716 (S1) 722a and (S2) 722b, and/or MSTA B 714 (S4) 720d as neighbors as well. Any node discovered by MSTA B 714 (S1) 720a, will only have MSTA A 712 (S2) 718b as a potential neighbor. The formation of the geographical discovery zones can be performed by the system through measurement reporting in the network or by utilizing an analytical cell planning process.

In at least one embodiment, analytical cell planning is based on estimating potential neighbors at each coverage area of a node's sector and loading the list at the node sector. To generate this list through measurement reporting, a centralized or distributed procedure can be used. Each node/sector keeps a list of the neighboring nodes/sectors that can be discovered by this node/sector. These lists are processed collectively to form relationships between them, and generating an outcome estimating potential neighbors for each sector, if that sector is discovered. The more nodes that exist in the local network the more accurate will the resultant estimate of the discovery zones be. In addition, as nodes are moving and discovering new nodes, updates are sent with new sets of nodes/sectors that can be discovered. Mobile nodes are being discovered, while others are lost sight of, with other nodes forming new lists of neighbors that can be seen simultaneously. These lists are saved and periodically processed.

In the centralized procedure, nodes are sending neighboring lists for each sector to a central entity. The central entity collects all lists from all network nodes and forms the geographical discovery zone. The central entity sends a geographical discovery zone set to each node after processing the collected lists. In at least one embodiment, the nodes (periodically or momentarily) send a report of all lists collected over a period of time once the neighboring list changes to update the network information.

In the distributed procedure, nodes send each of these lists to all members of these lists. In at least one embodiment of this case the moment the list is updated it is sent to all members of the list before the node loses sight of any of the list members. Once a node receives a list from another node, it adds all the members of the list to the discovery zone of the sector that was received from.

Figure 33:
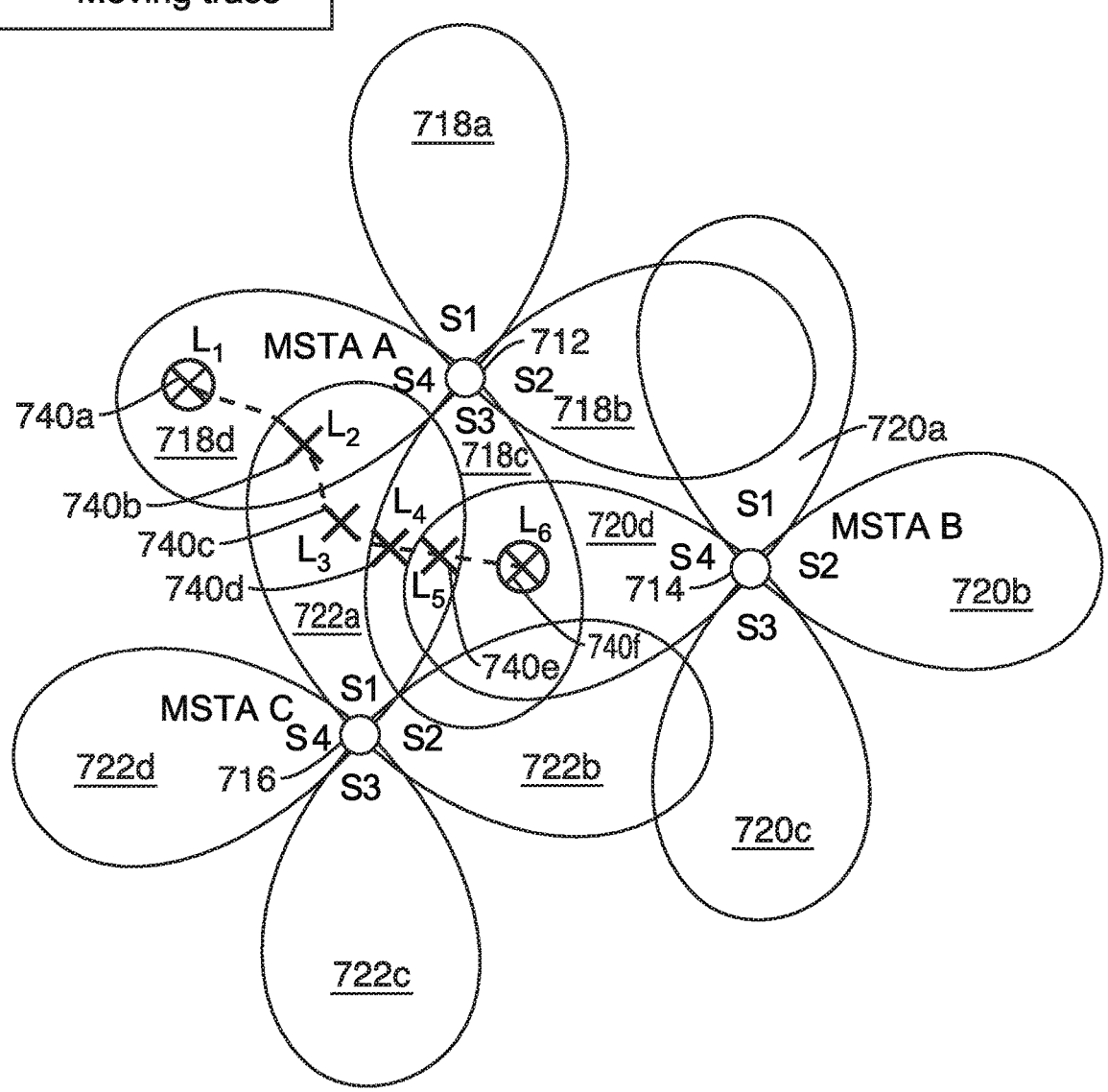
FIG. 33 is a node sector coverage diagram showing sector coverage between nodes with effects of movement of a new node through the coverage area as responded to according to an embodiment of the present disclosure.

FIG. 33 illustrates an example embodiment 730 as a variation of the case shown in FIG. 32, depicting the case of a node moving and forming new lists. These lists are used to update the geographical discovery zone set for these neighbors as shown in the table. The figure depicts node MSTA A 712 with sectors 718a through 718d, MSTA B 714 with sectors 720a through 720d, and MSTA C 716 with sectors 722a through 722d, depicting their overlapping antenna direction sectors. A mobile node is shown moving through the antenna sectors associated with the three fixed nodes, with mobile nodes intermediate locations seen as 740a through 740f, as new lists are created when the neighbor associations change from MSTA A 712 (S4) as sole neighbor at $L_1$ 740a, to neighbors MSTA A 712 (S4) and MSTA C 716 (S1) at $L_2$ 740b, to MSTA C 716 (S1) as sole neighbor at $L_3$ 740c, to MSTA A 712 (S3) and MSTA C 716 (S1) at $L_4$ 740d, to MSTA A 712 (S3), MSTA C 716 (S1), and MSTA B 714 (S4) at $L_5$ 740e, and finally to MSTA A 712 (S3) and MSTA B 714 (S4) at $L_6$ 740f.

Table 1 details the neighbor list and discovery zone updates for the example of FIG. 33 for each of the moving node positions $L_1$ through $L_6$.

4.7.5. New Node Discover Protocol

Figure 34A:
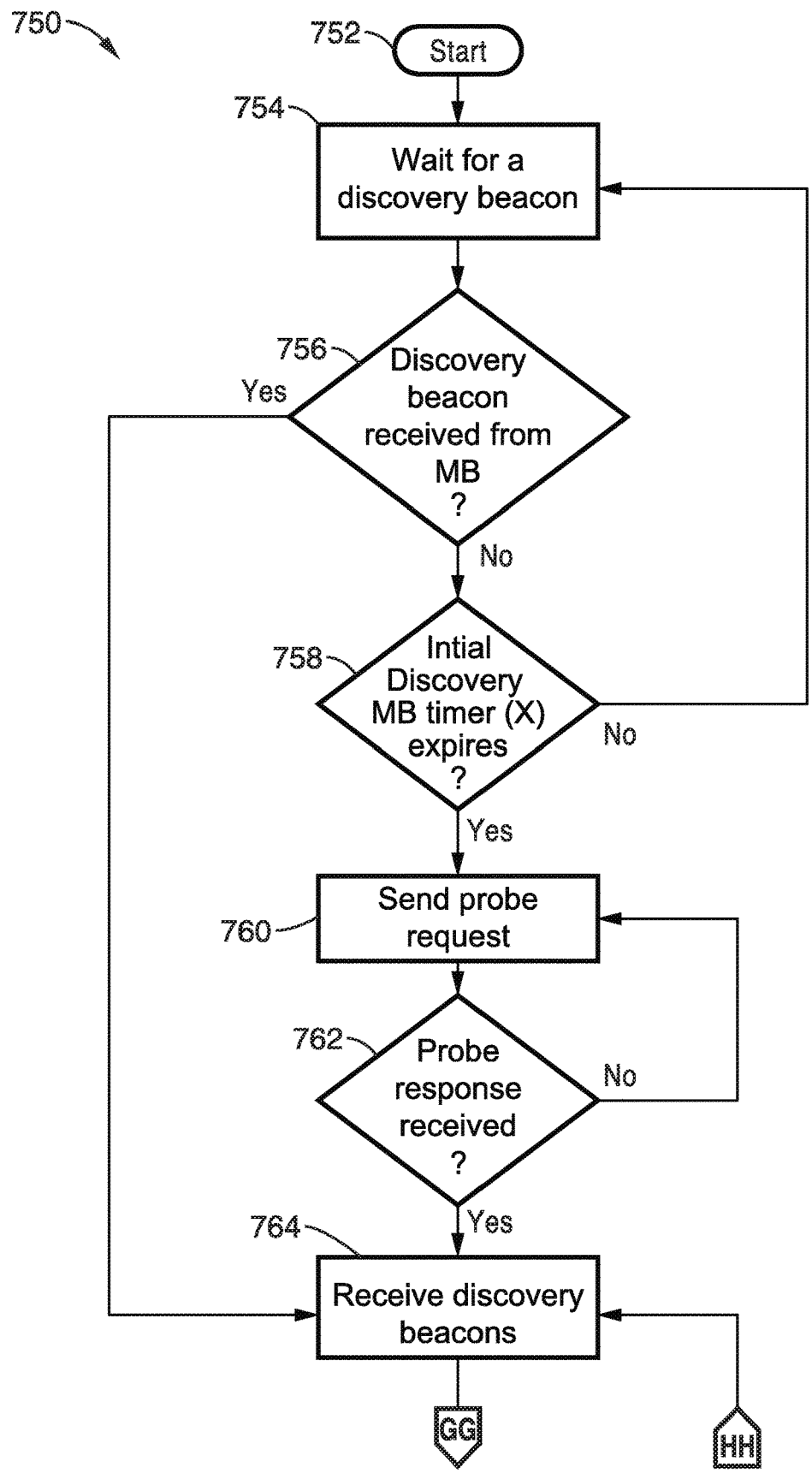
FIG. 34A and FIG. 34B is a flow diagram of a new node discovering and joining a mesh network according to an embodiment of the present disclosure.
Figure 34B:
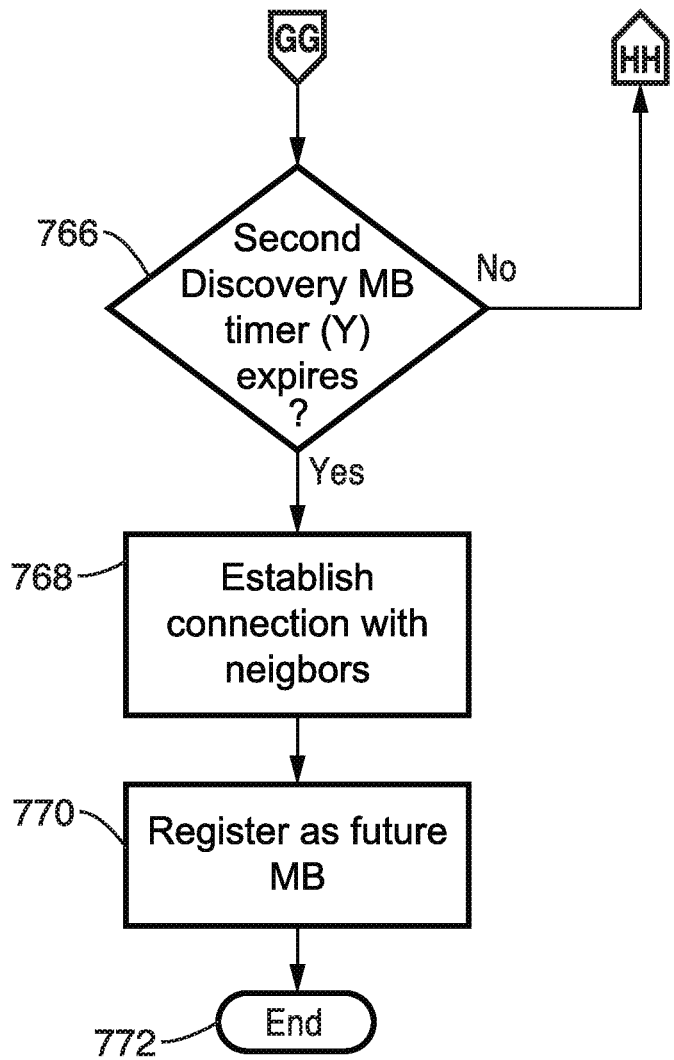

FIG. 34A and FIG. 34B illustrate an example embodiment 750 of a procedure for a new node to discover and join a mesh network. The process starts 752 and the new node searches waiting 754 for discovery beacons, such as for a specific period of time equals to X. This timer can take many values to define multiple modes of operation. In block 756 a check is made for discovery beacons received from the master beacon. If a discover beacon was received then execution moves forward to block 764, otherwise decision block 758 is reached which checks if the initial discovery MB timer (X) has expired. If the time period has not yet completed, then execution goes back to block 754, otherwise it moves on to block 760 to send a probe request, and then to check 762 if a probe response was received. If no probe request received it goes back to block 760 to send another probe request. Otherwise, if a response was received, then it moves to block 764 to receive discovery beacons and move on to check 766 in FIG. 34B which checks if a second discovery MB timer has expired. If no expiration, then execution moves back to block 764 in FIG. 34A, Otherwise, with the second discovery MB timer expiring, at block 768 connection is established from the new node to its neighbors, and then the new node registers 770 with the MB as a future MB, and the process ends 772.

In this embodiment, the following are preferred mechanisms by which the BM timing counter X is handled. If X equals its maximum value this means that the node is in full passive mode and will only wait for discovery beacon from network beacon masters. If X equals zero, the node will not wait for discovery beacons and will go directly into active scanning. If X equals an intermediate value (between 0 and "infinity"), it will give the node the opportunity to receive discovery beacons if it was in its vicinity and if not it will switch to active scanning.

If a discovery beacon is found, the new node remains in passive scanning expecting more discovery beacons from nearby mesh nodes. If no discovery beacon is found, the new node switches to active scanning and transmit a probe request from a quasi-Omni antenna or sequentially in all directions. When the new node receives a Probe Response it switches to Passive mode and starts scanning for discovery beacons. The search for discovery beacons continues for some specific timer value and after this the new node concludes it scanning and establish connection with the network. The new node sends a registration request to the beacon master or the central controller to be included in the beacon master future schedule.

4.7.6. Current BM Protocol for Handling New Node

Figure 35:
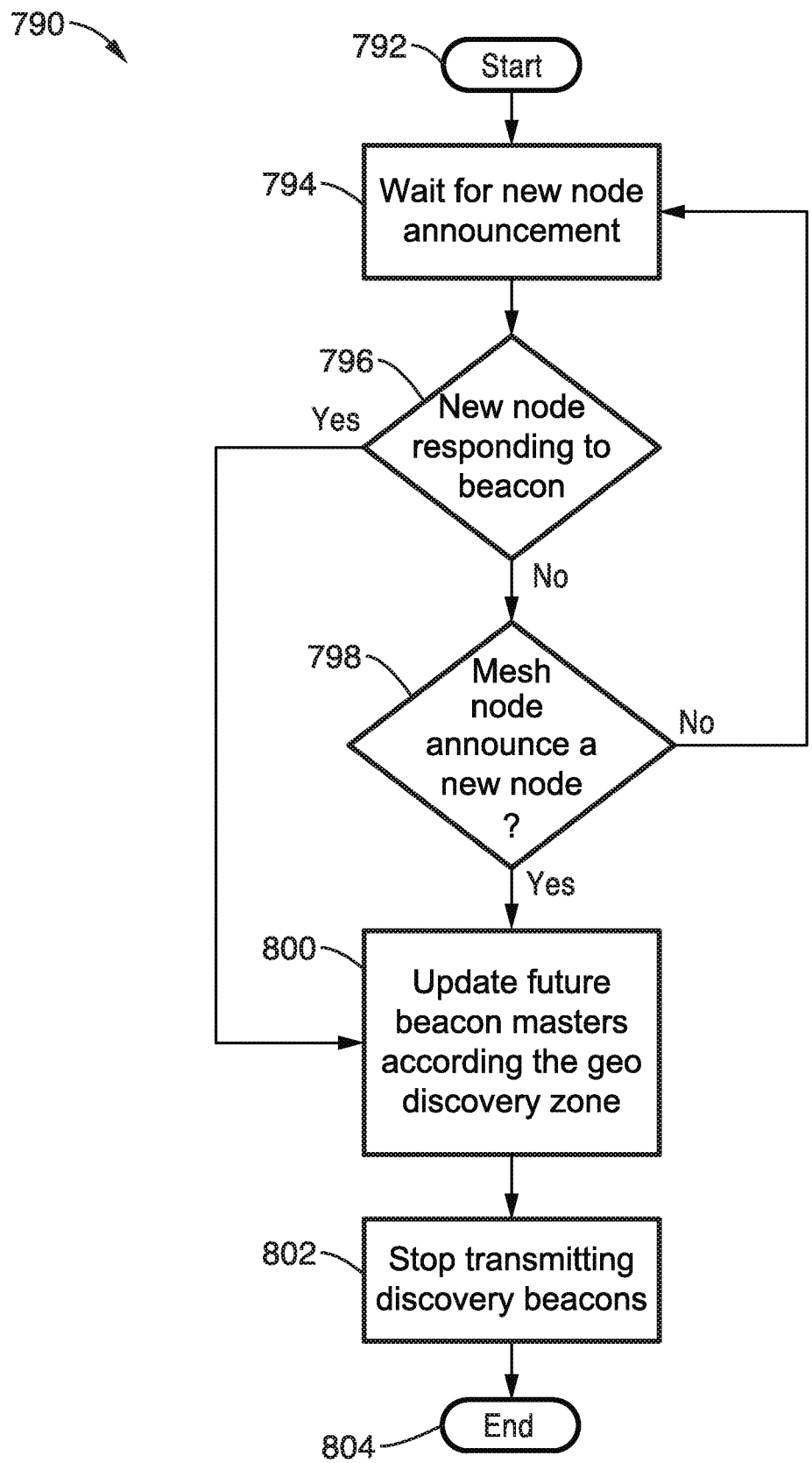
FIG. 35 is a flow diagram of beacon master handling of new node admission according to an embodiment of the present disclosure.

FIG. 35 illustrates an example embodiment 790 a beacon master handling a new node admission procedure. The current BM is informed about a new node either by a new node responding to one of the discovery beacons being transmitted in all directions, or through an announcement frame forwarded to MB through the mesh network. The beacon master updates the future schedule of the beacon master nodes and informs network mesh nodes. The beacon master propagate the new sequence or the list of nodes to be scheduled to the whole mesh network through peer beacons. After a few beacon intervals the new beacon master schedule should be known to the whole mesh network. The current master beacon stops transmitting master beacon and the new assigned nodes are taking place.

The routine starts 792 and waits 794 for new node announcements. Upon receiving a new node announcement, a check 796 is made if the new node is responding to the discovery beacon. If the new node is not responding to the discovery beacon, then block 798 is reached with a check made if a mesh node is announcing the new node. If the new node announcement does not arise from either the discovery beacon or a mesh node announcement, then execution returns to block 794 to await a new node announcement. Otherwise, if the new node announcement arises from either the discovery beacon or a mesh node announcement then execution reached block 800 where an update is performed to future beacon masters according to the geo discovery zone, and block 802 is reached which stops transmitting discovery beacons prior to the process ending 804.

4.8. Centralized Discovery Beacon Management

In this example embodiment a centralized entity fulfills one or more roles that are assigned to the beacon master. This centralized control can facilitate the process of reaching out to the controller of the network to admit a new node or to update the scheduling and scan directionality of the network. In this embodiment, nodes do not need to be aware of the current beacon master but they should be capable of communicating with the central controller. The central controller is responsible for selecting the future beacon masters or updating the sequence, orchestrating new node beacon master scheduling, handling the case where a node is turned off or had a failure issue, and handling the discovery map of the network. In case of no active beacon master, and no periodic discovery beacon transmission, the central controller is responsible for triggering the transmission of discovery beacons after detecting some events, such as a new node joining or losing connection. This can include triggering one or more mesh node discovery beacon transmissions. Also this process can include coordinating the transmission of these beacons among those mesh nodes.

Figure 36A:
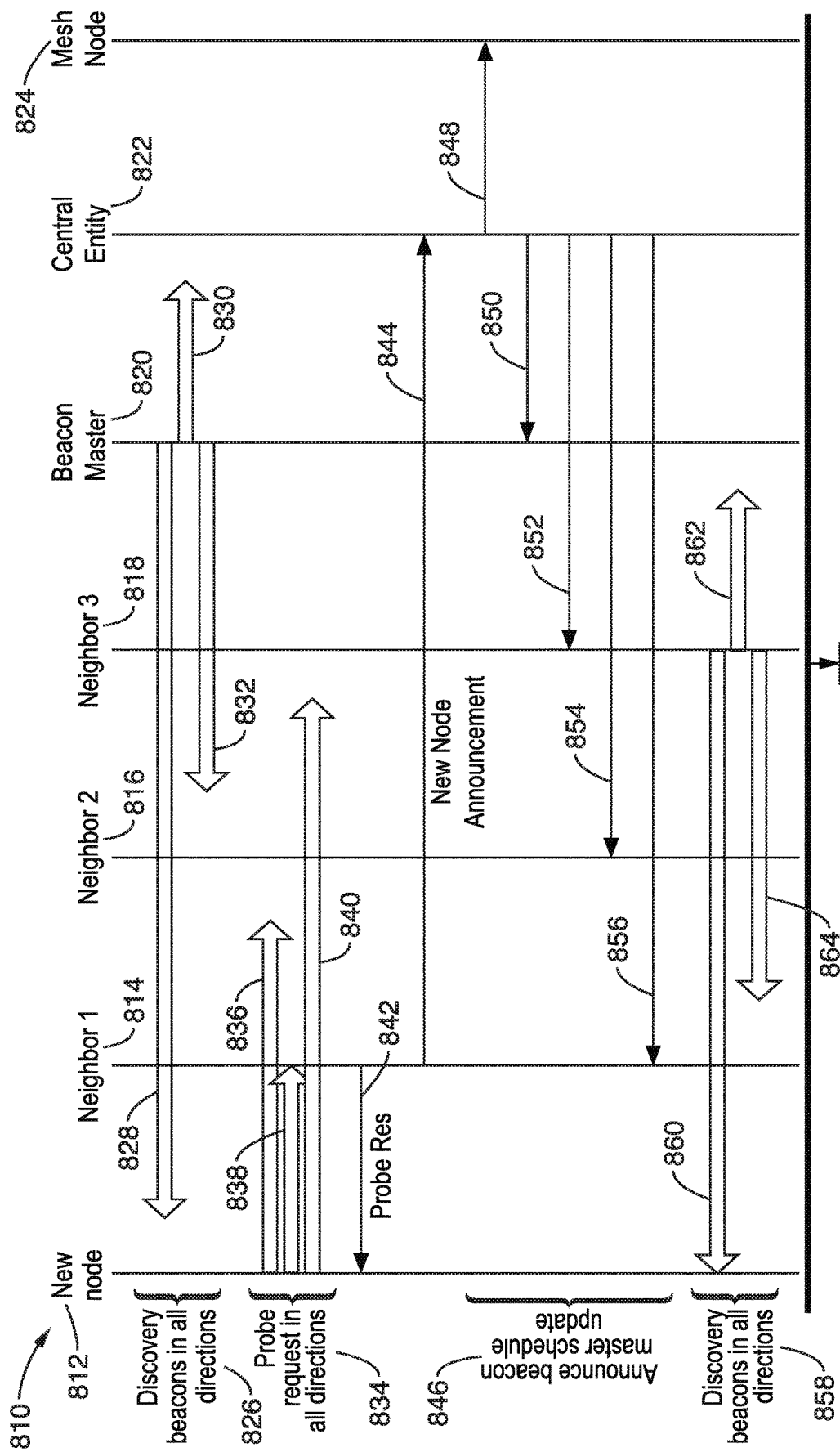
FIG. 36A and FIG. 36B is a message passing diagram of admitting a new node into the mesh network as orchestrated by a center controller entity, which is outside the range of the new node, as performed according to an embodiment of the present disclosure.
Figure 36B:
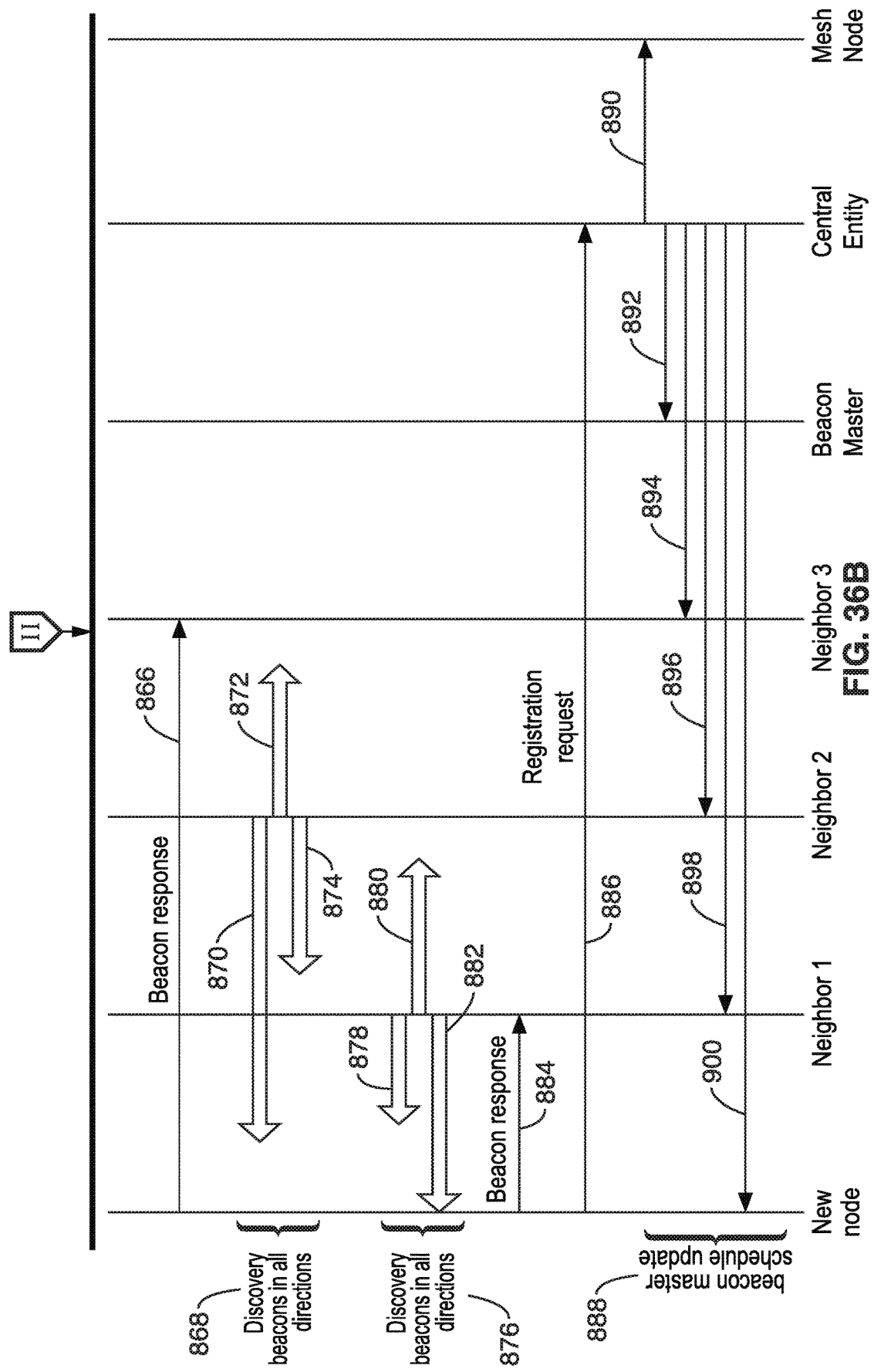
Figure 37:
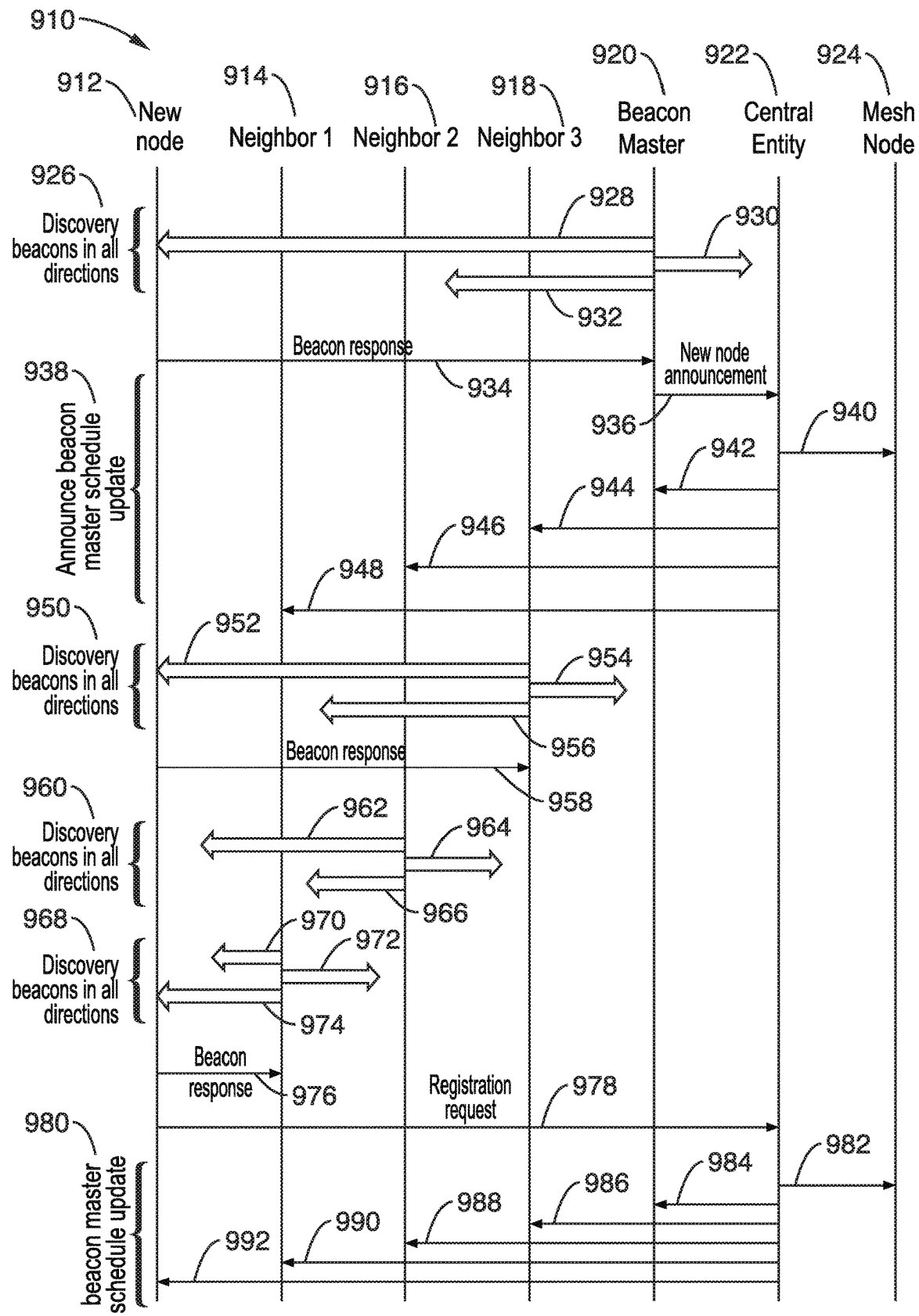
FIG. 37 is a message passing diagram of admitting a new node into the mesh network as orchestrated by a center controller entity, which is within the range of the new node, as performed according to an embodiment of the present disclosure.

FIG. 36A, FIG. 36B, and FIG. 37 illustrate example embodiments 810, 910 of a network procedure to admit a new node as orchestrated by a central controller entity. In FIG. 36A and FIG. 36B the new node is outside of the coverage range of the beacon master, while in FIG. 37 the new node is within the beacon master coverage range.

If the new node receives a beacon from the beacon master, It will inform the beacon master and the beacon master communicates with the central controller to schedule the neighboring node to help the new node.

In FIG. 36A and FIG. 36B a number of network entities are depicted as new node 812 seeking to join the network, neighbor 1 node 814, neighbor 2 node 816, neighbor 3 node 818, beacon master 820, central entity 822 and mesh node 824. Referring to FIG. 36A, discovery beacons are generated 826 in all directions from beacon master 820 toward 828 new node 812, toward 830 central entity 822, and toward 832 neighbor 816. It will be noted that these discovery beacons do not reach the new node.

Since the new node is not receiving the discovery beacons, it generates 834 probe requests in all directions, seen as being toward 836 neighbor 2 node 816, toward 838 neighbor 1 node 814, and toward 840 neighbor 3 node 818. In response to this, neighbor 1 node 814 sends a probe response 842 to the new neighbor, and it announces 844 the new node to central entity 822. Then an announcement beacon master schedule update 846 is generated by the central entity 822 with announcements 848, 850, 852, 854, and 856, going out to the nodes excepting the new node. When helpful, the neighbor that discovered the new node sends the new node a frame to inform the node about the new schedule and provide some additional information that aids in beamforming with other neighbors.

Neighbor 3 node 818 is scheduled as a new temporary beacon master and generates 858 discovery beacons in all directions 860, 862, 864.

In FIG. 36B the new node 812 generates a beacon response 866 to Neighbor 3 node 818. Then neighbor 2 node 816 generates 868 discovery beacons in all directions 870, 872 and 874. Then neighbor 1 node 814 generates 876 discovery beacons in all directions 878, 880 and 882. Potential neighbors have to send beacons in all direction to beam form with the new node. A response 884 is generated from the new node to the best beacon of each neighbor. The new node might only receive one or perhaps a few of the beacons sent in all directions. The new node response is followed by the new node sending a BM registration request 886 to central entity 822. Central entity 822 sends out 890, 892, 894, 896, 898, 900 a beacon master schedule update 888 to all parties.

In FIG. 37 embodiment 910, a number of network entities are depicted as new node 912 seeking to join the network, neighbor 1 node 914, neighbor 2 node 916, neighbor 3 node 918, beacon master 920, central entity 922 and mesh node 924. Beacon master 920 sends 926 discovery beacons in all directions, 928, 930 and 932, with these beacons reaching the new node in this case. The new node 912 responds with beacon response 934 to the beacon master 920 which announces 936 the new node to the central entity 922. The central entity then announces 938 the beacon master schedule to all nodes 940, 942, 944, 946, 948, except the new node 912. When helpful, the neighbor that discovered the new node sends the new node a frame to tell that node about the new schedule and some information that aids beamforming with other neighbor. Neighbor 3 node 918 generates 950 discovery beacons in all directions 952, 954, 956. New node 912 responds with a beacon response 958 to neighbor 3 node 918. Neighbor 2 node 916 generates 960 discovery beacons in all directions 962, 964, 966. It will be noted that the new node does not respond to this, likely it is out of range. Neighbor 1 node 914 generates 968 discovery beacons in all directions 970, 972, 974. New node 912 responds with a beacon response 976 to neighbor 1 node 914. New node 912 sends a registration request 978 to central entity 922. The central entity 922 then announces 980 the beacon master schedule to all nodes (including the new node as it is now scheduled as a beacon master) 982, 984, 986, 988, 990, 992.

Thus, in view of the above it is seen that if the new node finds a neighbor node by sending a probe request and receiving a probe response, that neighbor node will communicate with the central controller to schedule the neighboring node to help the new node. The central controller updates the beacon master schedule to assist the new node and manage going back to the previous schedule when the new node admission protocol is completed. Upon the new node connecting to the network, it can send a registration request to the central controller to be included in a future beacon master schedule and to adjust its discovery scanning map. The central controller responds by updating the network beacon master schedule and the discovery scanning map through the whole network.

4.9. Efficient Mesh Cooperation for New Node Neighbor Discovery

Once the mesh node is informed of the existence of the new node either through passive or active scanning, the mesh coordinates the discovery process among the mesh nodes. Nodes are scheduled to transmit their network announcement frames in all directions during the data transfer interval (DTI) period that serves the same function as the discovery beacon but can be transmitted in the DTI period.

Each mesh node repeats the transmission of the beacons for many cycles depending of the capabilities of the new node. After the mesh node is completed, a new mesh node starts transmitting its announcement frames. At the end of the transmission cycles for each announcement frame, in each of the antenna sectors, a slot is assigned for SSW frame exchanges. In at least one embodiment, a period of time is reserved for peer link establishment at the end of the transmission of all cycles and SSW slots. At the time of the beacon transmission in the regular frame, if the new node is connected to the mesh node a peer beacon and an assigned SSW slot is added and dedicated to the new node with MSTA B.

Figure 38A:
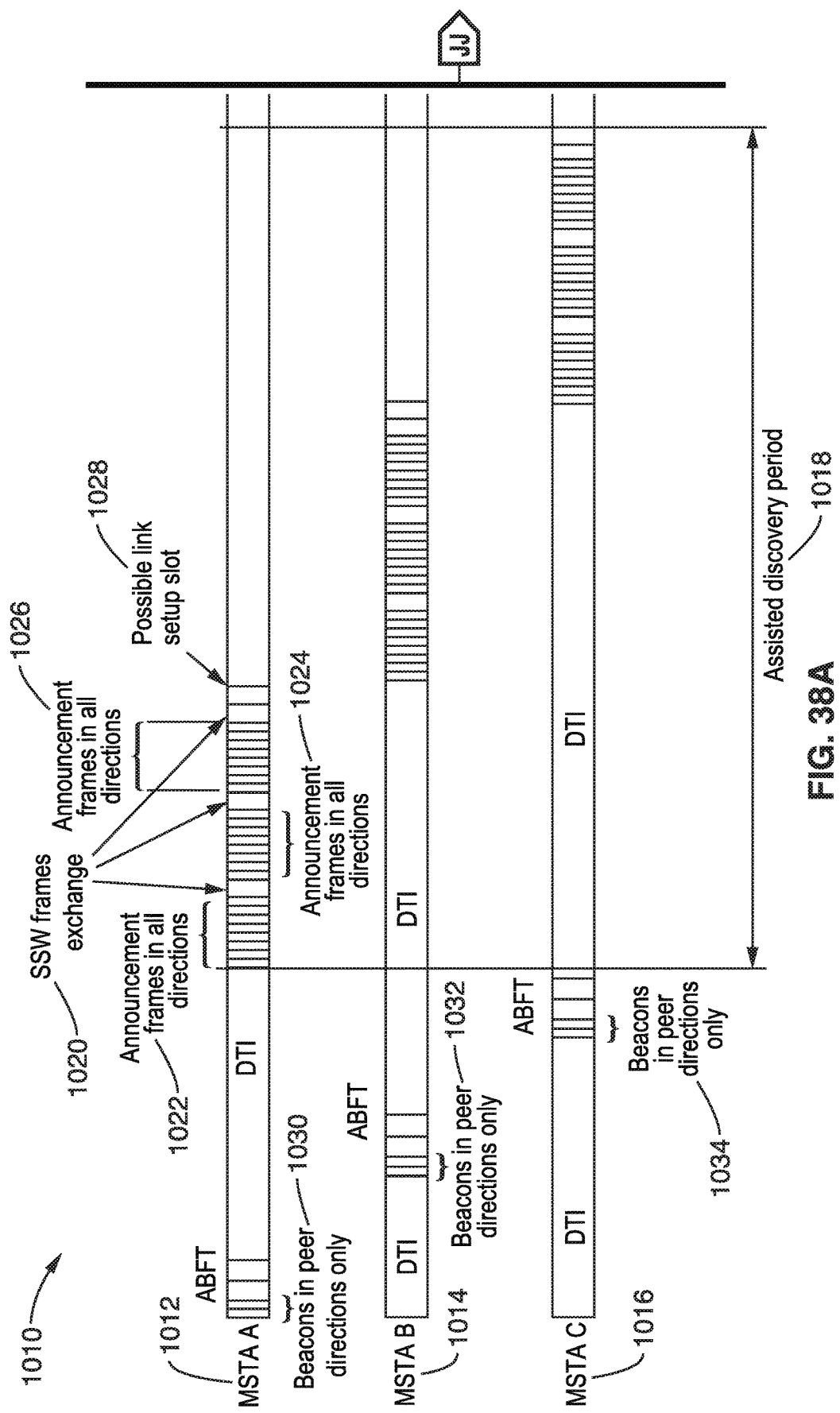
FIG. 38A and FIG. 38B are communication period diagrams in performing an assisted discovery process according to an embodiment of the present disclosure.
Figure 38B:
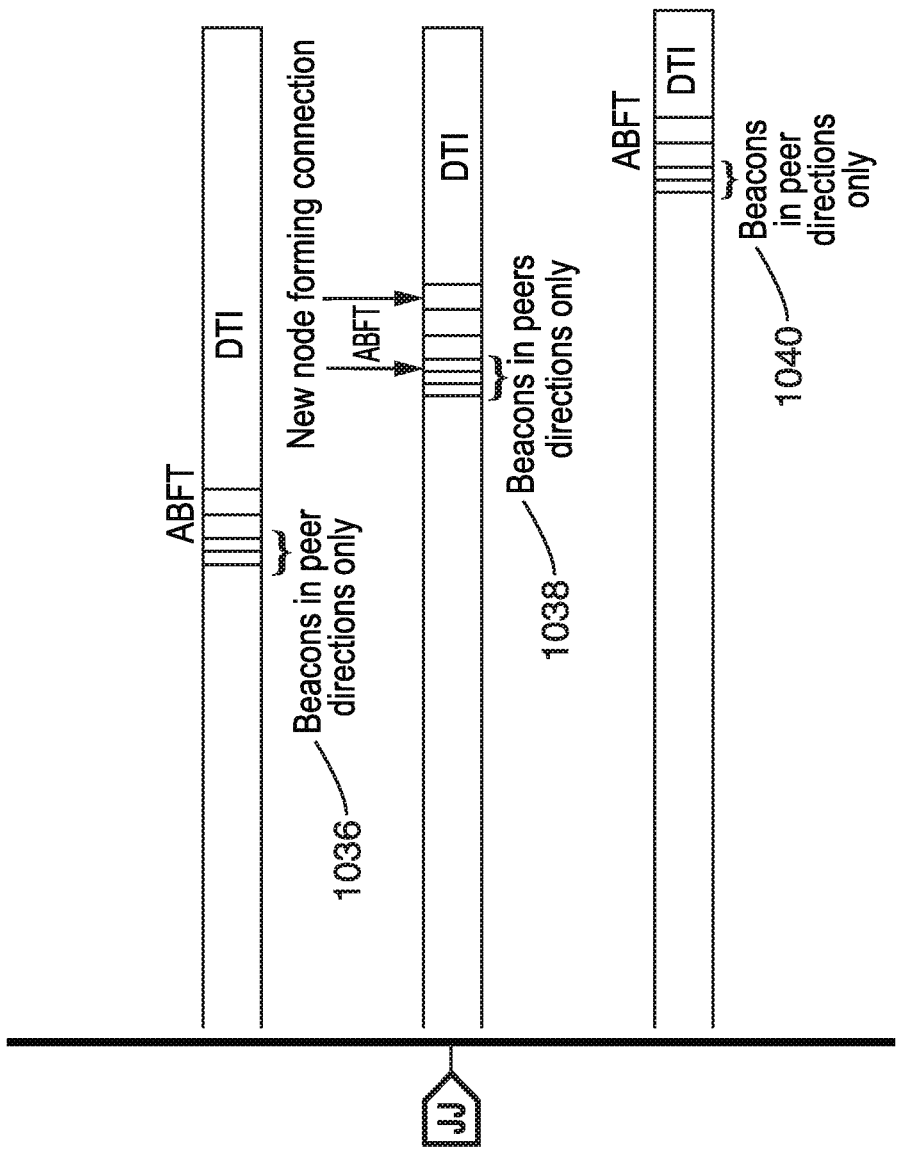

FIG. 38A and FIG. 38B depict an example embodiment 1010 of the above process between MSTA A 1012, MSTA B 1014, MSTA C 1016. In FIG. 38A one sees the beacons 1030, 1032, 1034 with the ABFT and DTI periods preceding an assisted discovery period 1018. In this assisted discovery period announcement frames 1022, 1024, 1026 are seen between which are SSW frame exchange 1020, followed by a possible link setup slot 1028. In FIG. 38B beacons are sent 1036, 1038, 1040 followed by ABFT and DTI communications.

This technique will avoid any interruption to beacon master switching protocol used in the mesh network where it's not needed to switch the beacon master to assist the new node in the protocol.

4.10. Simplified Efficient Beaconing Mode

In this section, a simple mode of operation is described. The mesh nodes are assigned the master beacon role in a periodic sequence. Each mesh node is assigned a time to start sending the discovery beacons, number of beacons to serve as a beacon master (discovery period) and period to repeat its role (master beacon interval). A center entity or a mesh node might be responsible of managing this operation. Without a center entity, some of this information can be defined also in the mesh profile (discovery period and the master beacon period). Mesh nodes can pick the time to start its discovery period randomly from a predefined slot or by channel sensing.

When a new node tries to join the mesh network, it can passively listen for master beacon interval to receive all beacons transmitted in the different discovery periods. A form of mesh assistance can be applied by coordination between the mesh nodes after one mesh node discovers the new node. This is by scheduling nodes to send beacons in the DTI period as was seen in FIG. 38A and FIG. 38B. Another form of assistance is by forcing the new node to transmit probe requests in all directions and forcing the mesh nodes to listen for probe requests from the new node.

4.11 New Frame Format 4.11.1. Beacon Response

This frame is needed when a new node (STA) is using passive scanning and discovers a beacon. The new STA sends a beacon response to inform the discovered STA about its existence. This frame can be used to trigger beamforming training as well if needed. In at least one embodiment, the frame of an assistance request message contains the following information: (a) NSID—indicating the new STA to be assisted; (b) SSID/SSID list—providing a list of SSIDs the new STA is trying to connect to; (c) DMG capabilities—indicating new STA supported capabilities; (d) Mesh ID—mesh identification element; (e) Assistance Request flag—indicates if the new STA is requesting mesh discovery assistance; (f) beamforming training request—indicating whether a new STA is requesting beamforming training; (g) beacon ID—the MSTA discovery beacon ID; (h) beam ID—transmit beam ID in case of direction transmission of beacon response message; (i) message counter—message counter if frame is transmitted multiple times from Omni/quasi-Omni antenna.

4.11.2. Beacon Response ACK

This message frame is sent from the discovered MSTA to the new STA in case of passive scanning to confirm the reception of the beacon response message and to setup the mesh discovery assistance phase. In at least one embodiment, the frame of a beacon response ACK message contains the following information: (a) assistance confirmation—providing a mesh assistance confirmation; (b) new STA best transmit beam—indicating the best transmit beam for the new STA if the new STA directionally transmits the beacon response; (c) assistance information—assistance coordination information.

4.11.3. Discovery Beacon

This is a frame that is similar to the regular 802.11 DMG beacons frames but has some elements to allow for additional features. These frames are transmitted by the beacon master in all directions to help in discovery and announcing the network. This frame contains specific details for new nodes to discover the network and is different than the peer beacons which are intended to synchronize and manage mesh peers and connected STAs. Many elements of the 802.11 DMG beacon can be removed or considered optional if they are not needed by new node discovery. Once the node is connected to the mesh network, it can receive all the omitted information through peer beacons. This is a very light (low overhead) beacon and has the basic information for a node to discover the mesh node, form a connection and start receiving peer beacons. In at least one embodiment, the frame of an assistance response message contains the following information: (a) beacon type—discovery or peer beacon; (b) current BM countdown timer—countdown timer to the next BM cycle.

4.11.4. Peer Beacon

This is a frame that is similar to the regular 802.11 DMG beacons frames but has some elements to provide for additional features. These frames are transmitted by all nodes to their peer STAs in their respective directions or around their directions only. This beacon is used for beacon functions like synchronization, spectrum and channel management. This information allows nodes in the network to manage the network and propagate beacon master information. Many elements of the 802.11 DMG beacon can be removed or considered optional if they are not needed by the current mesh STA and are just meant for new nodes discovery and mesh formation. In at least one embodiment, the frame of an assistance response message contains the following information: (a) beacon type—discovery or peer beacon; (b) current BM ID—node ID of the current beacon master; (c) BM selection criterion—random or sequence based; (d) future BM ID or BM sequence—specifies next BM ID or the BM sequence number; (e) current BM countdown timer—countdown timer to the start of the next BM cycle; (f) extended beacon master information—if it has a value it indicates more information is attached to the peer beacon to aid BM updates; (g) discovery period—the number of BIs that forms a discovery period; (h) beacon master interval—number of BIs that form a beacon master interval. If extended beacon master information is defined, the beacon contains some information element that is required to form some action.

4.11.4.1. New Node Announcement Message

This information element is used to inform the current beacon master of the existence of a new node that is found by some mesh node in the network. The node that found the new node forms this element and other nodes forward it to the current BM. In at least one embodiment, the frame of an assistance response message contains the following information: (a) new node ID—discovery or peer beacon; (b) discovery node ID—node ID of the current beacon master; (c) discovery node sector ID—sector of the node which discovered the new node; and (d) new node capabilities—new node reported capabilities.

4.11.4.2. Beacon Master Temporary Schedule Update

This information element is used to interrupt and update the schedule of the beacon master. This can be used by the system if a new node is joining the network and a discovery campaign is scheduled for it. In at least one embodiment, the frame of an assistance response message contains the following information: (a) number of scheduled beacon masters—number of beacon masters that are urgently scheduled to help the new node; (b) new node ID—node ID of the new node to be assisted; (c) BM 1, BM 2, BM 3, . . . —a list of node IDs of scheduled nodes to serve as beacon masters.

4.11.4.3. Registration Request

This is to inform the current beacon master that a new node requests to register as future beacon master. A node might also decide not to serve as a beacon master for some time and then switch to enable the beacon master option. This request flag allows other nodes to schedule this node for future discovery cycles. In at least one embodiment, the frame of an assistance response message contains the following information: node ID-ID of the node that needs to register as a future BM.

4.11.4.4. Beacon Master Schedule Update

This is to inform nodes in the network about a new update in the steady state beacon master switching updates. This can be in the form of adding a new node or removing a node from the current node list or current sequence. In at least one embodiment, the beacon master schedule update includes the following fields: (a) number of nodes to update—number of the beacon masters that added or removed from the list or sequence; (b) new nodes IDs—node IDs for the nodes to be added or removed from the node list or sequence; (c) action—add or remove nodes; and (d) new sequence—new updated sequence for the list after adding or removing the new nodes.

5. Summary

Wireless communication system/apparatus/method with directional transmission performing transmission of signals that aid scanning for mesh network discovery and maintenance of links among peer STAs in the mesh network, comprising: (a) STA transmits first type of beacons to maintain existing links among one or more neighboring peer STA(s) in which (a)(i) first type of beacons contain time synchronization and resource management information; (a)(ii) STA transmits the first type of beacons with reduced number of antenna sectors; (b) STA transmits second type of beacons to aid network discovery for newly joining STAs, in which (b)(i) the second type of beacons contain mesh network profile information which is used for the identification of the operating network; (b)(ii) STA transmits the second type of beacons with coordination among other STAs in the network.

In addition to the above, in at least one embodiment, an STA that is searching for an available network nearby performs either active scanning or passive scanning, the STA transmits a signal to notify the intent of the network discovery.

In addition to the above, in at least one embodiment, upon reception of the signal notifying the intent of the network discovery, one STA or more in the existing network schedules transmission of discovery beacons toward the STA searching for an available network.

In addition to the above, in at least one embodiment, an STA that received said signal notifying the intent of the network discovery transmits a subset of the received information to a scheduling entity of the network, the scheduling entity of the network collects information from STAs in the network, determines the transmission time and transmitting STA(s) of the discovery beacon, and notifies the transmitting STA(s) of the transmission time of the discovery beacon.

In addition to the above, in at least one embodiment, STA that received said transmission time of the discovery transmits discovery beacons as instructed by the received information.

In addition to the above, in at least one embodiment, STA collects information about the newly joining STA from its neighboring peer STAs, and determines the timing of the transmission of discovery beacons, and transmits discovery beacons as determined.

In addition to the above, in at least one embodiment, Mesh STAs can coordinate the transmission of network announcement frames in all directions to the new node during the data transmission period to assist in quick neighbor discovery.

The enhancements described in the presented technology can be readily implemented within various mmWave transmitters, receivers and transceivers. It should also be appreciated that modern transmitters, receivers and transceivers are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with various modern communication devices. The presented technology is non-limiting with regard to memory and computer-readable media, insofar as these are non-transitory, and thus not constituting a transitory electronic signal.

It will also be appreciated that the computer readable media (memory storing instructions) in these computational systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), form ula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a mesh network, the apparatus comprising: (a) a wireless communication circuit configured for wirelessly communicating with other wireless communication stations utilizing directional transmission having a plurality of antenna pattern sectors each having different transmission directions; (b) a processor coupled to said wireless communication circuit; and (c) a non-transitory memory storing instructions executable by the processor; (d) wherein said instructions, when executed by the processor, perform steps comprising: (d)(i) transmitting a first type of beacon, a peer beacon, comprising time synchronization and resource management information, to maintain existing links among one or more neighboring peer stations within the mesh network; and (d)(ii) transmitting a second type of beacon, a network discovery beacon, containing mesh network profile information which identifies said mesh network, to aid network discovery for wireless communication stations to join said mesh network.

2. An apparatus for wireless communication in a mesh network, the apparatus comprising: (a) a wireless communication circuit configured for wirelessly communicating with other wireless communication stations utilizing directional transmission having a plurality of antenna pattern sectors each having different transmission directions; (b) wherein said directional transmission aids scanning for mesh network discovery and maintenance of links among peer stations in said mesh network; (c) a processor coupled to said wireless communication circuit; and (d) a non-transitory memory storing instructions executable by the processor; (e) wherein said instructions, when executed by the processor, perform steps comprising: (e) (i) transmitting a first type of beacon, a peer beacon, comprising time synchronization and resource management information, to maintain existing links among one or more neighboring peer stations within the mesh network; in which said first type of beacon is transmitted to a reduced number of antenna sector directions, from said plurality of antenna pattern sectors, based on peer locations; and (e)(ii) transmitting a second type of beacon, a network discovery beacon, containing mesh network profile information which identifies said mesh network, to aid network discovery for wireless communication stations to join said mesh network, in which said second type of beacon is transmitted after coordination among stations in said mesh network so that not all stations are required to send said second type of beacon.

3. A method of wireless communication in a mesh network, the method comprising: (a) transmitting a first type of beacon, a peer beacon, comprising time synchronization and resource management information, to maintain existing links among one or more neighboring peer stations within a mesh network of wireless communication stations which utilize directional transmission having a plurality of antenna pattern sectors each having different transmission directions; and (b) transmitting a second type of beacon, a network discovery beacon, containing mesh network profile information which identifies said mesh network, to aid network discovery for wireless communication stations to join said mesh network.

4. The apparatus or method of any preceding embodiment, wherein said directional transmission aids scanning for mesh network discovery and maintenance of links among peer stations in said mesh network.

5. The apparatus or method of any preceding embodiment, wherein said instructions when executed by the processor perform transmitting of said first type of beacon to a reduced number of antenna sector directions, from said plurality of antenna pattern sectors, based on peer locations.

6. The apparatus or method of any preceding embodiment, wherein said instructions when executed by the processor perform transmitting of said second type of beacon utilizing coordination among stations in said mesh network, whereby not all stations are required to send said second type of beacon.

7. The apparatus or method of any preceding embodiment, wherein said instructions when executed by the processor further perform steps comprising searching for an available network nearby utilizing either active scanning or passive scanning, and responding to receiving said network discovery beacon by transmitting a signal to notify the intent of joining said mesh network.

8. The apparatus or method of any preceding embodiment, wherein said instructions when executed by the processor further perform steps comprising transmitting a signal notifying intent to join the mesh network, wherein at least one station in said mesh network receiving said signal notifying intent to join the mesh network schedules transmission of discovery beacons toward the station searching to join the mesh network.

9. The apparatus or method of any preceding embodiment, wherein said instructions when executed by the processor further perform steps comprising transmitting a subset of information received from the station sending said signal notifying intent to join the mesh network to a scheduling entity of the mesh network, wherein said scheduling entity of the mesh network collects information from stations in the network, determines the transmission time and at least one transmitting station to generate said discovery beacon, and transmits notifications to these stations of transmission time for said discovery beacon.

10. The apparatus or method of any preceding embodiment, wherein said instructions when executed by the processor further perform steps comprising transmitting discovery beacons in response to instructions to transmit discovery beacons at said transmission time as received from said scheduling entity of the mesh network.

11. The apparatus or method of any preceding embodiment, wherein said instructions when executed by the processor further perform steps comprising collecting information about a station newly joining the mesh network from its neighboring peer stations, determining timing of transmission of discovery beacons, and transmitting discovery beacons at the determined timing.

12. The apparatus or method of any preceding embodiment, wherein said instructions when executed by the processor further perform steps comprising coordinating transmission of network announcement frames between stations in said mesh network, wherein in response to said coordination at least one of said stations in the mesh network transmits said network announcement frames in all directions to a new node during a data transmission period to assist in neighbor discovery.

13. The apparatus or method of any preceding embodiment, further comprising transmitting of said peer beacon to a reduced number of antenna sector directions, from said plurality of antenna pattern sectors, based on peer locations.

14. The apparatus or method of any preceding embodiment, further comprising transmitting of said discovery beacon utilizing coordination among stations in said mesh network, whereby not all stations are required to send said discovery beacon.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Discovery Zone Formation Exemplified in FIG. 33

| List | $L_1$ | $L_2$ | $L_3$ | $L_4$ | $L_5$ | $L_6$ |
|---|---|---|---|---|---|---|
| Neighbor list | A-S4 | A-S4, C-S1 | C-S1 | C-S1, A-S3 | C-S1, B-S4, A-S3 | B-S4, A-S3 |
| Discovery zone update | A-S4 = { }<br>A-S3 = { }<br>C-S1 = { }<br>B-S4 = { } | A-S4 = {C-S1}<br>A-S3 = { }<br>C-S1 = {A-S4}<br>B-S4 = { } | A-S4 = {C-S1}<br>A-S3 = { }<br>C-S1 = {A-S4}<br>B-S4 = { } | A-S4 = {C-S1}<br>A-S3 = {C-S1}<br>C-S1 = {A-S4, A-S3}<br>B-S4 = { } | A-S4 = {C-S1}<br>A-S3 = {C-S1, B-S4}<br>C-S1 = {A-S4, A-S3, B-S4}<br>B-S4 = {C-S1, A-S3} | A-S4 = {C-S1}<br>A-S3 = {C-S1, B-S4}<br>C-S1 = {A-S4, A-S3, B-S4}<br>B-S4 = {C-S1, A-S3} |

What is claimed is:

1. An apparatus for wireless communication in a network, the apparatus comprising:

(a) a wireless communication circuit configured as a station for wirelessly communicating with other wireless communication stations, as stations, utilizing directional transmission having a plurality of antenna pattern sectors each having different transmission directions; wherein said station may operate in different roles of a wireless local area network (WLAN) communication protocol comprising: a new station which has not joined the network but is trying to connect to the network, a network station which is already connected in the network with one network station operating as a central entity for the network;

(b) a processor coupled to said wireless communication circuit; and (c) a non-transitory memory storing instructions executable by the processor;

(d) wherein said instructions, when executed by the processor, perform steps comprising:

(i) transmitting beacons as a combination of peer beacons and discovery beacons;

(ii) forming new lists of peer stations in response to discovering new stations and losing sight of other stations, as stations in the network are moving;

(iii) recording best sector information from beamforming training and peer beacons are transmitted using bracketing which selects one or more additional sectors on each side of the best sector to improve communications in view of the relative motion between the stations;

(iv) operating as a network station in the role of beacon master (BM) or temporary beacon master, for performing transmission of frames or beacons, as used for discovery which are sent in all directions, wherein only said beacon master or said temporary beacon master is allowed to transmit said network discovery beacons on said network;

(v) operating as a network station in the role of beacon master, temporary beacon master, or central entity for coordinating a discovery process for the new station comprising: (A) detecting the new station or receiving an announcement from another network station about the existence of the new station; and (B) updating a schedule for the beacon master or scheduling a new temporary beacon master for triggering other stations in the network to transmit frames or beacons, as used for discovery, for receipt by the new station;

(vi) operating as a new station in responding to receipt of said frames used for discovery at the new station by connecting to one or more network stations that transmitted frames to this new station; and (vii) transmitting peer beacons independently of said frames or beacons used for discovery, wherein said peer beacons are only transmitted in the direction of other network stations which are known peer stations.

2. The apparatus of claim 1, wherein said directional transmission aids scanning for mesh network discovery, and for maintenance of links using peer beacons among peer stations in said mesh network.

3. The apparatus of claim 1, wherein said instructions when executed by the processor perform transmitting of each of said peer beacons to a reduced number of antenna sector directions, from said plurality of antenna pattern sectors, so that said peer beacons are only transmitted in the direction of known peer stations.

4. The apparatus of claim 1, wherein said frames or beacons used for discovery comprise: discovery beacons, beamforming frames, network announcement frames, or beacon frames.

5. The apparatus of claim 1, wherein said instructions when executed by the processor when operating as a new station attempting to join the network, further perform steps comprising searching for an available network nearby utilizing either active scanning or passive scanning, and responding to receiving said network discovery beacon by transmitting a signal to notify the intent of joining said network.

6. The apparatus of claim 1, wherein said station triggering transmission of frames or beacons as used for discovery is operating as a beacon master selected for at least a period of time to transmit discovery beacons.

7. The apparatus of claim 1, wherein said instructions when executed by the processor when operating as a network station perform receiving a signal from the new station of its intent to join the network, and transmitting a subset of information received from the new station notifying its intent to join the network to a network station operating as said central entity of the network, which determines the transmission time and at least one transmitting station to generate said discovery beacon, and transmits notifications to these network stations of transmission time for said discovery beacon.

8. The apparatus of claim 7, wherein said instructions when executed by the processor operating as a network station further perform steps comprising transmitting discovery beacons in response to instructions to transmit discovery beacons at said transmission time as received from another network station operating as the central entity of the network.

9. The apparatus of claim 1, wherein said instructions when executed by the processor further perform steps comprising collecting information, about a station newly joining the network, from its neighboring peer stations then determining timing of transmission of discovery beacons and transmitting discovery beacons at the determined timing.

10. The apparatus of claim 1, wherein said instructions when executed by the processor further perform steps comprising coordinating transmission of network announcement frames between stations in said network, wherein by alternating which of the network stations is operating as a beacon master, which is responsible for sending network announcement frames in all directions for receipt by a new node whereby the new node should hear a beacon from a nearby network station when it is serving as a beacon master.

11. The apparatus of claim 1, wherein said instructions, when executed by the processor further performs steps comprising:
 forwarding information regarding the current and future beacon master beacon through peer beacons and discovery beacons to all mesh nodes in the network by the current beacon master which also performs sending beacons containing a countdown field to indicate when the current beacon master will stop transmitting the discovery beacons and when a new beacon master beacon should commence; and
 wherein each station receiving a peer beacon from the beacon master decrements the countdown timer and forwards the updated countdown value to its peers.

12. An apparatus for wireless communication in a network, the apparatus comprising:
 (a) a wireless communication circuit configured as a station for wirelessly communicating with other wireless communication stations, as stations, utilizing directional transmission having a plurality of antenna pattern sectors each having different transmission directions; wherein said station may operate in different roles of a wireless local area network (WLAN) communication protocol comprising: a new station which has not joined the network but is trying to connect to the network, a network station which is already connected in the network with one network station operating as a central entity for the network;
 (b) wherein said directional transmission aids scanning for network discovery and maintenance of links among peer stations in said network,
 (c) a processor coupled to said wireless communication circuit; and
 (d) a non-transitory memory storing instructions executable by the processor;
 (e) wherein said instructions, when executed by the processor, perform steps comprising:
  operating as a network station connected to a wireless network having a number of peers, comprising steps:
   (A) operating in the role of beacon master (BM) or temporary beacon master, performing transmission of frames or beacons, as used for discovery which are sent in all directions; wherein only said beacon master or said temporary beacon master is allowed to transmit said network discovery beacons on said network;
   (B) operating in the role of beacon master, temporary beacon master, or central entity for coordinating a discovery process for the new station comprising:
    (1) detecting the new station or receiving an announcement from another network station about the existence of the new station; and (2) updating a schedule for the beacon master or scheduling a new temporary beacon master for triggering other stations in the network to transmit frames or beacons, as used for discovery, for receipt by the new station;
   (C) transmitting peer beacons independently of said frames or beacons used for discovery, wherein said peer beacons are only transmitted in the direction of known peer stations;
   (D) wherein said frames or beacons used for discovery comprise:
    discovery beacons, beamforming frames, network announcement frames, or beacon frames;
   (ii) operating as a new station trying to connect to the network in responding to receipt of said frames at the new station by connecting to one or more stations that transmitted frames to this new station; and
   (iii) wherein the current beacon master performs: (A) forwarding information regarding the current and future beacon master through peer beacons and discovery beacons to all stations in the network; (B) sending beacons containing a countdown field to indicate when the current beacon master will stop transmitting the discovery beacons and when a new beacon master beacon should commence; and (C) wherein each station receiving a peer beacon from the beacon master will decrement the countdown timer and forward the updated countdown value to its peers.

13. The apparatus of claim 12, wherein said instructions when executed by the processor when operating as the new station attempting to join the network, further perform steps comprising searching for an available network nearby utilizing either active scanning or passive scanning, and responding to receiving said network discovery beacon by transmitting a signal to notify the intent of joining said network.

14. The apparatus of claim 12, wherein said station triggering transmission of frames or beacons as used for discovery is operating as a beacon master selected for at least a period of time to transmit discovery beacons.

15. The apparatus of claim 14, wherein said instructions when executed by the processor when operating as a network station perform receiving a signal from the new station of its intent to join the network, and transmitting a subset of information received from the new station notifying its intent to join the network to a network station operating as said central entity of the network, which determines the transmission time and at least one transmitting station to generate said discovery beacon, and transmits notifications to these network stations of transmission time for said discovery beacon.

16. The apparatus of claim 15, wherein said instructions when executed by the processor operating as a network station further perform steps comprising transmitting discovery beacons in response to instructions to transmit discovery beacons at said transmission time as received from another network station operating as the central entity of the network.

17. The apparatus of claim 12, wherein said instructions when executed by the processor further perform steps comprising collecting information about a station newly joining the mesh network from its neighboring peer stations, determining timing of transmission of discovery beacons, and transmitting discovery beacons at the determined timing.

18. The apparatus of claim 12, wherein said frames or beacons used for discovery are selected from the group of messages consisting of: discovery beacons, beamforming frames, network announcement frames, and beacon frames.

19. The apparatus of claim 12, wherein said instructions, when executed by the processor further performs steps comprising:
- transmitting beacons as a combination of peer beacons and discovery beacons;
- forming new lists of peer stations in response to discovering new stations and losing sight of other stations, as stations in the network are moving; and
- recording best sector information from beamforming training and peer beacons are transmitted using bracketing which selects one or more additional sectors on each side of the best sector to improve communications in view of the relative motion between the stations.

20. A method of wireless communication in a network of wireless communication stations, the method comprising:
- (a) wirelessly communicating with other wireless communication stations utilizing directional transmission having a plurality of antenna pattern sectors each having different transmission directions;
- (b) triggering transmission by a station of frames or beacons, as used for discovery which are sent in all directions, in response to detecting a new station or detecting that a new station is trying to connect to the network;
- (c) coordinating a discovery process for the new station by a station operating as a central entity for triggering other stations in the network to transmit frames or beacons, as used for discovery, for receipt by the new station;
- (d) responding to receipt of said frames at the new station by connecting to one or more stations that transmitted frames to this new station;
- (e) transmitting peer beacons independently of said frames or beacons used for discovery, wherein said peer beacons are only transmitted in the direction of known peer stations; and
- (f) wherein the current beacon master performs: (A) forwarding information regarding the current and future beacon master beacon through peer beacons and discovery beacons to all mesh nodes in the network; (B) sending beacons containing a countdown field to indicate when the current beacon master will stop transmitting the discovery beacons and when a new beacon master beacon should commence; and (C) wherein each node receiving a peer beacon from the beacon master will decrement the countdown timer and forward the updated countdown value to its peers.

21. The method of claim 20, further comprising transmitting of said peer beacons to a reduced number of antenna sector directions, from said plurality of antenna pattern sectors, so that said peer beacons are only transmitted in the direction of known peer stations.

22. The method of claim 20, wherein said frames or beacons used for discovery comprise: discovery beacons, beamforming frames, network announcement frames, or beacon frames.

23. The method of claim 20, further comprising:
- forwarding information regarding the current and future beacon master beacon through peer beacons and discovery beacons to all mesh nodes in the network by the current beacon master which also performs sending beacons containing a countdown field to indicate when the current beacon master will stop transmitting the discovery beacons and when a new beacon master beacon should commence; and
- wherein each station receiving a peer beacon from the beacon master decrements the countdown timer and forwards the updated countdown value to its peers.

\* \* \* \* \*